US012347274B2

(12) United States Patent
Weaver et al.

(10) Patent No.: US 12,347,274 B2
(45) Date of Patent: Jul. 1, 2025

(54) VIRTUAL WORLD GAMING TOURNAMENT WITH SKILL-BASED BONUS GAME

(71) Applicant: Pilot Games, Inc., Minnetonka, MN (US)

(72) Inventors: Jon Weaver, Saint Paul, MN (US); Warren R. White, Reno, NV (US); Anthony M. Morelli, Mt. Pleasant, MI (US); William D. Hermansen, Reno, NV (US)

(73) Assignee: Pilot Games, Inc., Minnetonka, MN (US)

( * ) Notice: Subject to any disclaimer, the term of this patent is extended or adjusted under 35 U.S.C. 154(b) by 958 days.

(21) Appl. No.: 17/478,681

(22) Filed: Sep. 17, 2021

(65) Prior Publication Data

US 2022/0076532 A1 Mar. 10, 2022

Related U.S. Application Data

(63) Continuation-in-part of application No. 16/865,200, filed on May 1, 2020, now Pat. No. 11,232,680.

(60) Provisional application No. 62/843,418, filed on May 4, 2019.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3227* (2013.01); *G07F 17/3244* (2013.01); *G07F 17/34* (2013.01)

(58) Field of Classification Search
CPC ............. G07F 17/3267; G07F 17/3213; G07F 17/3227; G07F 17/3244; G07F 17/34
See application file for complete search history.

(56) References Cited

U.S. PATENT DOCUMENTS

| | | | | |
|---|---|---|---|---|
| 10,086,278 | B2 | 10/2018 | Elias | |
| 11,386,744 | B2 * | 7/2022 | Weaver | G07F 17/3218 |
| 2015/0213672 | A1 | 7/2015 | Elias et al. | |
| 2020/0226873 | A1 | 7/2020 | Weaver et al. | |
| 2020/0364987 | A1 | 11/2020 | Weaver et al. | |
| 2021/0056808 | A1 * | 2/2021 | Harris | G07F 17/3225 |
| 2024/0112528 | A1 * | 4/2024 | Belger | G07F 17/3213 |

* cited by examiner

*Primary Examiner* — Ronald Laneau
(74) *Attorney, Agent, or Firm* — Kerr IP Group, LLC

(57) ABSTRACT

A gaming system and method operating a virtual world gaming tournament is described. The gaming system includes gaming clients, a virtual world, a tournament session, a live host and a tournament prize. The virtual world has a variety of different locations and each gaming client is located at a location in the virtual world. The tournament session includes predetermined game sessions for each gaming client, in which each game session associates a random game outcome with a symbolic representation that is displayed at the location in the virtual world. When the random game outcome matches a particular point value or pattern, a non-wagering bonus skill-based game session is initiated. The live host identifies locations in the virtual world and provides updates on the points awarded to the gaming clients at those locations. The live host selectively broadcasts a first virtual world or a second virtual world during the tournament session.

20 Claims, 38 Drawing Sheets

Figure 8B
NILE TREASURE
ADD CASH
MENU
GAME INFO
CASH
WIN
OPEN
NILE TREASURE
ADD CASH
MENU
GAME INFO
CASH
WIN
PLAY

820

822

1500

Figure 16
PGL
1600
NOW AVAILABLE AT PARTICIPATING BARS
PILOT GAMBLING LEAGUE
JOIN NOW
LEAGUE
CHAMPION
VIDEOS
UPCOMING EVENTS
REWARDS
CURRENT STANDINGS
OUR GAMES
PGL

VIRTUAL REWARDS

Figure 18
1800
NEWS
Pilot Games in Proof Magazine
Blog Search
Tweets
PROOF
Introducing
MegaSota
Game Night
New from Pilot Games....
A Weekly Statewide Linked
Bar Bingo Tournament!
Pilot
games
www.pilotgames.com

1900

Figure 36
3430
3432
3408
TOP SCORES
33160 POINTS
32220 POINTS
15545 POINTS
15415 POINTS
15220 POINTS
00:16:01
PRIZES
PGL
bon American Legion Spicer Spicer
14. (11465) just

VIRTUAL WORLD GAMING TOURNAMENT WITH SKILL-BASED BONUS GAME

CROSS-REFERENCES

This patent application is a continuation-in-part of patent application Ser. No. 16/865,200 entitled VIRTUAL WORLD GAMING TOURNAMENT WITH LIVE HOST, filed on May 1, 2020, which claims the benefit of provisional patent application 62/843,418 entitled CENTRALIZING TOURNAMENT GAME WITH VIRTUAL GAME REPRESENTATION that was filed on May 4, 2019; both of which patent applications are hereby incorporated by reference in this patent application.

FIELD

A gaming system and method operating a virtual world gaming tournament is described. The tournament session includes wagering gameplay with random outcomes and awards points for specific random outcomes. The tournament session also includes non-wagering gameplay in a skill-based bonus game.

BACKGROUND

Typical wagering devices include slot machines and video lottery terminals and are normally managed by various types of computer systems which monitor and control their activities. Such wagering devices are typically located in casinos, racetracks, tribal gaming locations or other authorized locations. These are generally capital-intensive operations where the high amount of play justifies a significant capital expenditure.

Smaller gaming venues, including charitable gaming venues, are challenged by such devices for several reasons: 1) play volume may not generate enough revenue to make expensive, proprietary devices cost-effective; 2) small locations cannot afford dedicated maintenance staffs to keep complex devices working; 3) considerable expertise is needed to coordinate effective operations; and, 4) such gaming devices require considerable space.

While gaming is still a popular and generally profitable enterprise, the popularity of gaming activity is not high among younger elements of the population. Indeed, most casinos and large gaming operations report an ever-increasing average age of players. This is an industry concern and results in a constant search for new ways to appeal to a younger age-group.

Virtual worlds and skill-based game components engage younger players. A virtual world is a computer based online community where players interact in a simulated world. Users interact with other users in these worlds using an avatar. Also, player engagement is improved when progressive prizes are included in game play because progressive prizes create excitement and attract players of all ages. Skill-based game components have previously been employed in casino games to allow skilled players to achieve a slightly better payback percentage. However, while this engages players with more skill, it disadvantages players with less skill, and may thus reduce the appeal of the game on average.

The virtual world systems and methods presented herein are directed to mobile devices, in combination with a video transmission system to produce a flexible, secure, low-cost gaming alternative. Additionally, the systems and methods presented herein support virtual world games that are socially centered, include a skill component without disadvantaging unskilled players, and may appeal to younger players. Also, the introduction of tournament games with tournament prizes and progressive prizes combined with an on-line community playing in a virtual world to appeal to players of all ages.

Therefore, it would be beneficial to provide a system and method that can provide an engaging gaming experience that combines a linked bingo tournament with a virtual world.

Additionally, it would be beneficial to provide a linked bingo tournament system and method that integrates a tournament prize with a progressive prize. Further, it would be beneficial to include skill components in the linked bingo tournament system that engage players without disadvantaging unskilled players.

SUMMARY

A gaming system operating a virtual world gaming tournament is described. The gaming system includes a gaming client, a virtual world, a game session, a game prize, a non-wagering bonus skill game session, and at least one skill-based player input. The gaming client is communicatively coupled to a wagering sub-system that receives a wager from the gaming client. The virtual world includes at least one location associated with the gaming client. The game session includes a random game outcome, and is associated with the gaming client and the wager. The gaming client associates the random game outcome with a symbolic representation displayed at the virtual world location of the gaming client. The random game outcome corresponds to a point value that is displayed in the virtual world location associated with the gaming client. The game prize is awarded to the gaming client when the point value of a game session exceeds a threshold value. The non-wagering bonus skill game session is initiated when the point value associated with the random game outcome of a game session matches one or more bonus point value requirements. The non-wagering bonus skill game session includes a plurality of non-monetary bonus skill prizes. The skill-based player input includes a player ability attribute that determines the award of a non-monetary bonus skill prize.

In another embodiment, the gaming system includes a plurality of gaming clients, a virtual world, a tournament session, a live host and a tournament prize. The gaming clients are communicatively coupled to a wagering sub-system that receives a wager from each of the gaming clients. The virtual world includes a plurality of virtual locations, and each gaming client is associated with a particular virtual location. The tournament session begins at a particular time and the tournament session ends when a predetermined number of game sessions have been played. Each game session associates a random game outcome with a symbolic representation that is displayed at the location in the virtual world associated with the gaming client. The random game outcome associated with each game session is further associated with points that are displayed in the virtual world associated with the gaming client. A non-wagering bonus skill game session is initiated when the point value associated with a gaming client matches a bonus trigger value. The live host identifies locations in the virtual world and provides updates on the points awarded to the gaming clients at that virtual world location. The host selectively broadcasts a first virtual world or a second virtual world during the tournament session. Additionally, the live host broadcast is displayed on a networked display or on the gaming clients. The tournament prize associated with the tournament session is displayed on each gaming client. Further, the tournament prize is awarded to the gaming clients displaying a highest point total upon completion of the tournament session.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The gaming systems and methods presented herein include a mobile wagering and entertainment system that is designed to be used in wagering applications within legal gaming frameworks. More specifically, the gaming systems and methods presented herein support centralized control of wagering that takes place in multiple wagering venues and provides an integrated broadcast capability so that an entertaining complement to the wagering can be presented on television screens in the gaming venues.

A gaming venue includes a charity, a casino and any other such authorized or licensed gaming venue. Additionally, a gaming venue includes a church, hotel, bar, restaurant, convenience store and other such locations that support licensed gaming activity. Note, that the term "gaming" refers to games of chance or games that include a chance component, in which a wager is received, and the awarded prize is dependent on the outcome of the game of chance or of the chance component.

As described in further detail herein, the gaming system and method includes a Mobile Wagering Sub-system (MWS) and a Video Presentation Sub-system (VPS). The gaming system is communicatively coupled to a plurality of remote gaming venues, in which each remote gaming venue has at least one mobile client device that supports customer wagering. Additionally, each remote gaming venue may include one or more Point-of-Sale stations that manage player funds. Furthermore, each remote gaming venue may include one or more television monitors that broadcast content complementary to wagering activities. In the illustrative embodiments presented herein, the various elements of the gaming system are communicatively and operatively coupled to one another with a network structure that includes the Internet as the backbone and at least one secure Wi-Fi network within each gaming venue.

Figure 1:
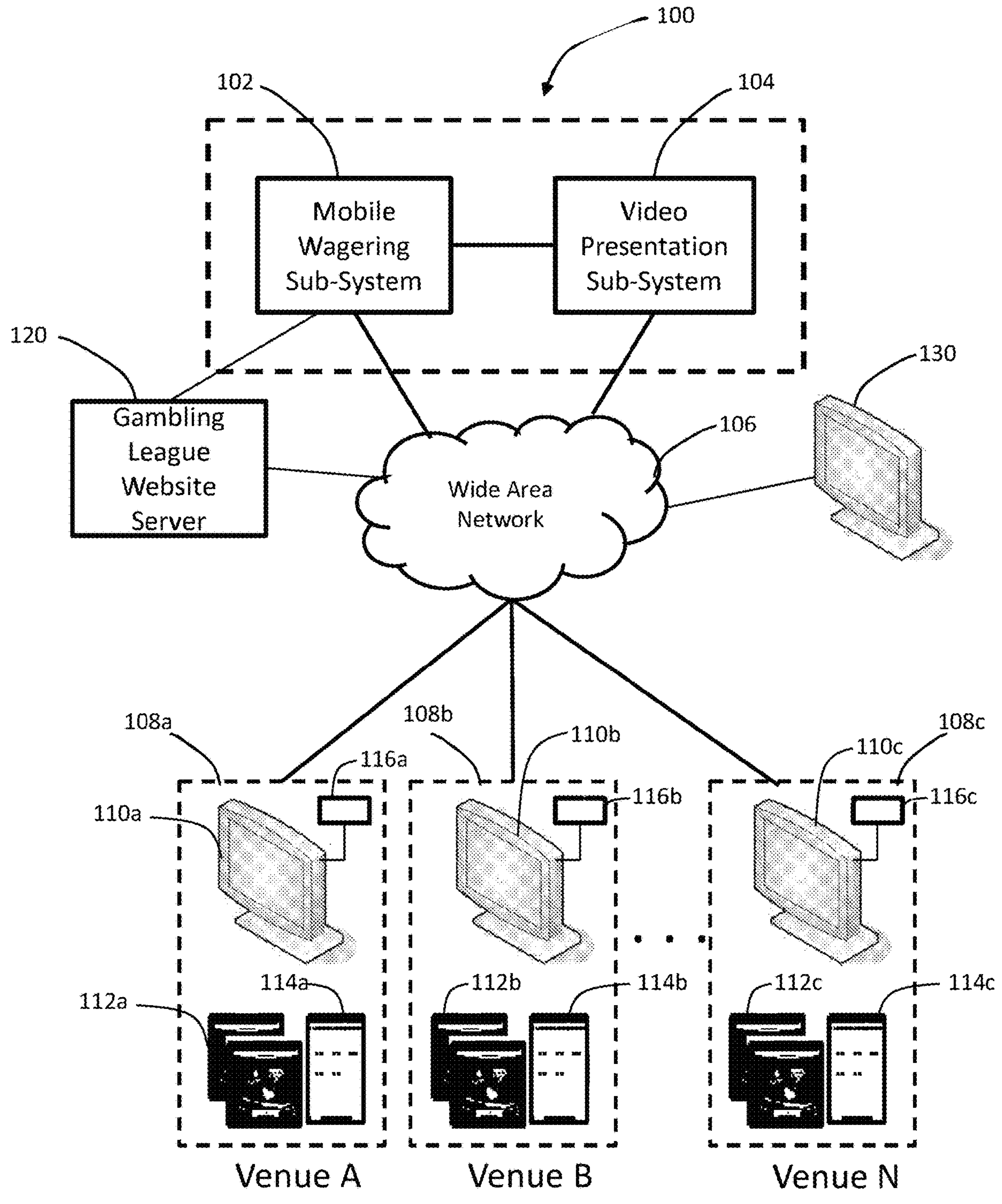
FIG. 1 shows an illustrative centralized gaming system.

Referring to FIG. 1, there is shown an illustrative centralized gaming system. The centralized gaming system 100 includes a mobile wagering sub-system 102 and a video presentation sub-system 104. The mobile wagering sub-system 102 and the video presentation sub-system 104 are communicatively coupled to one another. Additionally, the mobile wagering sub-system 102 and the video presentation sub-system 104 are communicatively coupled to a Wide Area Network 106, e.g. Internet, which is communicatively coupled to a plurality of gaming venues, namely, gaming illustrative Venue A 108*a*, Venue B 108*b* and other such gaming venues as represented by Venue N 108*c*. Each of the plurality of gaming venues 108*a*, 108*b* and 108*c* include a stationary monitor 110*a*, 110*b* and 110*c*, respectively. Each stationary monitor 110*a*, 110*b* and 110*c* is communicatively coupled to the video presentation client 116*a*, 116*b* and 116*c*, respectively. The video presentation clients 116 are also communicatively coupled to the video presentation subsystem 104. The combination of the stationary monitor 110 and the video presentation client 116 may also be referred as a "stationary monitor client," and as such reference to "stationary monitor client" refers to the combination of the stationary monitor 110 and the video presentation client 116.

Within the system architecture each gaming venue may be associated with a sponsoring organization, e.g. a charity, and an additional business entity, e.g. a distributor. The types of venues, sponsoring organizations and other business entities will vary according jurisdictional statures and regulation.

Additionally, each of the gaming venues 108*a*, 108*b* and 108*c* include a plurality of authorized mobile devices 112*a*, 112*b* and 112*c*, respectively. Further still, each of the gaming venues includes a Point-of-Sale (POS) device 114*a*, 114*b* and 114*c*. The illustrative authorized mobile devices 112 and the POS devices 114 are client devices configured to communicate with each other and the mobile wagering subsystem 102. In operation, the authorized mobile devices 112 and POS devices 114 are registered with the mobile wagering sub-system 102, which includes a database (not shown) that associates the authorized mobile devices 112 and POS devices 114 with a designated gaming venue 108. Thus, authorized mobile devices 112 and POS devices 114 are not allowed to interact with the centralized gamine system 100 when the client devices are not located at the designated gaming venue.

The illustrative authorized mobile devices 112 operate as wireless client devices that are communicatively coupled to the centralized gaming system 100. Additionally, the centralized gaming system 100 may be communicatively coupled to authorized non-mobile clients. Furthermore, other client devices such as non-mobile clients may be disposed in the gaming venues and these non-mobile clients may be communicatively coupled to the centralized gaming system 100. These authorize nonmobile client devices include, but are not limited to, wired devices such as gaming machines, slot machines, PCs, stationary monitors, Internet appliances, Internet of Things (IoT) devices and other such non-mobile devices with hardwire connections or wireless connections to the Wide Area Network 106. The non-mobile client devices may be configured to participate in the games presented herein including, but not limited to, the tournament games described hereinafter.

Operationally, client devices must comply with the system-centric gaming requirements in which all gaming and accounting activity are controlled by the mobile wagering sub-systems servers 102, and have the communications infrastructure, directly or by proxy, to interact with the server in a manner consistent with the operations of the authorized mobile devices 112 described herein.

The illustrative gaming system 100 includes a plurality of server applications that are configured to provide high-availability and redundancy, process all inputs and generates outputs. The illustrative gaming system 100 includes three different types of network communications. Firstly, there are network communications between the internal server components, namely, the mobile wagering sub-system 102 and the video presentation sub-system 104. Secondly, there are network communications between the server components 102/104 and the remote gaming venues 108*a*, 108*b* and 108*c*, as well as the Gambling League Website server 120. Thirdly, there are network communications within the gaming venues 108*a*, 108*b* and 108*c*.

With respect to network communications between the internal server components, the illustrative server components operate as a single network, in which the servers can communicate with one another using service requests. By way of example and not of limitation, the illustrative internal server components have two internet protocol addresses, namely, a Private IP used to maintain the server network and ensuring secure server-to-server communication, and a Public IP that is bound to the Internet and that provides access to server services through high security communications such as HTTPS. The internal server components use their private IPs for server-to-server communication so that these services are not exposed to the Internet, the game application running on the authorized mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to authorized "Game" and "POS" devices. This illustrative configuration ensures that only very specific requests are allowed from the public IP.

By way of example and not of limitation the servers are implemented using the Linux operating system using Restful programming techniques using Java as the programming language with Jersey RS support. Database structures are contained in a MySQL database.

Communication between the server components, namely, the mobile wagering sub-system 102 and the video presentation sub-system 104, and the remote client devices is performed over a wide-area network 106. As described above, these network communications are performed using secure SSL communications over the Internet.

Figure 2:
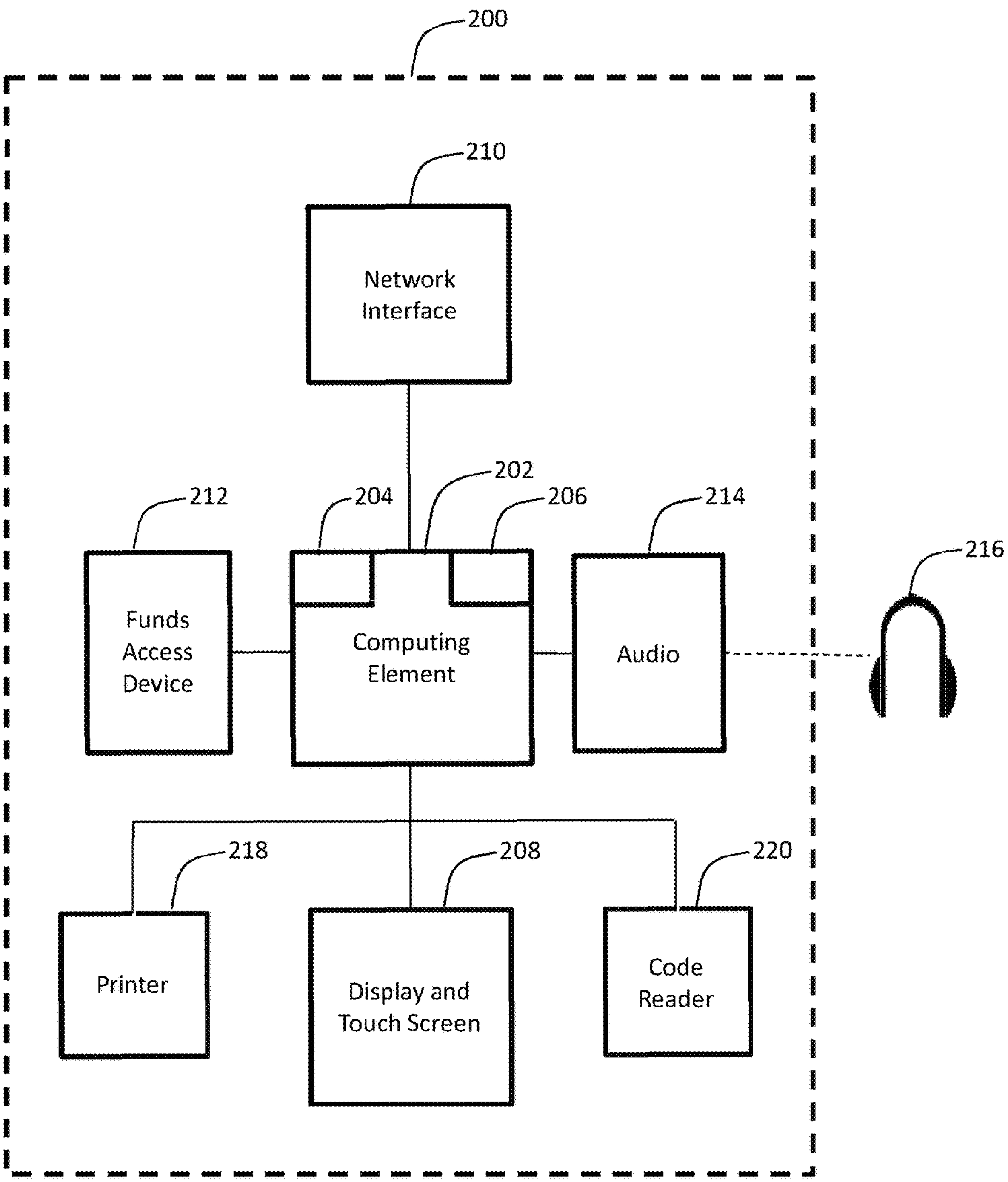
FIG. 2 shows an illustrative authorized mobile device or point-of-sale device.

The authorized mobile devices 112*a*, 112*b* and 12*c* are also referred to as a "player interface unit." An illustrative authorized mobile device is presented in FIG. 2. Operationally, each authorized mobile device 112 in an illustrative embodiment is associated with a player account.

By way of example and not of limitation, the player account is described as a short-term, anonymous entity tied to the client device being used by the player, and which expires when the fund balance drops to zero. However, it is possible in other embodiments to have player accounts which may exist for longer time periods and be tied to a player.

Additionally, it should be noted that while the illustrative embodiments presented herein generally describe financial transactions such as adding funds or cashing out at the POS device 114, in different regulatory environments or with different technology, such player accounts can have financial transactions originating at the player device or any other client device that may be configured to support POS transaction. Also, the financial transactions may be supported at a system level with a server component or server module that provides a web portal functions for financial transactions. Thus, the financial transactions may be performed by the client device, a server component, a server module, or any combination thereof. Depending on regulatory issues and available technology, financial transactions may be based on cash, credit cards, debit cards, digital currency or other mediums of finance.

Referring now to FIG. 2, there is shown an illustrative authorized mobile device or point-of-sale device. The illustrative authorized mobile device 200 may be one the plurality of authorized mobile devices 112 that are associated with each venue. The illustrative authorized mobile device 200 includes a central computing element 202 with a processor 204 and memory storage 206. One or more games may be preinstalled on the authorized mobile device 200 before the authorized mobile devices are deployed in a gaming venue or other such production environment. Alternatively, the illustrate game title files may be stored in a remote server, e.g. an "App" store, and the authorized mobile device 200 may configured to download the game title file, run the game title file and enable the user to interact with the corresponding game title.

The authorized mobile device 200 also includes a color display with a touchscreen 208 and a network interface component 210, which provides network access to a local area network, a wide area network or any combination thereof. By way of example and not of limitation the network interface component supports a wireless local area network such as a Wi-Fi network, which is based on IEEE 802.11 standards. Additionally, the authorized mobile device 200 may communicate with the wide area network 106 via the illustrative Wi-Fi network. The communication between the authorized mobile device 200 and the mobile wagering sub-system 102 may be performed using the illustrative HTTPS protocol or other such secure networking protocol that allows game session inputs, commands and outputs to be communicated securely across the Wide Area Network.

In an illustrative embodiment, the authorized mobile device 200 may be a tablet computing devices running iOS or Android operating systems. The illustrative authorized mobile device may also include a Funds Access Device module 212 that may be configured to have a custom locked profile to evade security-bypassing attempts. The Funds Access Devices (FAD) 212 may also provide alternative methods for starting customer account sessions or adding funds to existing account sessions. By way of example and not of limitation, the Funds Access Device module 212 may include currency readers and debit/credit card readers such as a magnetic stripe reader, a smart-card reader, an infra-red reader, a Near-Field-Communications reader and other such financial transaction readers.

The authorized mobile device 200 may also include an audio system component 214 that enhances the game-playing experience for the players. The audio system component 214 may also include a standard audio jack so that player can use wired or wireless headphones 216 to improve the game audio environment without disturbing others.

In one illustrative embodiment, the authorized mobile device 200 may include a printer 218 and a code reader 220. By way of example and not of limitation, the printer 218 generates vouchers. The illustrative code reader 220 may be embodied as a bar-code reader that is configured to read vouchers generated by the printer.

By way of example and not of limitation, the authorized mobile device 200 may be configured to include a "HELP" button in the game client that also dispatches a signal to the POS to notify the operator that the player is requesting assistance. The authorized mobile device 200 may also be configured to include a text-to-speech functionality to aid a visually impaired player. Additionally, the authorized mobile device 200 may include a gaming application that downloads files, decompresses the downloaded files if they have been compressed, and caches all assets inside the authorized mobile device 200. The authorized mobile device 200 supports dynamic updates without the need to update the game client itself.

Referring now to FIG. 1 and FIG. 2, the mobile wagering sub-system 102 is communicatively coupled to a plurality of authorized mobile device 112 such as illustrative player interface unit 200 presented in FIG. 2. In one illustrative embodiment, the mobile wagering sub-system 102 receives a wager input for a game session from the illustrative player interface unit 200. In another illustrative embodiment, the mobile wagering sub-system 102 receives the wager input for a game session from a plurality of authorized mobile devices 112, which may be disposed at one or more venues as presented in FIG. 1.

The illustrative authorized mobile device 200 presents a user interface on touch screen 208 that shows a plurality of game content associated with different types of game sessions. In the illustrative embodiment, the authorized mobile device 200 may also accept player inputs that are associated with a game session. The game session may perform various operations as described in further detail below.

In the illustrative embodiment, the video presentation sub-system 104 is communicatively coupled to the mobile wagering sub-system 102, the video presentation client 116, and the stationary monitors 110 disposed in the different gaming revenues. The video presentation sub-system 104 generates entertainment output associated with ongoing activity in the mobile gaming system.

One or more of the stationary monitors 110 then receives the entertainment output generated by the video presentation sub-system. The stationary monitors 110*a*, 110*b* and 110*c* then proceed to display the entertainment output generated by the video presentation sub-system 104.

In the illustrative embodiment, a first plurality of authorized devices 112*a* associated with a first gaming venue 108*a* includes a first stationary monitor 110*a* and first video presentation client 116*a*. Additionally, a second plurality of authorized mobile devices 112*b* associated with a second gaming venue 108*b* includes a second stationary monitor 110*b* and second video presentation client 116*b*. The first stationary monitor 110*a* and the second stationary monitor 110 are both communicatively coupled to video presentation sub-system 104. The video presentation sub-system 104 may have stored thereon an entertainment output, such as a video, that is associated with wagering activity. The video presentation sub-system 104 communicates the output, e.g. video, to the first stationary monitor 110*a* and the second stationary monitor 110*b* via the video presentation client 116*a* and 116*b*, respectively.

By way of example and not of limitation, for an illustrative bingo tournament game that includes a bingo game session, the various stationary monitors 110*a*, 110*b* and 110*c* may present a bingo video related to the bingo tournament game. Thus, a plurality of different authorized mobile device 112 from different gaming venues 108 can participate in the bingo tournament game and share a similar video experience.

Figure 3:
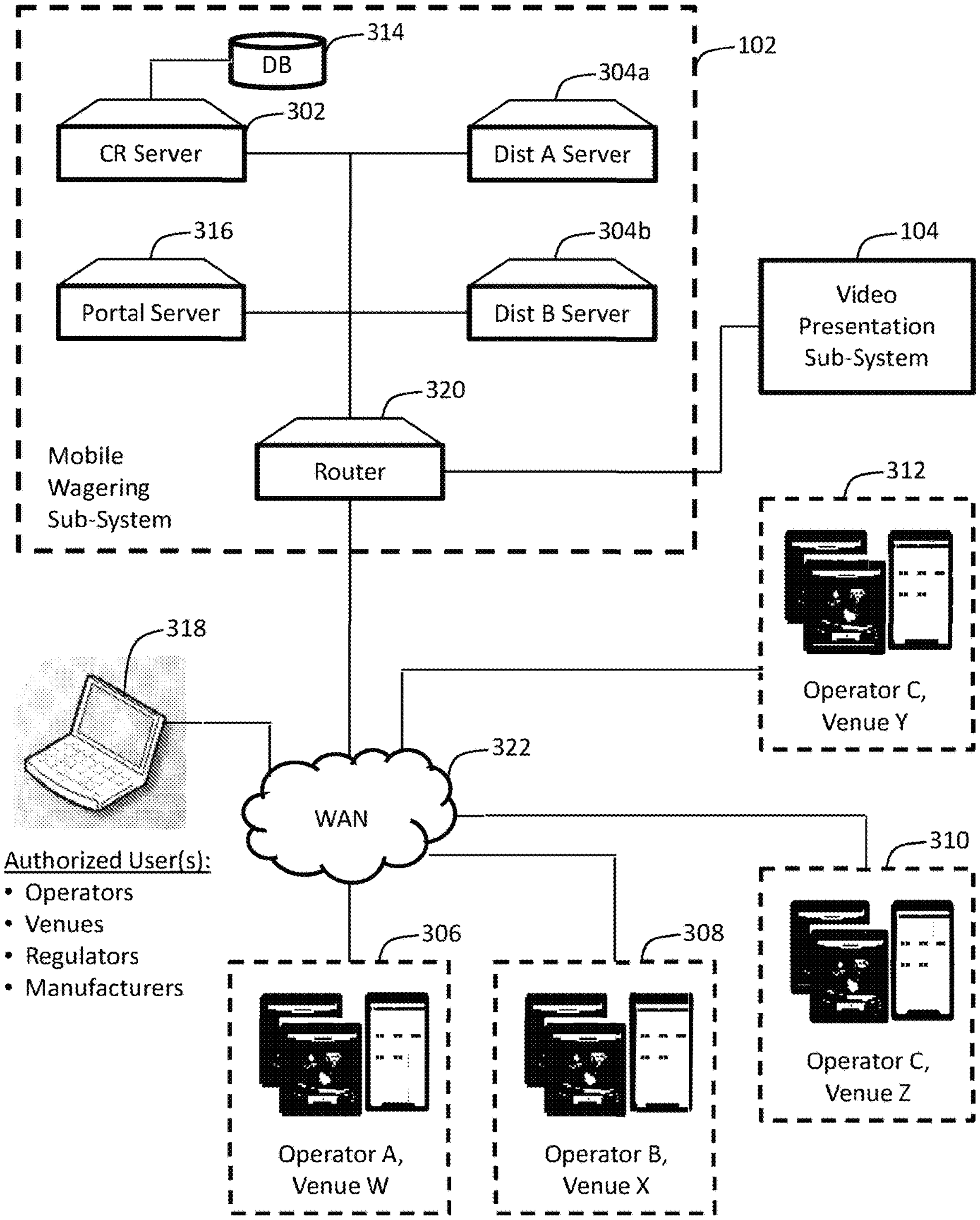
FIG. 3 shows detail of the mobile wagering sub-system.

Referring to FIG. 3, there is shown further detail for the mobile wagering sub-system 102 communicatively coupled to different venues. In an illustrative embodiment, the mobile wagering system functionality is distributed on multiple servers, including those that provide database 314 functionality. The illustrative mobile wagering sub-system 102 includes a centralized resource/manufacturer server 302 that performs as a coordinating entity for system operation and maintains authority over game operations controlled by the centralized gaming system 100. The mobile wagering sub-system 102 also includes a distributor server 304 that is communicatively coupled to the centralized resource server 302.

In the illustrative embodiment presented in FIG. 3, a first distributor server 304*a* and second distributor server 304*b* are also communicatively to the centralized resource server 302. Each of the illustrative distributor servers is configured to manage and control the game operations and cashier operations performed at a set of gaming venues that are associated with a distributor who is responsible for sales and support of a multiplicity of venues.

For example, a first set of gaming venues 306 and 308 are configured to communicate with first distributor server 304*a*, which manages and controls the game operations at gaming venues 306 and 308. Additionally, for a second set of gaming venues 310 and 312 are configured to communicate with the illustrative second distributor server 304*b* manages and controls the game operations at gaming venues 310 and 312. Thus, multiple gaming venues may require additional distributor servers.

A variety of tasks may be performed by the centralized resource server 302. For example, one of the tasks performed by the centralized resource server 302 includes providing a central routing operation for each of the authorized mobile devices 112 so that each authorized mobile device 112 is routed to the proper distributor server 304*a* or 340*b* upon activation each authorized mobile device. By way of example and not of limitation, the first request generated by an authorized mobile device 200 may direct the authorized mobile device 200 to an illustrative distributor of the authorized mobile device 200.

Additionally, the centralized resource server 302 may be configured to provide a central routing operation for cashier authentication. Thus, a cashier device may be authenticated by the appropriate distributor server 304, which may then forward an authentication to an illustrative mobile device distributor.

The centralized resource server 302 may also be configured to operate as a central authority for generation of finite decks of predetermined electronic pull-tab results.

Furthermore, the centralized resource server 302 may be configured to manage and control financial information. The centralized resource server 302 may include a centralized database 314 that stores data generated by the cashiers, authorized mobile devices, and the various gaming venues. The centralized database 314 provides a central repository for accounting data, game play data, system configuration data, and other such data types.

The illustrative distributor servers 304 are communicatively coupled to the centralized resource server 302. Each of the distributor servers 304 may be configured to manage finances for the player accounts that are associated with the authorized mobile devices. Additionally, the illustrative distributor servers 304 may be responsible for generating logs and reports required for the POS devices. Furthermore, the illustrative distributor servers 304 may be configured to manage game play operations, wagers and prizes. Further still, the illustrative distributor servers 304 may manage cashier operations including customer sales and redemptions. Further yet, the distributor servers 304 may be configured to maintain the financial status for the authorized mobile devices, including the actual credit balance on each player device.

In an alternative embodiment, the operations performed by the centralized resource server 302 and the distributor server 304 may be performed by a centralized resource software module (not shown) and a distributor software module (not shown) that may be associated with a client-server architecture, a distributed architecture, a peer-to-peer architecture, a hierarchical architecture, a "cloud" architecture or any combination thereof.

The mobile wagering sub-system 102 may also include an illustrative web portal server 316. The web portal server 316 provides a web interface to access system accounting and operational data, as well as to maintain and configure the system. The web portal server 316 is configured to support creating, editing and removing entities like distributors, operators, venues, cashiers, devices, game parameters and others as required. All actions performed on the portal are logged for auditing purposes. This action log can be access on the portal itself if the user has the necessary system privilege.

By way of example and not of limitation, the web portal server may be accessed from personal computers or tablet devices 318 over the internet. Authorized users having "administrator" privileges may access system reports and controls based upon their operational needs and organizational affiliation. The web portal server 316 supports a variety of different authorized users having different roles with different levels of access to the mobile wagering sub-system 102. For example, the web portal server may be configured to support the following roles: regulator, manufacturer, distributor with access to multiple operators, operator with access to multiple venues, a particular venue, a particular cashier and other such preconfigured roles.

An illustrative router 320 is disposed within the mobile wagering sub-system 102. The router 320 is communicatively coupled to a wide area network 322, e.g. Internet, which is communicatively coupled to the various venues and authorized users. Additionally, the illustrative router 320 is communicatively coupled to the portal server 316, the video presentation sub-system 104, each distributor server 304 and the centralized resource server 302. The router 320 forwards data packets to the appropriate server, network, internet appliance, sub-system and other such destination. Additionally, the router 320 may include a firewall that supports secure communications with the mobile wagering sub-system.

Figure 4:
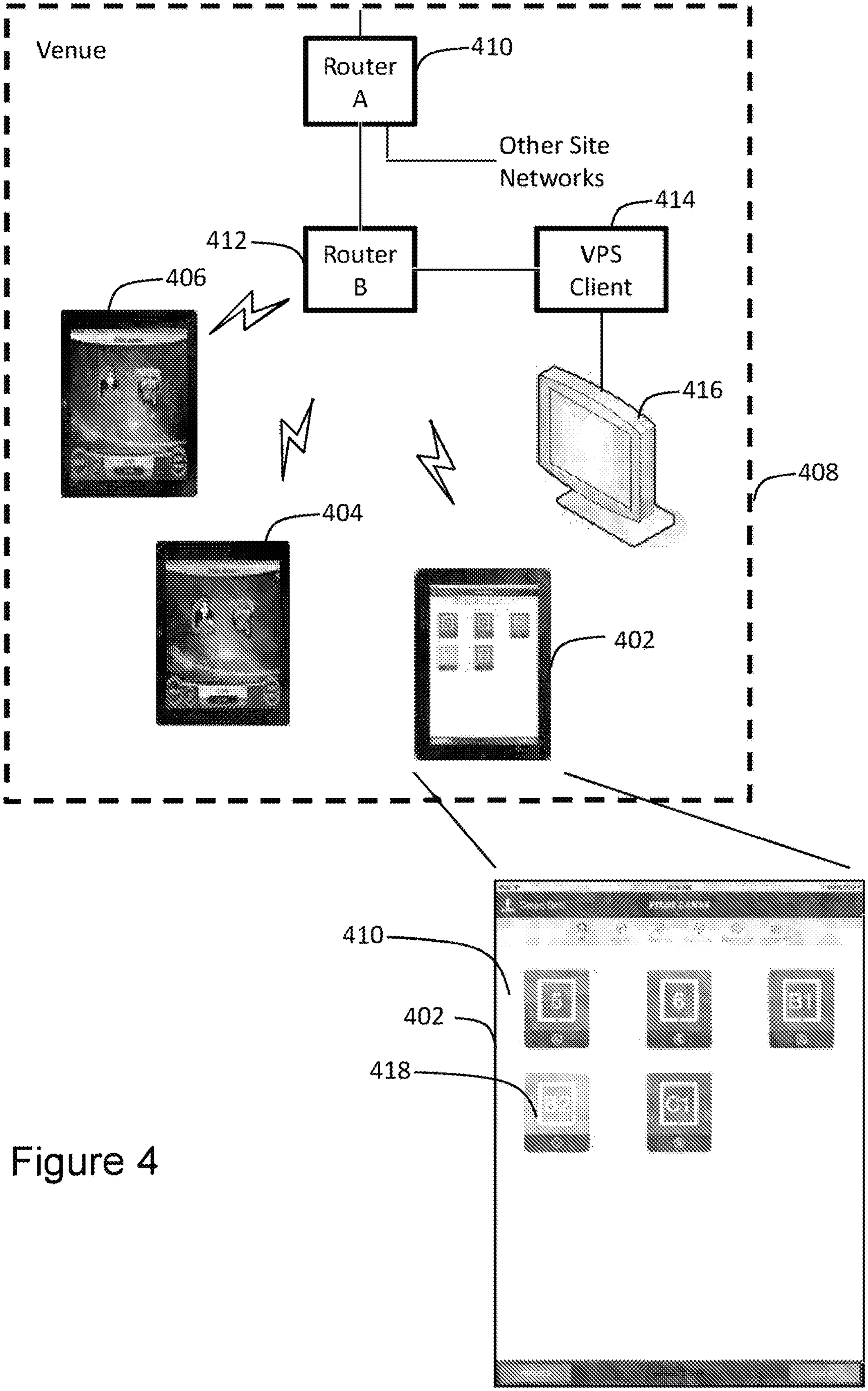
FIG. 4 shows an illustrative point-of-sale (POS) device communicatively coupled to authorized mobile devices in a gaming venue.

Referring now to FIG. 4, there is shown an illustrative point-of-sale (POS) device communicatively coupled to authorized mobile devices in a gaming venue. The illustrative POS device 402 is communicatively coupled to one or more authorized mobile devices 404 and 406 in gaming venue 408. By way of example and not of limitation, the illustrative POS device 402 is communicatively coupled to authorized mobile devices with a native Socket implementation inside a Local Area Network. An exploded view of an illustrative user interface 410 corresponding to POS device 402 is also shown.

The point-of-sale device 402 is configured to manage all cash operations such as cash-in operations and cash-out operations. The cash-in and cash-out operations may be requested by the authorized mobile device 404, the authorized mobile device 406, the POS 402 or any combination thereof.

The illustrative point-of-sale (POS) device 402 and authorized mobile devices 404 and 406 may be embodied as a mobile device as described above in FIG. 2. The illustrative POS device 402 is a client device configured to receive and operate an illustrative proprietary POS Application. The authorized mobile devices 404 and 406 are client devices configured to receive and operate a proprietary Game Application. The illustrative POS device 402 and authorized mobile devices 404 and 406 are communicatively coupled with the mobile wagering sub-system 102. In the illustrative embodiment, the client devices communicate with the mobile wagering sub-system 102 for each transaction. More generally, all wagering and accounting information is monitored and stored in the centralized gaming system 100 and the client devices always reflect the information received from the centralized gaming system 100. For reasons of security and consistency all game play decisions and financial data is hosted in the centralized gaming system and only visually reflected in the client devices.

As shown in FIG. 4, the illustrative wide area network 106, e.g. Internet, (shown in FIG. 1) is communicatively coupled to the illustrative gaming venue 408. In the illustrative embodiment, the illustrative wide area network terminates at Router A 410. The illustrative Router A 410 may be a pre-existing router located at the venue 408 and usable for multiple purposes, depending on the needs of the venue. For example, Router A 410 may be a component of a cable TV system. In the illustrative embodiment, a second Router B 412 is also communicatively coupled to router A 410. Illustrative Router B 412 is configured to support the requirements for communications with the mobile wagering sub-stem 102 and video presentation sub-system 104.

In the illustrative embodiment, router B 412 establishes two private Wi-Fi SSIDs to be used only at a specific site. Each Wi-Fi SSID includes a security key that is unique to that site and is not available to site personnel. One SSID may be used for the exclusive use of the mobile wagering system 102 and a second SSID may be provided for exclusive use of the video presentation system 104. Router B is also communicatively coupled to video presentation client 414, which is communicatively coupled to the monitor 416.

The illustrative POS 402 tablet is an electronic device that may be operated cashier in a venue. The POS device 402 provides control over financial activity within the venue. The illustrative POS Application program runs on a tablet device and supports the following illustrative operations, namely, a cash-in operation (sales), a cash-out operation (redemption) and a reporting operation.

In the illustrative embodiment, the cashier logs into the POS application program by providing a cashier user name and password. During the set-up process, the cashier name is associated with a cashier role that is associated only with a particular venue. After a successful login, the POS client retrieves relevant system information from an illustrative distributor server 302, which presents the user interface 410.

The illustrative user interface 410 associated with POS client 402 presents colored icons, in which each icon represents one of the authorized mobile devices (such as authorized mobile devices 404 and 406) in the venue 408. Note that the illustrative authorized mobile devices 406 and 408 may also be referred to as "a registered gaming client." By way of example, each icon 418 has a short identifier representing the local identification of the device, which is unique within that venue. For example, a grey icon may identify that the authorized mobile device has been registered with the mobile wagering sub-system; however, the authorized mobile device is not currently available for game play. Another illustrative icon may be a yellow icon, which represents that the authorized mobile device is present and available. A green icon may represent that the authorized mobile device has credit and is involved in a game session. A red icon may represent that a player input has been received that relates to a HELP button input command, a cash input command or a cash output command.

In operation, an illustrative cashier that is interactive with the user interface 410 may select an icon associated with a particular authorized mobile device. After selecting the appropriate authorized mobile device, the cashier may interact with another user interface that enables the cashier to add cash to the authorized mobile device, to enable a player cash-out from the authorized mobile device, to display a log of recent play and transactional activity, which may be retrieved from the illustrative centralized resource server, the distributor server or any combination thereof.

A variety of other user interfaces may also be presented in the point-of-sale device. For example, a user interface may be presented that allows the illustrative cashier to access reports and to log-out from the POS device. For example, a reports screen may be presented that summarizes the business activity of the current day, the previous day or a historical period. The reports may include data regarding cash-in sales (in dollars), awarded prizes (in US Dollars) and net revenue, which is the difference between the cash-in sales and the awarded prizes. The illustrative reports screen may be refreshed in real time or in pseudo real time.

By way of example and not of limitation, a player may interact with the centralized gaming system 100 by purchasing play credits, e.g. funds, at the POS device 402. For example, the illustrative player requests an amount of credit and pays the cashier at POS device 402. Subsequently, a POS session is established with the central database 314 (shown in FIG. 3) when the illustrative distributor server 304 receives a cash-in message from the POS client device 402. The illustrative cash-in message identifies the player account session amount, the identification of the authorized mobile device to which the POS player session amount is linked and the identity of the POS device initiating the transaction. The distributor server 304 acknowledges that POS transaction and provides update information to the specific game client indicating the amount of available at credit. In addition, a player may elect to add credit to an existing player account balance by purchasing such credit from a cashier, who may use a POS ADD CASH function to record the transaction in the server database and update the available credit total.

Figure 5:
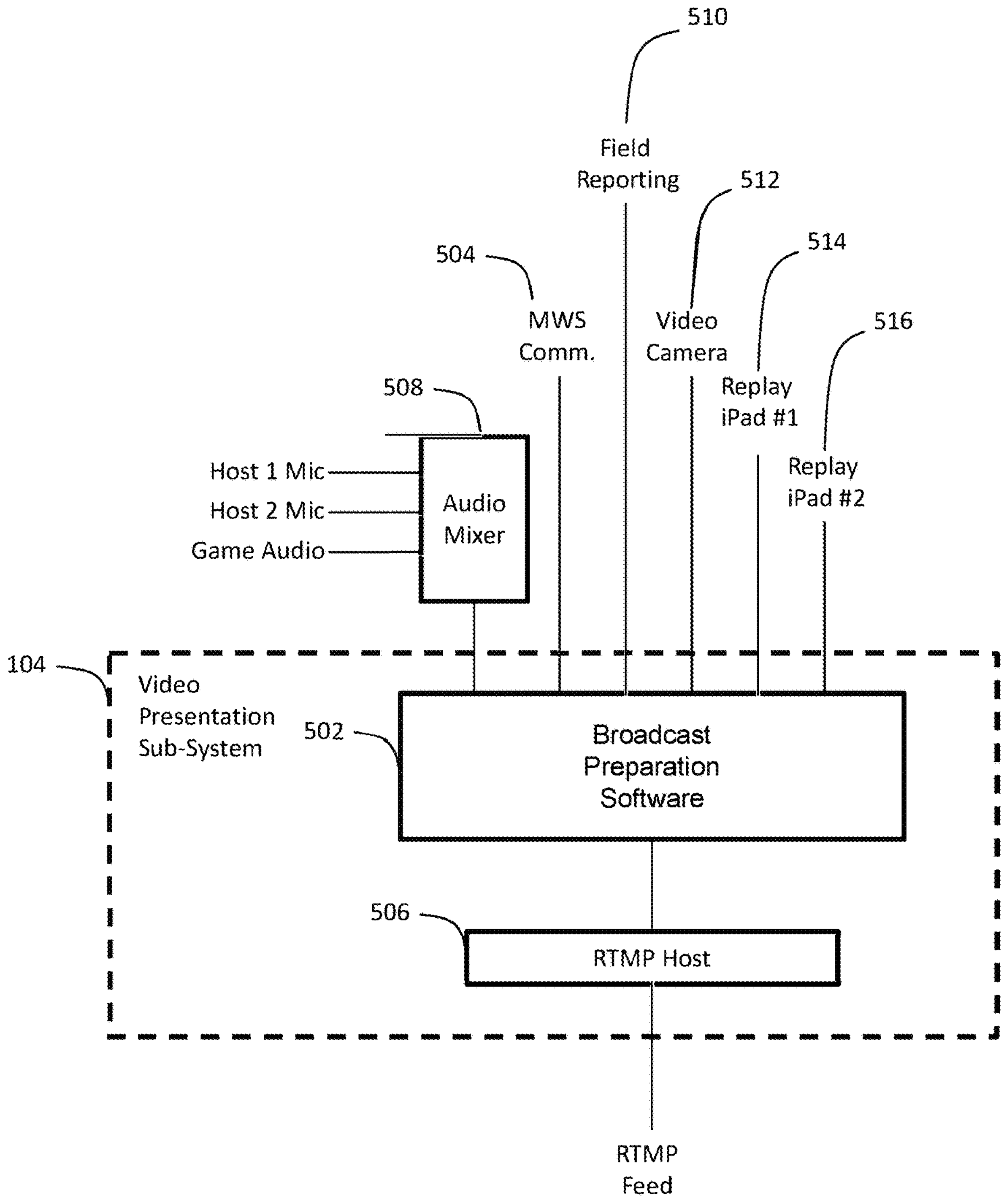
FIG. 5 shows an illustrative Video Presentation System.
Figure 6:
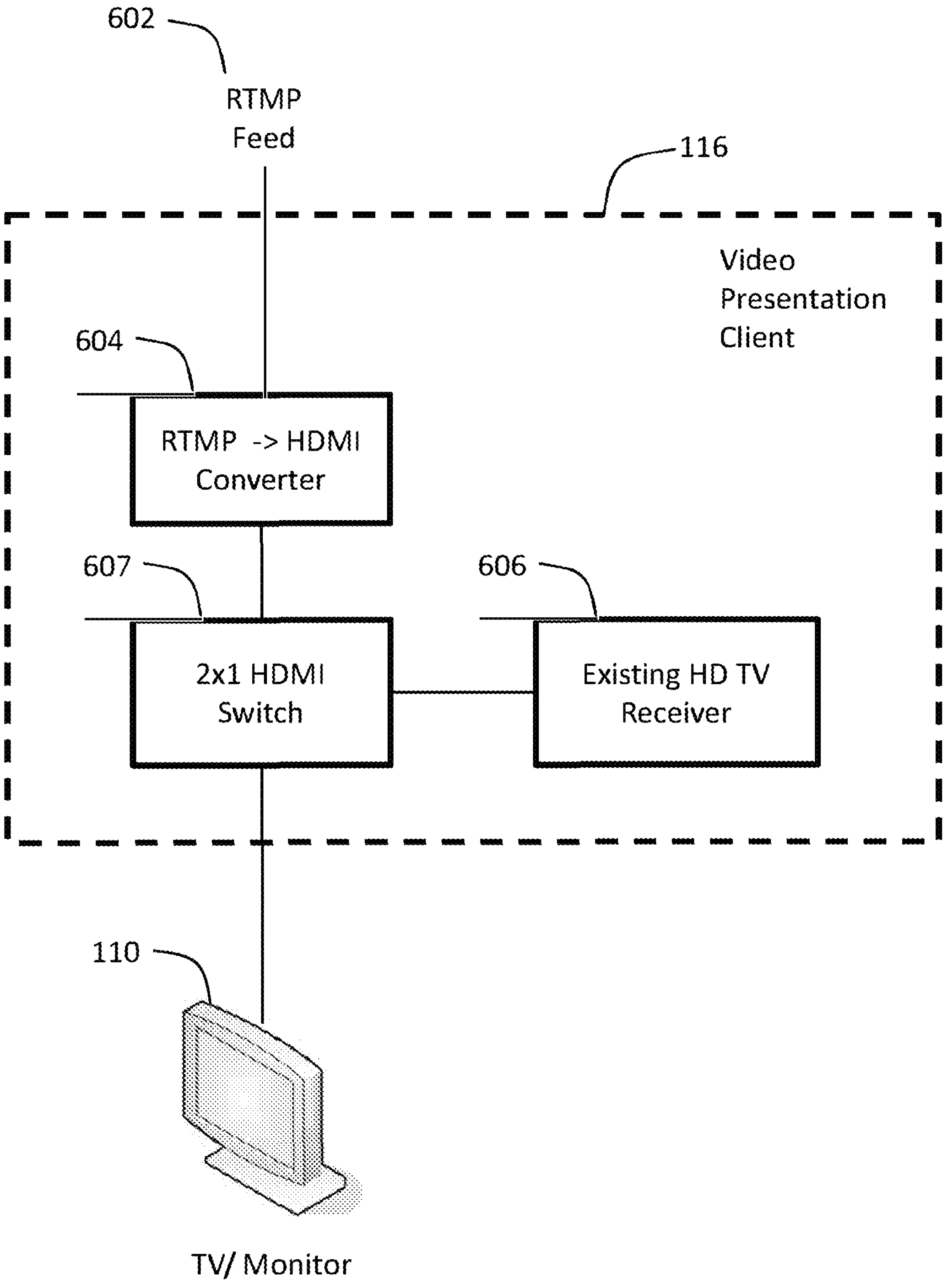
FIG. 6 shows a more detailed view of an illustrative video presentation sub-system (VPS) client.

Referring to FIG. 5, there is shown an illustrative Video Presentation System (VPS). In the illustrative embodiment, the video presentation system (VPS) 104 delivers television content to venues communicatively coupled to the centralized gaming system 100 shown in FIG. 1. The illustrative VPS 104 is communicatively coupled to a VPS client 116, which is also shown in FIG. 6 below.

By way of example and not limitation, the VPS 104 may be associated with linked bingo tournament (LBT) games. This content presented on illustrative monitors 110 (shown in FIG. 1) complements the game experience on the authorized mobile devices 112. Additionally, the content presented on monitors 110 is configured to involve other patrons at participating venues who are not participating in the games. This may create a social gaming environment that may appeal to a broad spectrum of players.

The illustrative VPS 104, shown in FIG. 5, includes a plurality of inputs that the system may incorporate into broadcast content. For example, communications with the MWS 102 may include a data feed generated by the MWS 102, which provides real time data on the status of an illustrative tournament. The illustrative data feed may include player names, player scores, remaining plays for player game sessions, time remaining in the tournament, prize values and other such tournament information.

A broadcast preparation software module 502 is configured to integrate a plurality of inputs into a broadcast data stream. In the illustrative embodiment, the integration is performed by a suite of commercial products such as Open Broadcaster™, Quicktime™ and proprietary software products. The tasks performed by the broadcast preparation software module 502 includes formatting an illustrative mobile wagering sub-system data feed 504. Note, the mobile wagering sub-system data feed 504 is generated by the mobile wagering sub-system 102. The mobile wagering subsystem data feed 504 includes information such as the tournament leader information, which can be converted into an easily readable display format.

For example, the mobile wagering sub-system data feed 504 may be transmitted over the Internet to a Real Time Messaging Protocol (RTMP) host 506, which may then transmit the data signal from the illustrative RTMP host 506 using an RTMP protocol over the Internet to the illustrative VPS client 116.

The broadcast preparation software module 502 may also be configured to interface with an illustrative audio mixer 508, which accepts a variety of audio feeds. The illustrative audio feeds received by the audio mixer 508 include host microphones and audio from selected live game play; a wide variety of such devices are commercially available. Additionally, the broadcast preparation software module 502 is configured to provide live field reporting 510 from game locations using a tool such as Facetime™. Live field reporting 510 may add excitement to the broadcast. Furthermore, the broadcast preparation software module 502 is configured to interface with various video signals that include studio video cameras 512 and live images captured from illustrative authorized mobile device and replayed as feed 514 and feed 516.

A Linked Bingo Tournament (LBT) is a variation of high-speed electronic bingo, in which players win prizes based on a series of bingo games played against other players for prize points during a predetermined interval. In the illustrative linked bingo tournament (LBT), players are charged a fee to enter the tournament. Similarly, to the high-speed bingo game described above, all bingo games in the tournament are played against other tournament players. In the LBT bingo game winners are awarded points, instead of cash. At the end of the predefined tournament play period, cash prizes are given out to the players that have achieved the highest and/or lowest point scores during the course of the tournament. A pre-determined percent of the entry fees may be allocated for prizes to players.

Tournament play continues until all players have completed their allotted number of pays or the tournament time expires.

A special provision may be made to cover the case where a player is trying to play a game and cannot complete it because bingo requires a competitor, and all other players may have completed their allotted games. In one illustrative embodiment, the player in that condition receives a predetermined allotment of points.

Referring to FIG. 6, there is shown a more detailed view of an illustrative video presentation sub-system (VPS) client 116. In the illustrative embodiment, the VPS client 116 is communicatively coupled to the video presentation subsystem 104 via an illustrative wide area network, e.g. Internet, and a local wireless connection, e.g. local Wi-Fi. The illustrative RTMP feed 602, which is generated by the RTMP host 506, is received by the VPS client 116. The VPS client is also operationally coupled to the illustrative stationary monitor 110.

The RTMP feed 602 is received at an illustrative gaming venue and the RTMP feed 602 is routed to the VPS client 116. By way of example and not of limitation, the RTMP feed 602 is communicated using a dedicated and secure Wi-Fi channel. In the illustrative embodiment, the RTMP feed 602 includes a streaming video data steam, which is converted to a video display signal. For example, the RTMP feed may be converted to an HDMI video signal with an RTMP/HDMI converter appliance 604. For example, the RTMP/HDMI appliance 604 may be implemented with special purpose firmware inside an embedded computing element, such as a Raspberry PI™. The resulting video signal generated by the RTMP/HDMI appliance 604 is then sent directly to a compatible television or sent to the television using a commercial 2×1 switch 607, such as the Fosman™ 8024, which may also be coupled to an existing HDTV data source such as receiver 606.

The illustrative converted HDMI video signal is then presented the stationary monitor 110. This allows for a variety of installation models. Where there is a television dedicated to use with the VPS the output of the special purpose converter 604 may be left permanently connected to the television 110. If the television is used for different purposes at different times the data feed to the television can be switched on or off with the introduction of the 2×1 HDMI switch 604, allowing normal use of the television when the VPS data feed is not in use.

The centralized gaming system 100 described in FIG. 1 through FIG. 6 supports a variety of different types of games and game play. For the illustrative mobile wagering subsystem 102, a game session is initiated after a wager is received and the game session ends when game play is completed, when a prize is awarded, or according to any other predetermined game mechanic that reflects the game session has ended.

A variety of different game mechanics may be associated with each game session. For example, a tournament game awarding a limited number or prizes may present player rankings for prizes awarded to the ranked players.

The player rankings may then be presented on one or more of the authorized mobile devices 112. Additionally, the player rankings may result in the video presentation subsystem 104 generating a player rankings tournament session output that is presented on the stationary monitors 110.

Figure 7A:
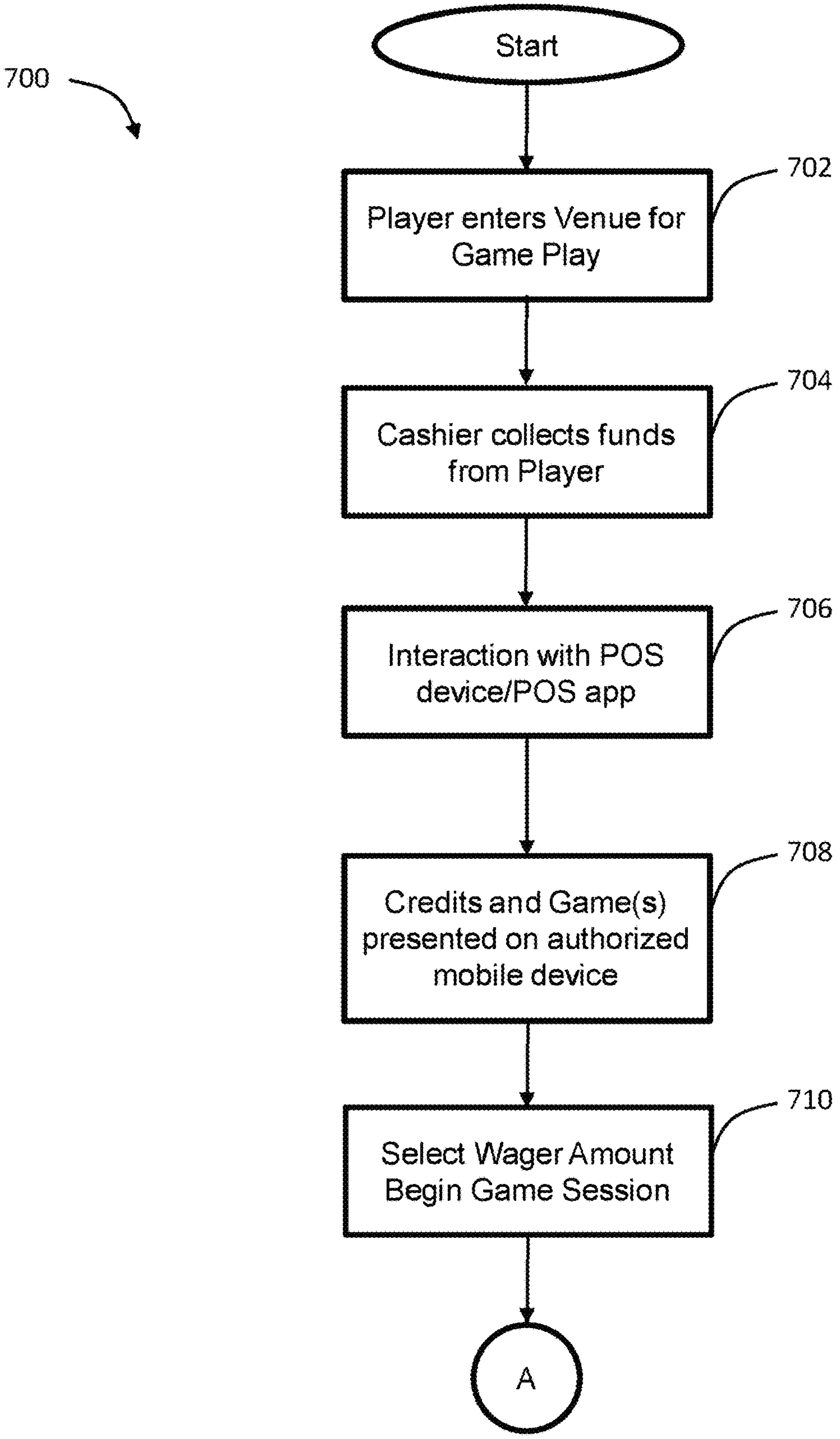
FIGS. 7A and 7B show an illustrative centralized gaming method that describes the various steps performed by a player interacting with the gaming system.
Figure 7B:
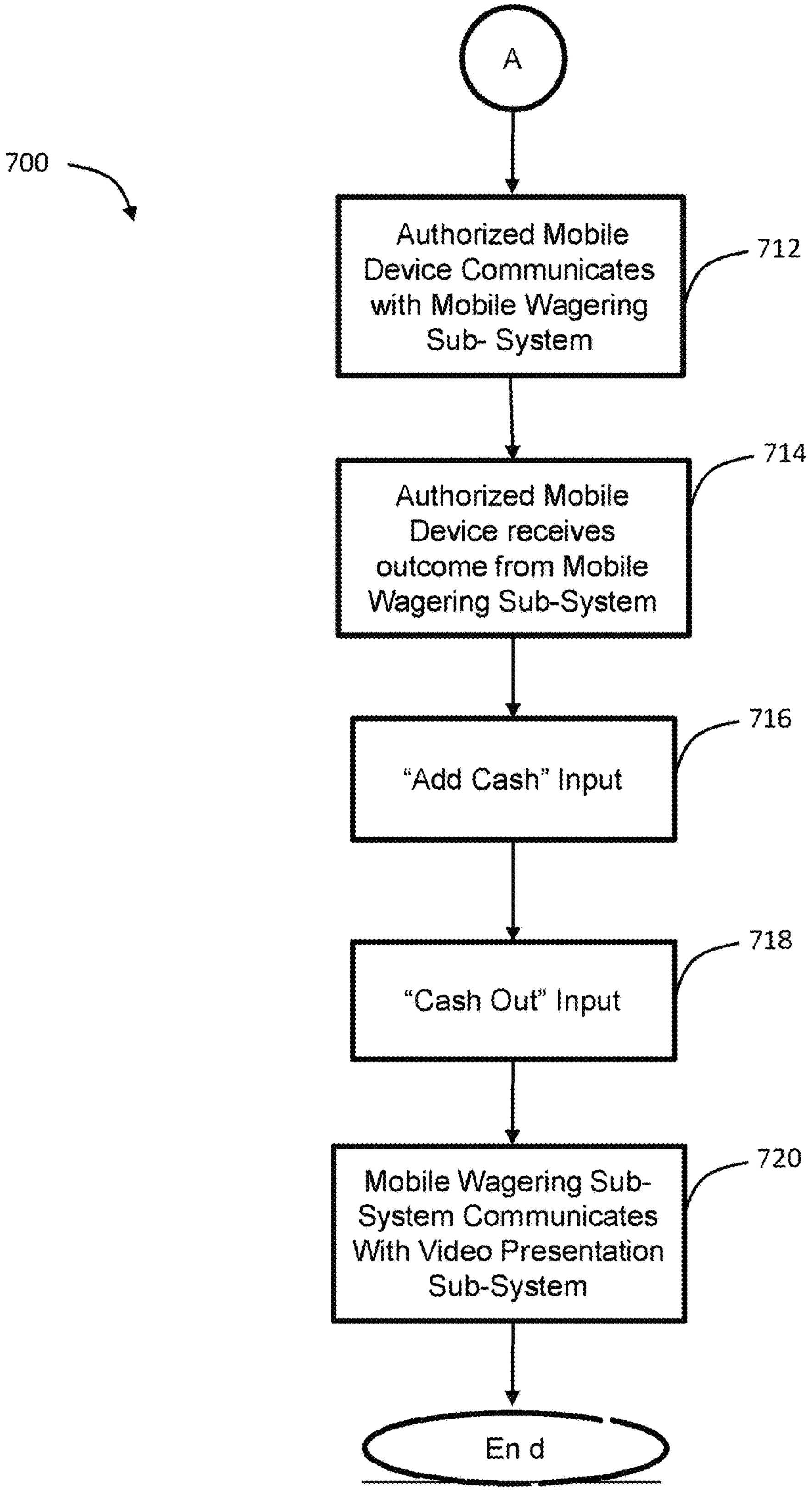

Referring to FIG. 7, there is shown an illustrative centralized gaming method that describes the various steps performed by a player interacting with the gaming system. The illustrative centralized gaming method 700 is at block 702 where an illustrative player enters one of the venues and indicates to the cashier or similar venue employee that the player wants to initiate game play with the centralized gaming system 100. The method then proceeds to block 704 where the illustrative cashier collects monetary funds such as cash, e-money, debit card, credit card and other such monetary funds as are appropriate depending on jurisdictional regulatory requirements.

At block 706, the illustrative cashier then proceeds to interface with a Point-Of Sale (POS) application on a device such as POS device 114. In another embodiment, the player may interface with a kiosk version of the POS device 114 without the need to interact with a venue employee. In yet another embodiment, the POS application may be running on an authorized mobile device 112 and the player may interact directly with the POS application.

While interfacing with the POS device or POS application at block 706, the illustrative cashier identifies the authorized mobile device 112 associated with the player. The illustrative cashier then proceeds to enter the amount of credits to add to the authorized mobile devices. This amount of credits is stored in illustrative central database 314 (shown in FIG. 3).

At block 708, the total credits, which correspond to the collected funds, are presented on the authorized mobile device 112. The player may then interact with a game application running on the authorized mobile device. The player may also select from a variety of different game applications, which may be presented as a menu of games displayed on the authorized mobile device 112 screen. In operation, various game screens corresponding to the chosen game are presented to the player.

At block 710, the player can select a wager amount for a particular game session. In the illustrative embodiment, the wager amount includes the number of credits the player has selected to be wagered. Depending on jurisdictional requirements wager amounts can be expressed in dollars and cents (or other local currency) or in terms of credits, where each unit of credit has a monetary value. By way of example and not of limitation, the player may then initiate a game session by pressing a PLAY button, which is an illustrative game input received by the authorized mobile device 112.

At block 712, a game request is sent from the authorized mobile device 112 to the mobile wagering sub-system 102. The mobile wagering sub-system 102 processes the game request. In the illustrative embodiment, the mobile wagering subsystem 102 determines a prize result and a graphic representation (or representations) of the prize result. Additionally, the mobile wagering sub-system 102 logs the transaction, updates database game information, and updates an accounting module to reflect the amount spent and player winnings corresponding to the game session. Furthermore, the mobile wagering sub-system 102 sends a response message (or messages) to the authorized mobile device specifying the information to be displayed and the new value of the player account.

The method then proceeds to block 714 where the authorized mobile device 112 receives the outcome(s) from the mobile wagering sub-system 102. For example, the authorized mobile device 112 is configured to present animations and other results associated with the game session. The authorized mobile device 112 may also include an updated accounting of total credits and the prize amounts awarded. After the game session is completed, the player can return to the game menu at any time and select a different game to play or can start a new game session for the chosen game type and denomination.

At block 716, the authorized mobile device receives an "Add Cash" input. By way of example, the player decides to add funds to their play amount by providing the "Add Cash" input, which alerts the illustrative cashier that the player wants to add cash to their player account session total. The cashier then proceeds to interact with the POS device 114 or POS App (not shown). The illustrative cashier then proceeds to enter the amount of credits to add to the authorized mobile devices and the credits are stored in the illustrative central database 314.

At block 718, the authorized mobile device receives a "Cash Out" input. For example, when the player has finished a game session and wants to "Cash Out" the player presses a "Cash Out" button on the authorized mobile device 112. In the illustrative embodiment, after the authorized mobile device receives the "Cash Out" input, the illustrative cashier is notified that the player desires to "Cash Out." Using the POS device 114 of the POS App (not shown), the illustrative cashier selects the "Cash Out" input and obtains the total credits remaining on the authorized mobile device after has completed one or more game session. The remaining player account total information is received from the mobile wagering sub-system 102. The cashier pays the player the amount due and confirms the payment at the POS. The client device is then available for use by another player.

The method then proceeds to block 720 where mobile wagering sub-system 102 is configured to communicate with the video presentation sub-system 104. At block 720, the video presentation subsystem 104 receives game play information and integrates it with other data sources as described above. The video presentation subsystem 104 generates a video presentation that is broadcast via a private network to participating gaming venues. As described above a stationary monitor 110 is communicatively coupled to the video presentation sub-system 104 via the video presentation client 116. The stationary monitor client is configured to receive and present the game output generated by the video presentation sub-system. In one illustrative embodiment, the video content is designed to provide enhanced content to the players and to increase the interaction between the players and the games. Additionally, the video content adds interest and excitement to the games. In addition to game-specific content, such as broadcasting a live tournament, the system can be used for a multitude of purposes, including, but not limited to, announcements and pictures on winners, informational videos about sponsoring charities, announcements of new games and upcoming events, advertising, etc.

Figure 8A:
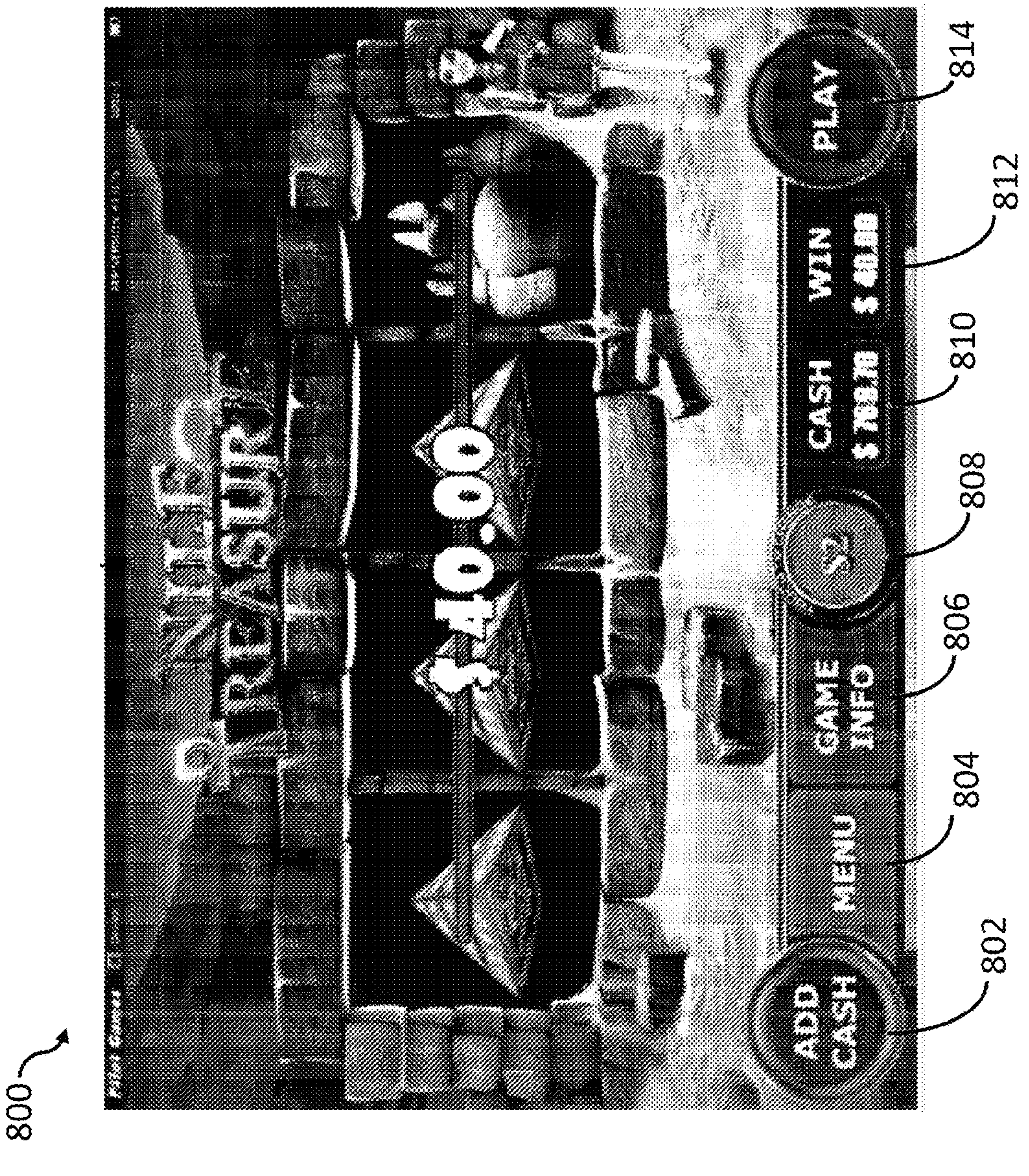
FIGS. 8A and 8B show a plurality of screen shots for illustrative electronic pull-tab games.
Figure 8B:
Figure 8B:

Referring to FIGS. 8A and 8B there is shown a plurality of screen shots for an illustrative electronic pull-tab game. A variety of control buttons provide player inputs that are received by the authorized mobile device 112.

The player inputs shown in the FIG. 8A screen shot 800 includes an "Add Cash" control button 802, a "Menu" control button 804, a "Game Info" control button 806, a "Denomination" amount control button 808, a "Cash" credit counter 810, a "Win" credit counter 812, a "Play" control button 814.

More specifically, the "Add Cash" control button 802 is associated with a player input that allows the player to signal to the POS device 114 that the player wants to add more cash to the player account session. The "Menu" control button 804 allows the player to return to the game selection menu screen. The "Game Info" control button 806 provides access to screens which define prizes and rules of play. The "Denomination" amount control button 808 displays the current denomination and repeated presses of the Denomination amount control button may change the displayed denomination and cause the game to switch to a different finite pool. The "Cash" credit counter 810 displays the available cash credit balance that is available for game play. The "Win" credit counter 812 displays the amount won in the prior game session. For the illustrative pull-tab game, the "Play" control button 814 initiates a game session.

Referring now to FIG. 8B there are shown two screen shots associated with an illustrative game session. Screen shot 820 shows an unrevealed state corresponding to the pull-tab game before the authorized mobile device receives the "Play" game input. After receiving the "Play" game input, the illustrative game session is initiated and then the pull-tab game outcome is presented in a fully-revealed state as shown in screen shot 822.

As stated throughout, the mobile wagering sub-system 102 determines the outcome that is presented in the fully-revealed state presented in screen shot 822.

The pull-tab games presented herein include an auto-close option that may be selected by the operator, for any game played at a particular venue. The auto-close option automatically replaces a finite game pool with a new pool when all prizes exceeding a predetermined value for the deck have been exhausted and the game may no longer be desirable by players. When the auto-close option is turned "ON," a deck may automatically close and be replaced by a new deck when prizes over a game specific value set in the portal are gone. For example, a game may have 3 large value prizes and when the last prize is awarded, the deck may close and a new deck may open. By way of example and not of limitation, the auto close option is identified in the client game information when it is active, so players may know that it is active. A notification may also be given to all active clients when a new deck is open. This feature is attractive to players because they are always assured that there are always some valuable prizes remaining in a deck they may be playing.

There are a variety of other game features for the illustrative pull-tab games that include providing a reveal mechanism that displays the symbols in portions of the screen to create player anticipation. Another game feature includes background music that is unique to the game theme. Another game feature may include a sound that is triggered when each symbol is revealed; and the sound may be different for each game. A further game feature includes a prize rollup sound which is common to all games. Yet another game feature includes a celebration sound on all big wins. Additionally, game features may include a change in music during bonus rounds. Another game feature may include a prize rollup on the base game screen after a bonus round. A still further game feature may include symbols that slide in from the side or other such animated presentation. Yet another game feature includes game specific math that complies with jurisdictional Rules and Statutes.

Figure 9A:
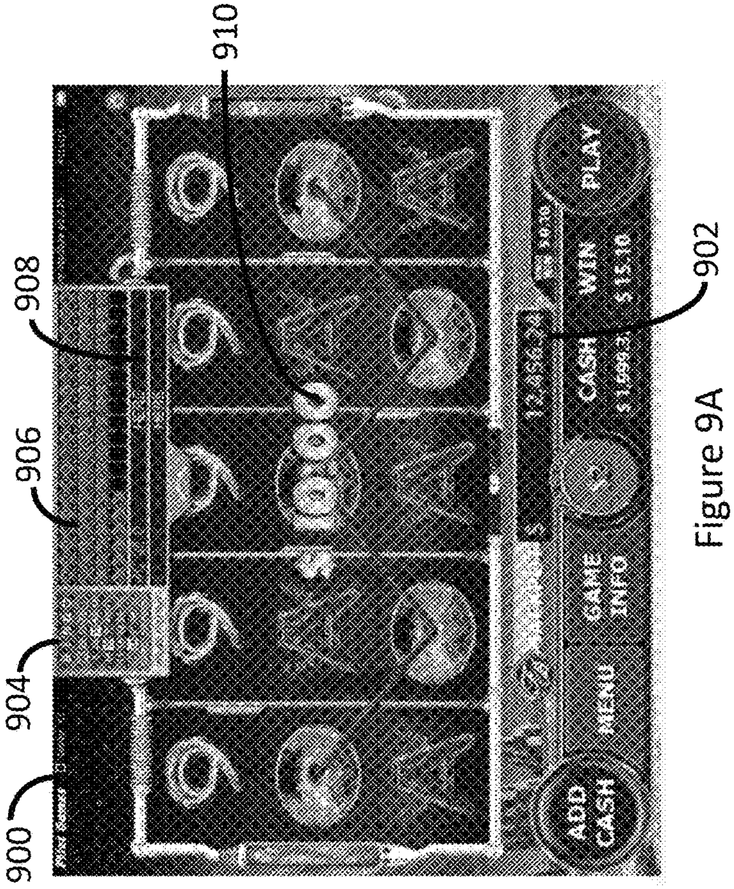
FIG. 9A shows a screenshot of an illustrative high-speed bingo game.

Referring to FIG. 9A there is shown a screenshot 900 of an illustrative highspeed bingo game. The illustrative high-speed bingo game may be referred to as FLASH BINGO™. The panel displayed on the game screen is similar to the one displayed for the pull-tab games, with the addition of a Jackpot Display 902, which presents the current value of a progressive game jackpot. In the illustrative embodiment, the jackpot size increases every play for the bingo game by a percentage of the wager amount; the percentage may be set as one of the portal control functions.

Additionally, the screenshot includes an image of a bingo card 904 that is assigned to the player by the mobile wagering sub-system 102. The illustrative bingo card 904 includes twenty-four (24) numbers, a free space in the middle and four (4) randomly located bonus squares. The panel also has a space for displaying ball draw results 906 from a set of 75 bingo numbers. Additionally, the panel includes a results display area 908 for displaying bingo game results in a summary line. The largest portion of the illustrative screenshot 900 includes an entertainment display which is animated and displays the results of the bingo game in an entertaining format. In the embodiment shown the entertainment display portion includes a symbol matrix display 910, where matching sets of symbols are used to equate to prize values generated from the bingo game.

The illustrative high-speed bingo game is played between players across the network who desire to play the game at approximately the same time. The illustrative high-speed bingo game is played by having the authorized mobile device 112 communicate with the mobile wagering sub-system 102, and the results generated by the mobile wagering sub-system 102 are communicated to the authorized mobile device 112, which presents the bingo game results in an entertaining manner that awards a prized that matches the bingo win.

In the illustrative embodiment, the high-speed bingo game includes two winning patterns, a Four Corner pattern, which is won by the first player (or players) to get all four corners of their bingo card called, and a Small Frame, which is won by the first player (or players) to complete the set of eight squares surrounding the center square. The illustrative game session for a high-speed game is initiated when a player touches the PLAY button to initiate the game session. The next game event includes having the bingo display area 906 "drop down" and shows a blank bingo card and draw. A message is sent to the mobile wagering sub-system 102 requesting the initiation of a game session. The mobile wagering sub-system 102 determines if other players have made a similar request. If no other player is found in a specified time period, then the initial play request is aborted and the cash balance in the player account is refunded the play amount.

If at least one other player is found within a specified wait time, then a bingo card is assigned to each player and the game is played rapidly by the mobile wagering sub-system 102. As an example, the total time for the MWS to process the wager may be under one second. The mobile wagering sub-system 102 then sends game information and results to each participating client. The game information broadcast by the mobile wagering sub-system 102 may include bingo card numbers, the location of bonus squares, color coded ball draw results (green for completion of the Four Corner (4C) game and blue for completion of the Small Frame (SF) game), results summary lines, prize value for each authorized mobile device and other such bingo game information.

With continuing reference to FIG. 9A, the illustrative mobile application running on the authorized mobile device 112 displays the bingo card 904 and bonus squares. Additionally, the illustrative mobile application displays the ball draw in sequence and indicates squares on the bingo card image 904 that have been called. The authorized mobile device also displays the results summary line 908, which shows the results of the illustrative four corner competition and the status of the small frame competition.

Figure 9B:
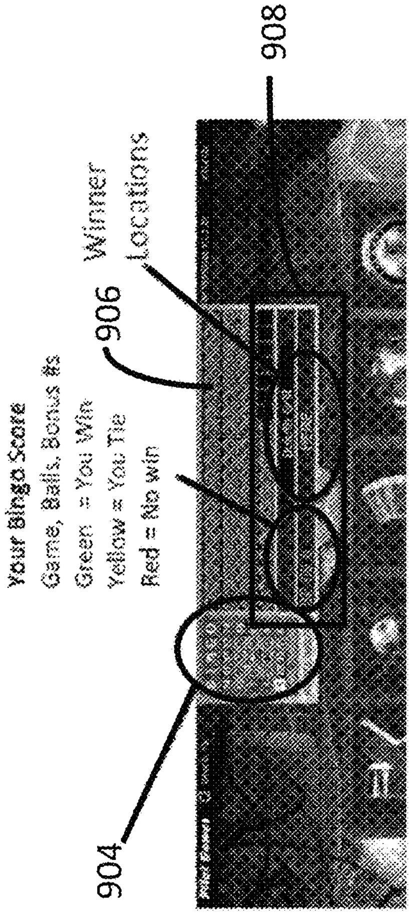
FIG. 9B shows further detail of the results summary line.

Referring now to FIG. 9B there is shown further detail of the bingo card image 904, ball draw results 906, and the results summary line 908. By way of example and not of limitation, the results summary line 908 includes a) an abbreviation for the pattern type (4C or SF); b) the number of balls that it took to win the pattern; and c) the number of bonus squares that were in the winning pattern and the venue name(s) of all the participants(s). Note that fields a, b, c may be color coded. Green means that this player was a winner; red means that another player was the winner; and yellow means that the player was tied with another player or players for the win.

The illustrative authorized mobile device 112 includes a touch sensitive display with visual elements that can be pulled or retracted or retracted from the touch sensitive display. For example, a tab may be "up" and not visible as it moves down during the game session to enable the player to see the bingo play and then automatically moves upwards and out of sight when the entertainment display begins. If the player touched the tab to "pull down" the display it may remain down during all phases of the play cycle.

In one example of the Flash Bingo game called Martian Invasion, the prize structure includes prizes for being the first card to complete a winning pattern such as a four (4) Corner Winner may receive 2.5% of the total wagered on the game by all participants and the Small Frame winner may receive 2.5% of the total wagered on the game by all participants. The illustrative Martian Invasion $2 theme may also have bonus prizes as follows:

| Number of Balls | Bonus squares in the winning pattern | Prize |
|---|---|---|
| 4 Corner Bonus prizes (all winners of the 4-corner game are eligible) | | |
| 5-10 | 1 | $200.00 |
| 5-10 | 0 | $150.00 |
| 11-15 | 1 | $100.00 |
| 11-15 | 0 | $70.00 |
| 16-20 | 1 | $50.00 |
| 16-20 | 0 | $40.00 |
| 21-30 | 1 | $25.00 |
| 21-30 | 0 | $15.00 |
| 31-35 | 0 | $10.00 |
| 36-40 | 0 | $6.00 |
| 41-45 | 0 | $3.00 |
| 46-75 | 0 | $1.00 |
| Small Frame Bonus Prizes (all winners of the Small Frame game are eligible) | | |
| 8-35 | 1 | $260.00 |
| 8-35 | 0 | $500.00 |
| 36-40 | 1 | $75.00 |
| 36-40 | 0 | $98.00 |
| 41-50 | 0 | $24.00 |
| 51-55 | 0 | $11.00 |
| 56 r more | 0 | No Bonus Prizes |

Progressive prizes may also be associated with high-speed bingo game presented in FIG. 9A. All players playing the same denomination, regardless of the Flash Bingo game theme chosen, participate in the same progressive jackpot game, with the same contribution percentage and the same probability of winning that prize. For example, the probability of winning that prize, which occurs when the 4-corner pattern is covered in 4 balls, is 0.00000082, or odds of 1 in 1,215,450. The game provider may provide a jackpot seed amount, and the jackpot may accumulate based on a percentage contribution from all Flash Bingo play. Although all players playing the same denomination contribute to and are competing for the same progressive jackpot prize, bingo games are specific to a particular game theme, so a player that has selected one game theme may only compete with another player or players who select that same theme. For example, the progressive jackpot for the $2 game denomination may have an initial prize of $5,000, or more. Player contributions may be set to 2%.

Figure 10:
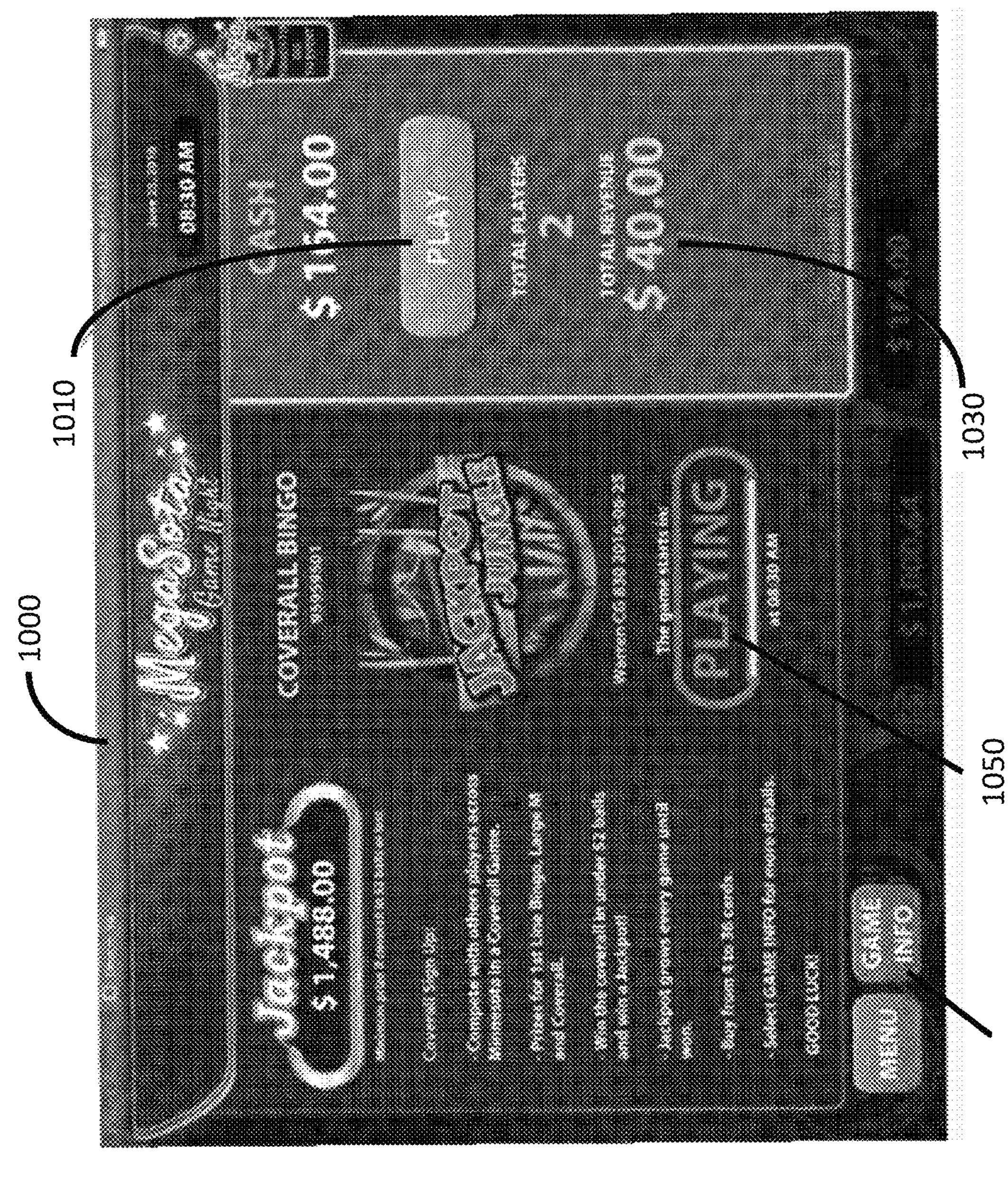
FIG. 10 shows a screenshot of bingo game play.

Referring now to FIG. 10, there is shown a screenshot 1000 of bingo game before the player initiates game play. In the illustrative embodiment, the player may be required to touch the PLAY button 1010 to enter the game after the game countdown goes to zero. When it is time for the game to start, the number of players enrolled in the game and the total revenue 1030 may be displayed on the right side of screenshot 1000. Additional game information including rules and prizes may be provided by having the player touch the "Game Info" button 1040. When the bingo game play is occurring, the status 1050 indicates that the bingo game is being played and the player should press the PLAY button 1030 to join the game. When the game is joined, FIG. 10 illustrates the main game screen which may display up to 5 cards. If the player has more than 5 cards in play the screen can be scrolled or moved to show the additional cards, 8 to a screen.

Figure 11:
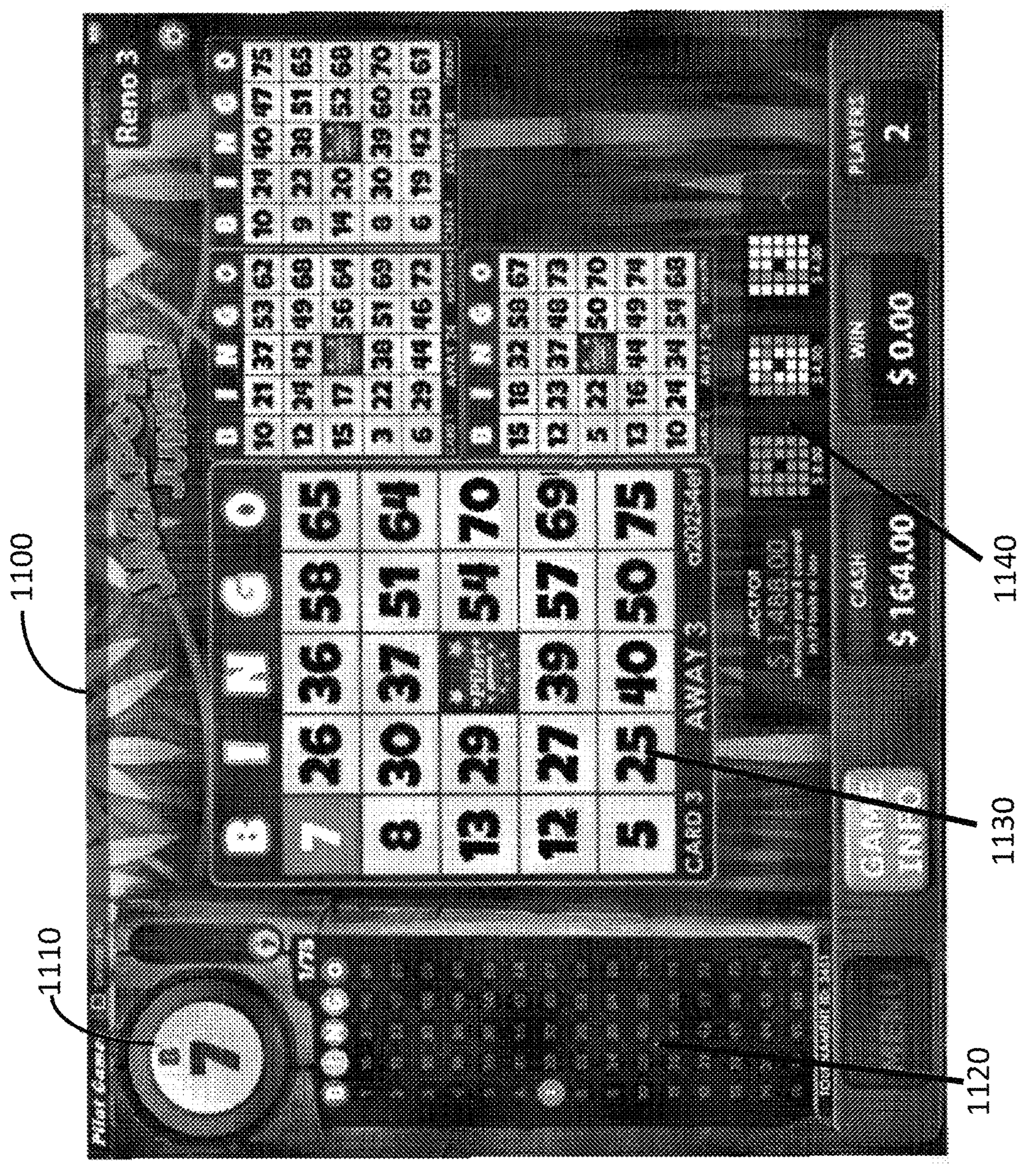
FIG. 11 shows an illustrative screenshot of bingo game play with multiple bingo cards.

Referring to FIG. 11, there is shown an illustrative screenshot of bingo game play with multiple bingo cards. In the illustrative embodiment, the large card on the first screen is always the one that is closest to getting the next winning pattern. Each card face at the bottom says AWAY X, where X is the number of spaces that need to be filled on the card to get the next winning pattern.

In operation, the central system 100 sends down messages with the ball draws. As each ball draw is revealed the ball is shown on the screen in space 1110. The game board 1120 displays all called numbers and all player cards are marked on the screen as each ball is called. Balls are called at a settable rate in the central system 100. A typical rate may be one ball each 10 seconds, which is similar to the familiar rate that a ball "caller" in a traditional bingo hall might announce balls as they are drawn. A jackpot value may be displayed in space 1130 and the winning patterns and associated prizes are displayed in area 1140. During the ball call the game client may include audio simulating the voice of a caller calling the balls. In the illustrative embodiment, the game displayed has three winning patterns—a straight line, a large M, and a coverall or "blackout", meaning that all 24 fillable spaces are called.

Figure 12:
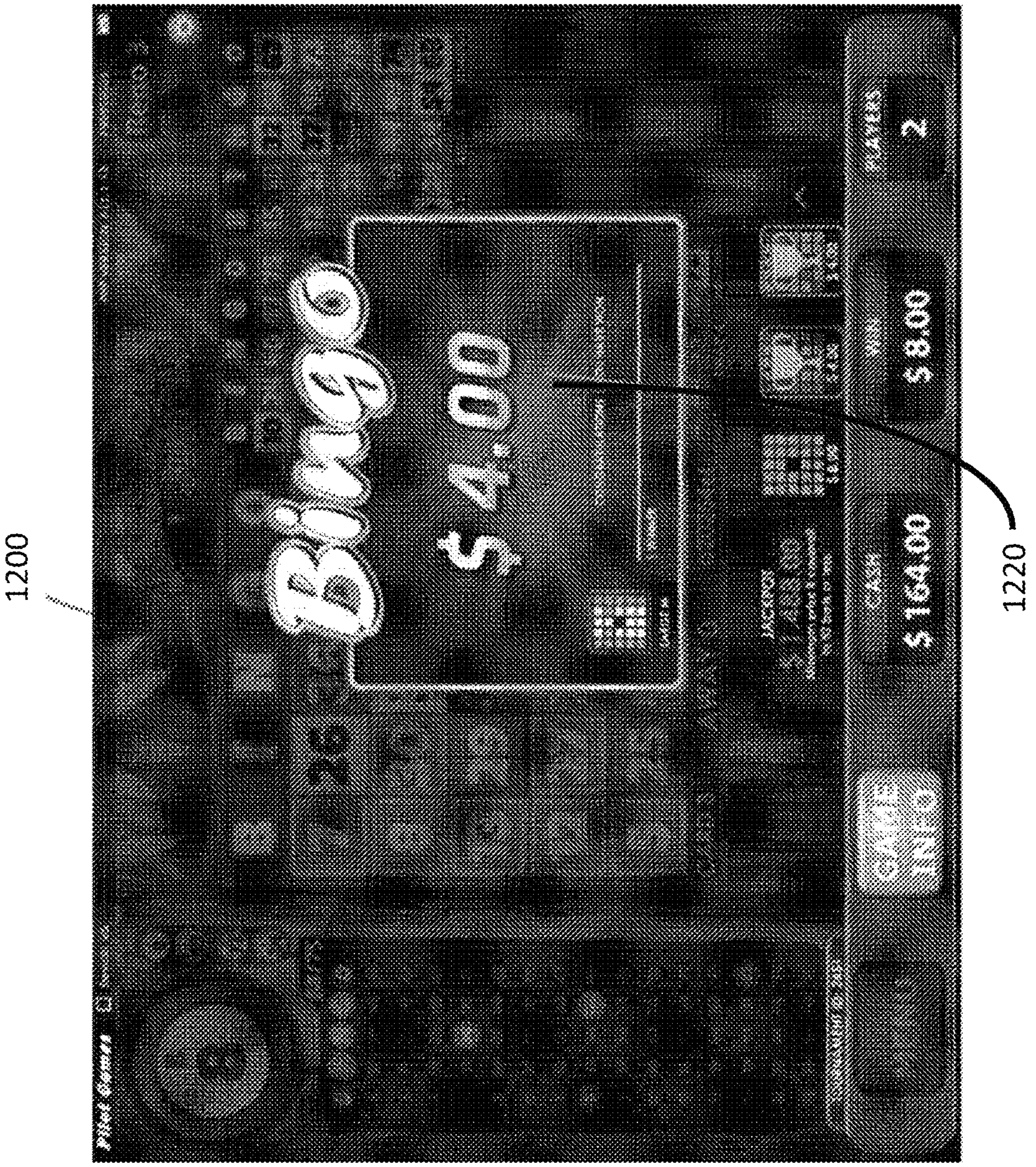
FIG. 12 shows an illustrative screenshot for a winning bingo pattern.

Referring to FIG. 12 there is shown an illustrative screenshot for a winning bingo pattern. In the illustrative screenshot 1200, the winning bingo pattern is a large M and the awarded prize 1220 is $4.00. As each prize is awarded, the corresponding authorized mobile device presents the awarded prize, e.g. $4.00. If a player is not awarded a prize, then the corresponding authorized mobile device presents a message indicating that another player has been awarded the prize, including the amount, player screen name, and location.

Figure 13:
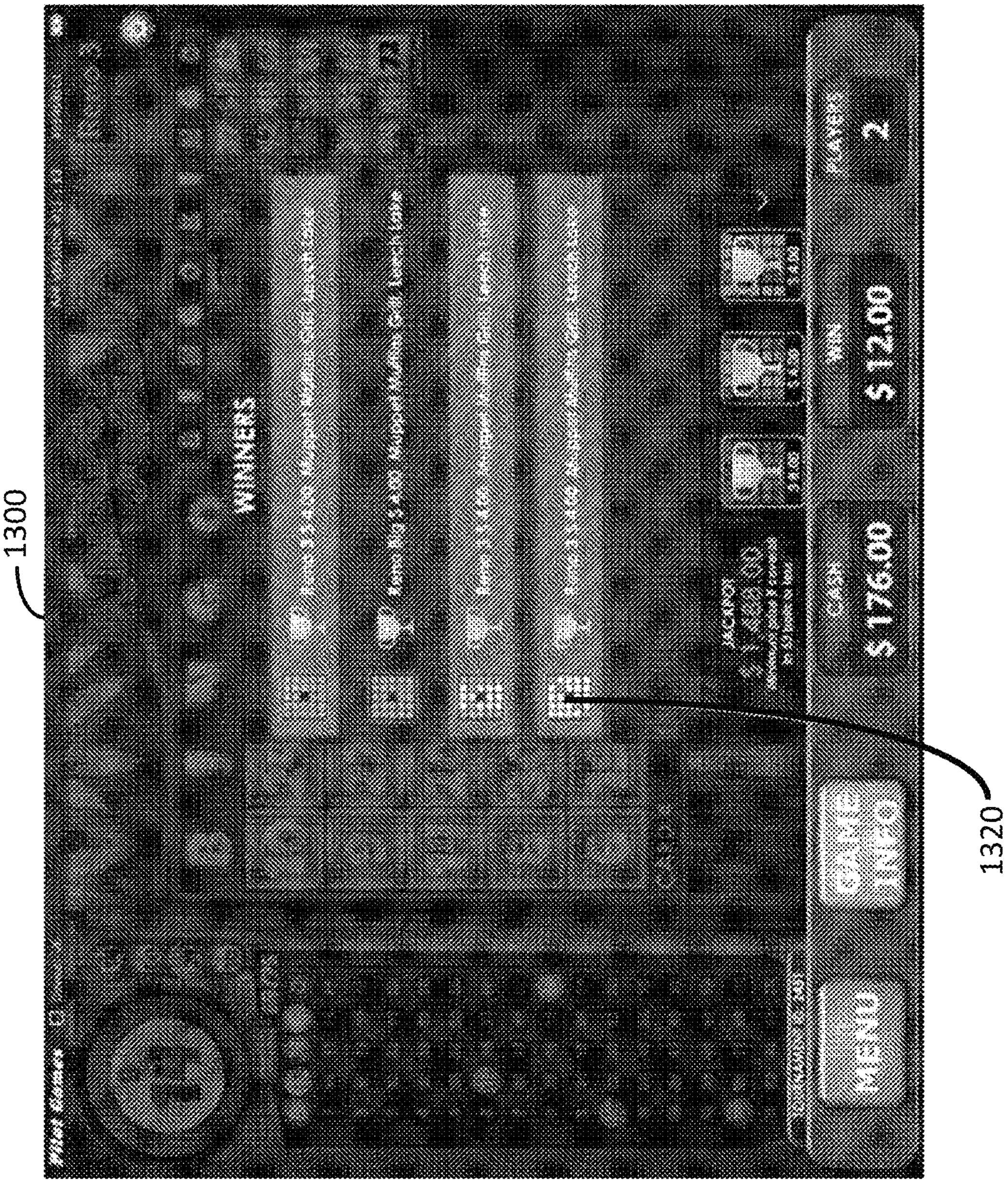
FIG. 13 shows an illustrative winner summary screenshot indicating that all prizes have been awarded for the bingo game.

Referring to FIG. 13, there is shown an illustrative winner summary screenshot indicating that all prizes have been awarded for the bingo the game. In the illustrative embodiment, the illustrative bingo game continues until all patterns are complete. At the end of the bingo game, a list of prize winners is presented to each participating player as shown in the winner summary screenshot 1300. The location, player screen name and amount for each prize awarded are presented in the winner summary screenshot 1300. Prizes may be directly added to the player account balance, except where regulatory or IRS regulation require specific processes.

Figure 14:
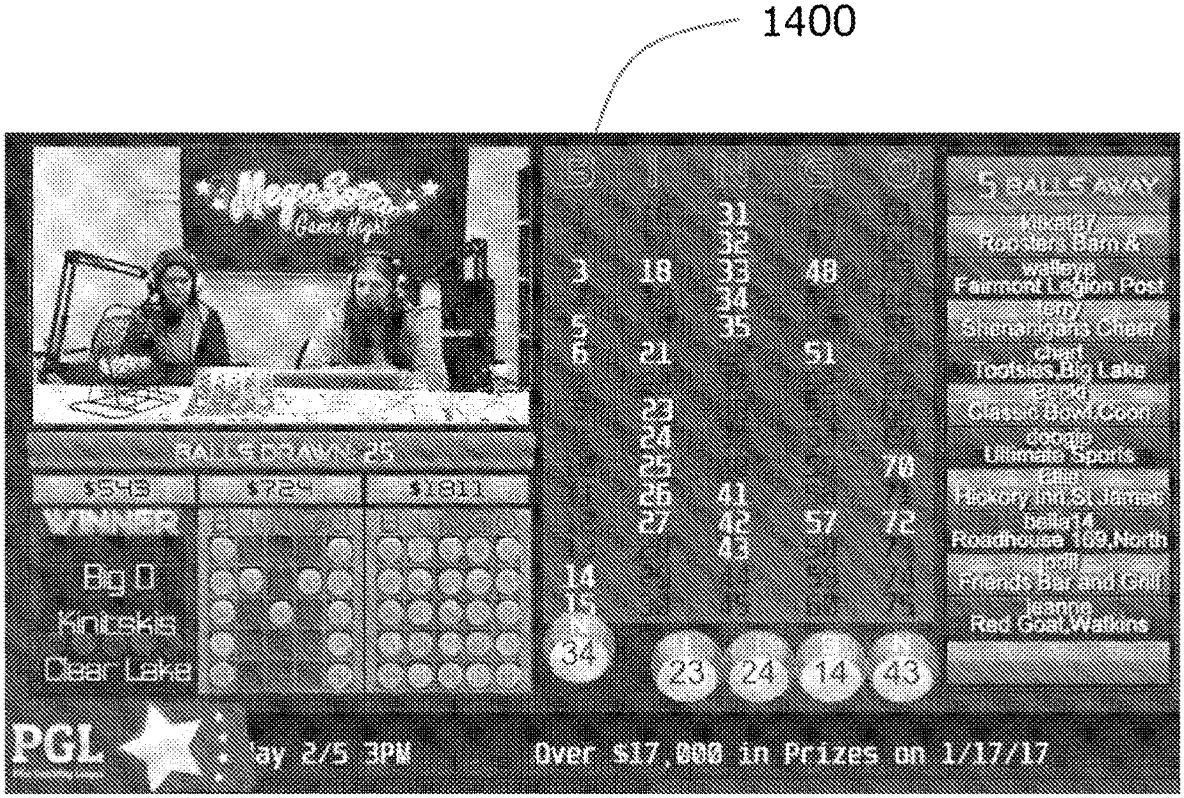
FIG. 14 shows an illustrative VPS broadcast for the bingo game.

Referring to FIG. 14 there is shown an illustrative VPS broadcast 1400 as it might be shown during a bingo game. The player enjoyment of the bingo games is significantly enhanced by the associated presentation on the VPS broadcast. Not only is there the human interest supplied by live hosts, but a competitive element is supplied by listing cards that are getting close to a winning pattern.

Figure 15:
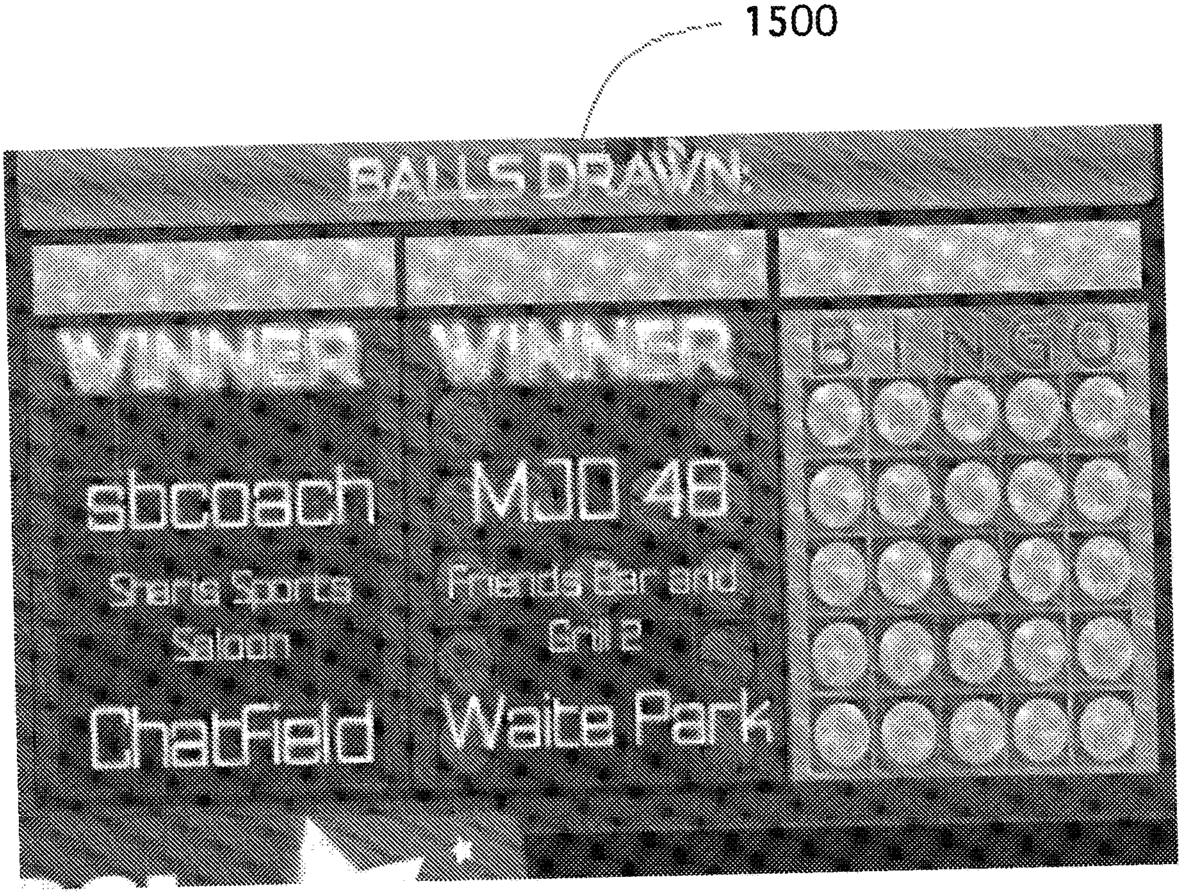
FIG. 15 shows an illustrative screenshot of graphics for a large VPS stationary display.

Referring to FIG. 15, there is shown an illustrative screenshot of a VPS broadcast focusing on winner data during a bingo game. The screenshot 1500 provides an increased awareness of the winner or winners because the large screen identifies the winning players, their venue and location in real-time during bingo game play.

Figure 16:
FIG. 16 shows an illustrative Gaming League Website (GLW) main screen.

Referring to FIG. 16, there is shown an illustrative main screen 1600 for a Gaming League Website. The system and methods presented herein support a Gambling or Gaming League Website (GLW), which is a web-based sub-system that interfaces with and is complementary to the Mobile Wagering Sub-System 102 shown in FIG. 1. In the illustrative embodiment, the illustrative gambling league website is commercially identified as the PILOT GAMBLING LEAGUE™ (PGL). The illustrative PILOT GAMBLING LEAGUE™ provides functionality intended to promote player competition between players playing the same game, but in a multiplicity of venues that could be separated by hundreds of miles, and thereby enhancing the feelings of a community event and increasing interest in the associated wagering activity.

Referring back to FIG. 1, there are two technical components of the illustrative Gambling League Website. The first component is referred to as a GLW website server 120, which is accessed with a common browser, e.g. Internet Explorer, Chrome, Safari, or other such browser. Additionally, the GLW website server 120 may be accessed using a computing device 130 that is configured to run a custom Android or iOS "APP." The computing device may be wired or wireless and includes, by way of example, a PC, tablet or other such computing device that provides Internet access.

The illustrative GLW website server 120 includes a SOL Server database and a software architecture based on .NET, C# and other such computing languages. The illustrative GLW website server 120 is also communicatively coupled to the mobile wagering sub-system (MWS) 102 with an interface that allows players to log into the GLW 120 or the MWS 102 with the same screen name and password. Additionally, the GLW 120 and MWS 102 both support the common use of player-chosen avatars. Note, in the illustrative embodiment there is no requirement for players on the MWS 102 to login with a password, so that anonymous play is fully supported. However, if players do desire to identify themselves to the MWS 102 with their GLW 120 screen name and password, then they can have the benefit of having aspects of their play transferred to their GLW account. Information that may be transferred from the GLW 120 to the MWS 102 includes scores of tournament, prize winnings, play totals, play locations, number of play sessions, and other such game information.

In operation, periodic tournament scores may be tracked based on the results from the MWS 102 activity. Additionally, the periodic tournament scores are also available to each player that accesses the GLW website server 120. The type of data collected, and the corresponding data attributes may vary based upon jurisdictional regulations. In the illustrative embodiment, players may be identified by their chosen screen name and general location. The illustrative website server 120 presents the top players in each region and their corresponding scores and home town.

Figure 17:
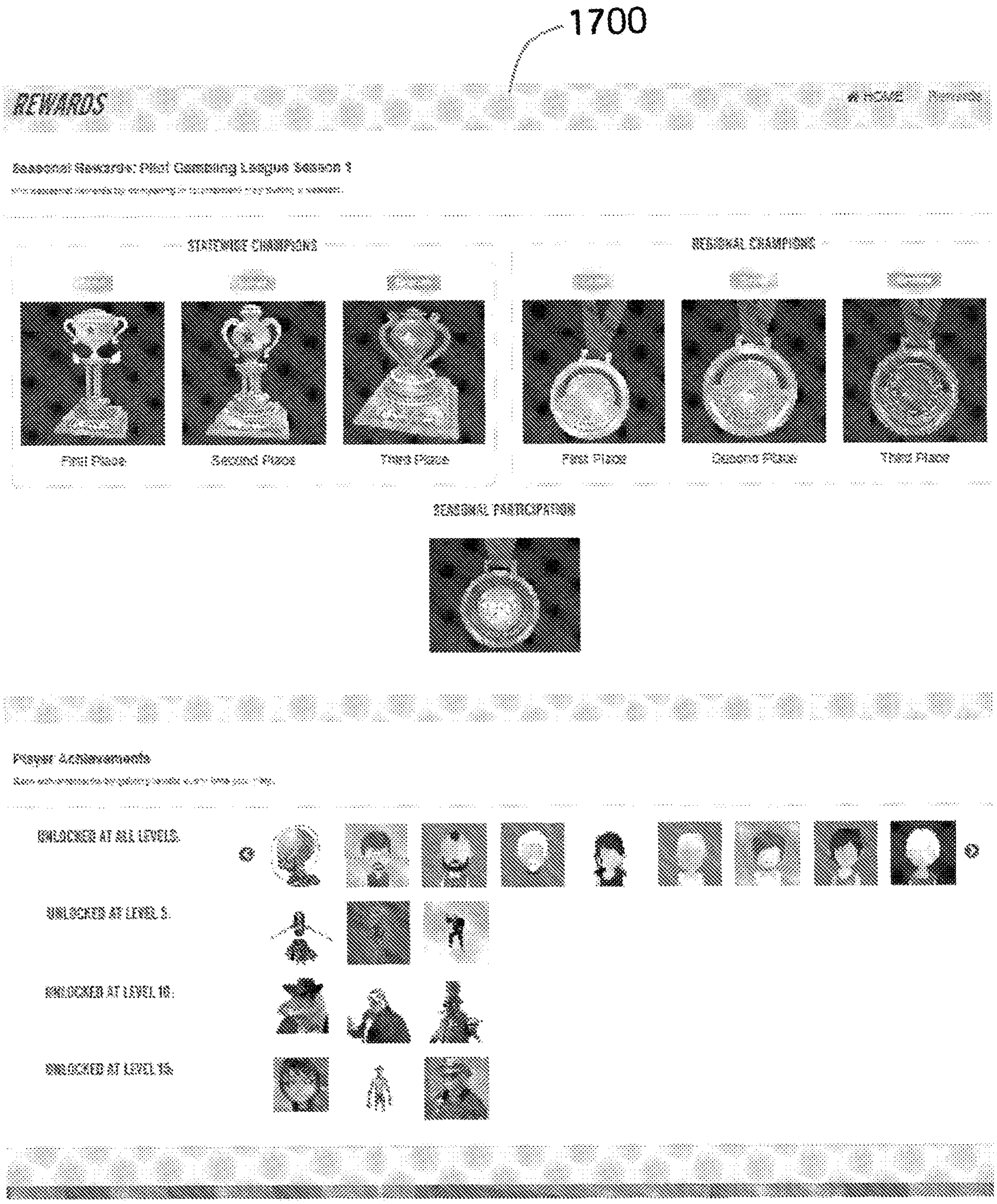
FIG. 17 shows an illustrative GLW screenshot of a player's available virtual rewards.

Referring to FIG. 17 there is shown an illustrative screenshot 1700 of a player's virtual rewards. For example, players may also qualify for "vanity awards." These vanity awards may be granted based on player performance. The vanity awards may provide an expanded choice of avatars, a graphic trophy or trophies that are associated with their screen names, and other such virtual items or awards. The vanity awards may be presented in at least one of the GLW website server 120, the mobile wagering sub-system 102 and the Video Presentation System 104. For example, if a player has won a regional virtual gold trophy prize, then the virtual gold trophy prize may be displayed on the VPS television 110 when the player plays in a new tournament. The player's chosen screen name, avatar and the virtual gold trophy may be displayed on the various VPS television 110, which may be located in hundreds of participating venues.

Figure 18:
FIG. 18 shows an illustrative GLW screenshot of news, blogs and tweets.

Referring to FIG. 18 there is shown an illustrative screenshot 1800 of news, blogs and tweets for the Gaming League Website. The illustrative screenshot 1800 may be used to periodically invite GLW members to a regional tournament at a venue in the region. Additionally, non-wagering competitions may be set up at those venues where actual promotional prizes may be awarded. Furthermore, winners of regional tournaments may be invited to a Tournament of Champions, which will take place at a premium location. Further still, a Grand Prize winner may also be selected for a promotional cash or merchandise prize. These competitions or events may be shown live or on video to all players in their normal gaming venues using the Video Presentation System 104.

Figure 19:
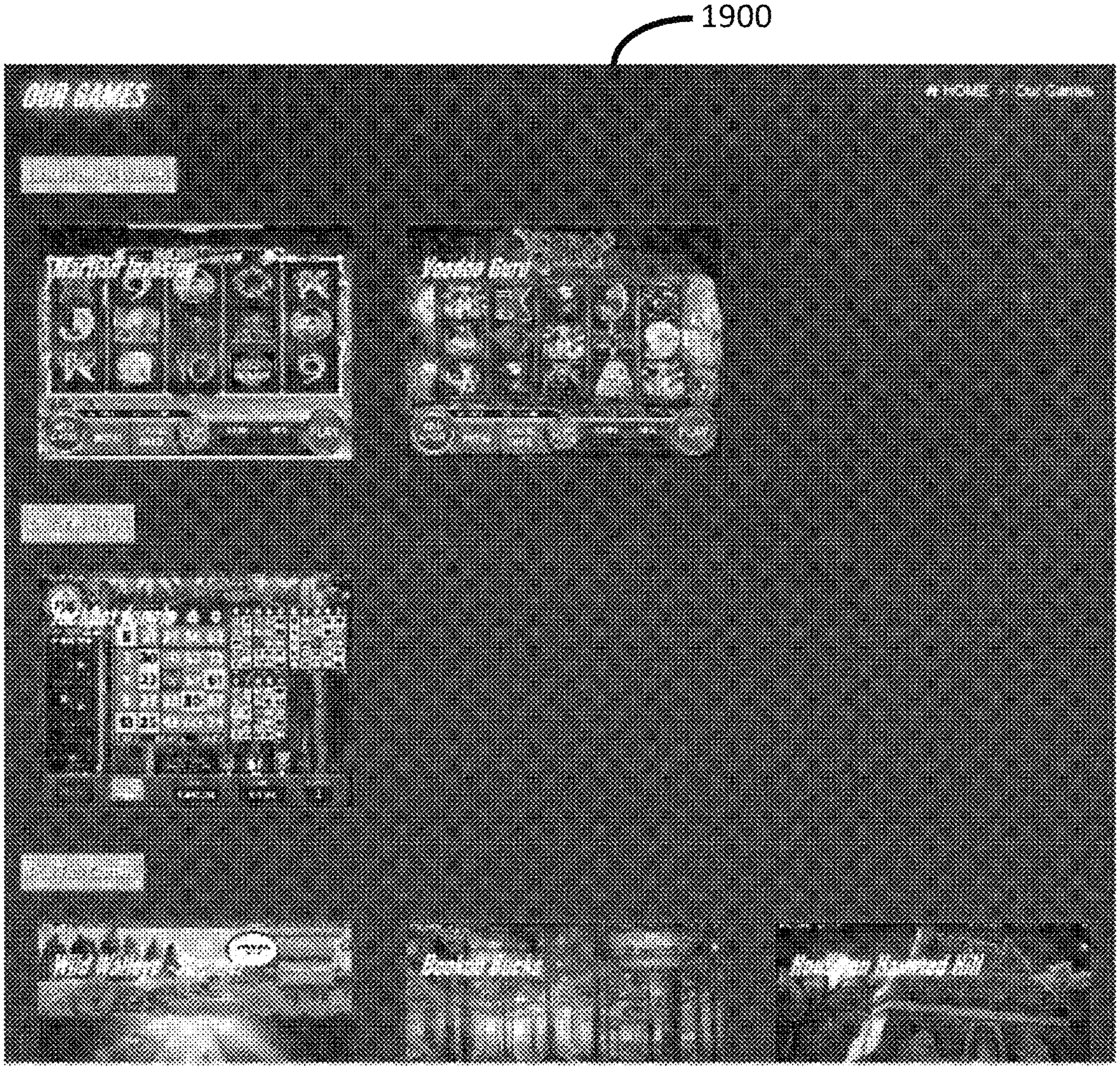
FIG. 19 shows an illustrative GLW embodiment of MWS game libraries presented to players.

Referring to FIG. 19 there is shown an illustrative screenshot of the MWS 102 game libraries presented to players. The screenshot 1900 shows that there are three different game types, namely, tournament bingo games, coverall bingo and pulltab games.

The GLW 120 and MWS 102 systems are communicatively coupled to the VPS 104, which is communicatively coupled to the VPS video display 110 as shown in FIG. 1. The VPS display 110 provides the opportunity to highlight GLW players and the GLW events. The VPS display 110 may be used to highlight regional standings, announce regional winners, show live or video clips of regional events, show live or video clips of the Tournament of Champions, show Interviews with PGL players, and other such GLW information. This close interaction between the VPS 104, MWS 102 and GLW 120 creates the social atmosphere and spirit of competition and accomplishment improve the success of the wagering enterprise.

Figure 20:
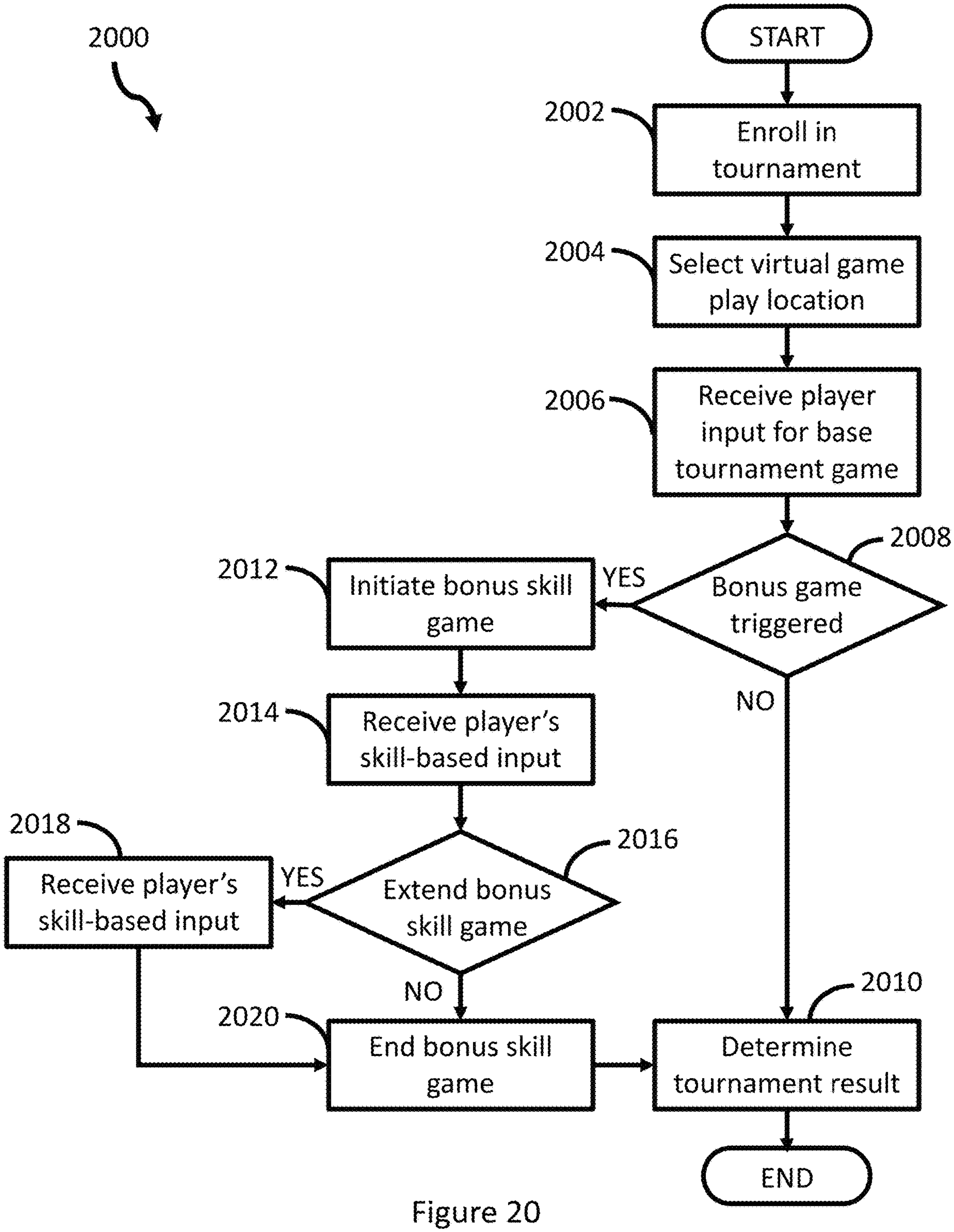
FIG. 20 shows an illustrative flowchart for a method of providing a tournament game with a skill-based bonus game session.

Referring now to FIG. 20, there is shown a method 2000 of providing a tournament game with a skill-based bonus game session. The method 2000 begins at block 2002 by enrolling at least two players in a current, next, or upcoming tournament session. This enrollment may include registration of the players, receipt of an entry fee or wager from each player, selection of an avatar for each player, input of a player name for each player, or any combination thereof.

After a player has been enrolled in a next tournament session, the method proceeds at block 2004 where players are presented with a virtual world map. Players select a virtual game location on the virtual world map. Each game location may provide players with a unique backdrop during gameplay and/or provide other distinct features of the wagering tournament game and/or the skill-based bonus game.

Once the time for the tournament game session arrives, the method proceeds to block 2006 where player input is received for the base tournament game. In a flash bingo embodiment, the player input may include press a virtual play button, a touch screen play button, or a physical play button on a gaming machine. This player input acts as a slot pull and triggers play of a bingo card. In other embodiments, the player input may trigger play of an electronic pull-tab game, a slot game, or a video poker game. Each player may provide one or more inputs/game plays up to a total or maximum predetermined number, at which point the tournament session closes, ends, or terminates.

During tournament game play, the method proceeds to decision diamond 2008 where the MWS 102 determines whether a bonus skill game session has been triggered. The trigger event may be achieving a threshold point score on a single gameplay or accumulating a threshold point score through multiple gameplays during the tournament session. Alternatively, the trigger event may be achieving a particular point value in a single gameplay, achieving a certain bingo card pattern in a single gameplay, or achieving a particular accumulated point value after all gameplays in a tournament session. In all embodiments, one or more bingo game session outcomes operate to trigger the bonus skill game session.

When no triggering event occurs, the method 2000 proceeds to block 2010 where the MWS 102 determines the tournament result by compiling the total point scores of all players in the tournament after all gameplays for each player have been completed. The players are then ranked according to their total point score and one or more tournament prizes are awarded to the tournament players according to their tournament rank.

When a triggering event occurs, the method 2000 proceeds to block 2012 where a bonus skill game session is initiated. The illustrative bonus skill game is a hunt game, where a player is presented with depictions of one or more types of animals to hunt. The timing with which the animals are presented, the frequency with which the animals are presented, their movement path on the player's screen, their movement rate on the player's screen, and the type(s) of animals presented may each be independent random variables. In other embodiments, these variables may be linked and random. The skill-based bonus game session includes an amount of time during which the skill-based bonus game session is active. This amount of time may be pre-determined, such as 1:00 minute. Alternatively, the skill-based bonus game session length may be determined by a number of animals presented to the player, when a predetermined number of animals have been presented the bonus session ends.

At block 2014, the method 2000 proceeds where players attempt to hunt the animals presented by aiming and shooting one or more of the animals presented. Aiming and shooting requires a skill-based input from the participating player. Players receive skill points based upon the type of animal shot, the length of the shot, and the location of the shot, e.g., a body shot or a head shot. Longer shots are worth more skill points, and more challenging shots (e.g., a head shot) is worth more skill points.

During the skill-based bonus game session, the method proceeds to decision diamond 2016 where the MWS 102 determines whether to extend the length of the bonus game session, such as by increasing the length of time of the bonus game session or by presenting the player with additional animals to hunt. This determination may be based upon the player's performance during the bonus game session. In one embodiment, the determination is based upon a player's accumulated skill points during the bonus game session, e.g., achieving a threshold amount of skill points. In another embodiment, this determination is made based upon the player making a particular shot, e.g., a head shot, or shooting a particular game animal such as a golden buck.

When the MWS 102 determines to extend the length of the bonus game session, the method proceeds to block 2018 where further player skill input is received, in which more shots are taken by the player. The length of the bonus game session may be increased by adding more time to the length of the bonus game session or presenting the player with additional animal targets to hunt. This allows the player to accumulate more skill points by making more successful hunting shots. Extension of the bonus game session may be repeated by the player again achieving a second threshold amount of skill points, a threshold number of animals shot, or making a particular shot. In some embodiments, a player may continue to extend the bonus game session with such achievements. When no further extensions are achieved or available, the method 2000 proceeds to block 2020 where the skill-based bonus game terminates.

When the MWS 102 determines not to extend the length of the bonus game session, the method 2000 also proceeds to block 2020 where the skill-based bonus game terminates.

In some embodiments, the MWS 102 ranks players according to their accumulated skill points. This ranking is entirely separate from any tournament point ranking and has no impact on any tournament prizes won, as the skill-based bonus game is a non-wagering bonus game. Thus, the skill-based bonus game does not require any additional wager to play and provides the player no monetary gain or enticement to play. Instead, the bonus game adds only entertainment value and competitive value. This creates an environment where skilled players may be encouraged to play more of the wagering tournament game in order to participate in the non-wagering skill-based bonus portion of the game. Alternatively, this may create an environment where social play is encouraged, and one person plays the wagering portion of the tournament game, while another more skilled person plays the skill-based bonus game.

In an alternative embodiment, the skill-based bonus game is available within non-tournament play. During non-tournament play, player enrollment may not be required and no start time is designated for the base game. Instead, the base game starts upon the player's initiative, i.e. in response player input, such as pressing a start button, a play button, clicking a play button, etc. Non-tournament play may be single gameplays, where the bonus skill-based game session is initiated when a player achieves a particular point value, bingo card pattern, a minimum point threshold, etc. Players' skill-base bonus game point scores may still be ranked against other players' skill-base bonus game point scores, however, these scores may occur at any time, on the same day, the same week, or some other set time.

Figure 21:
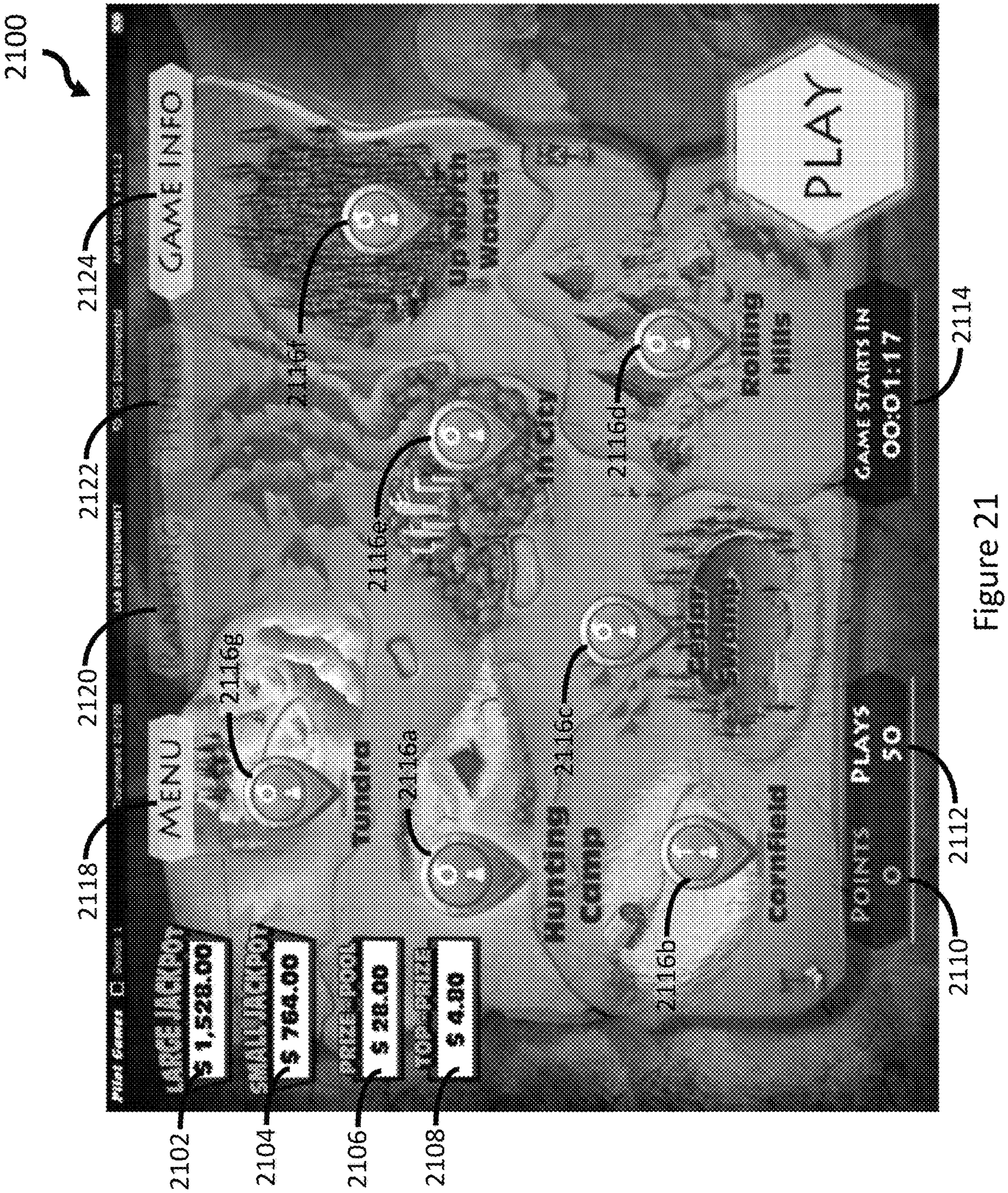
FIG. 21 shows a virtual world game map for a tournament game.

Referring now to FIG. 21, there is shown a virtual world game map 2100 for a tournament game operating on the MWS 102 and VPS 104. The virtual world game map 2100 depicts a variety of tournament game information, such as a large progressive prize amount 2102, a small progressive prize amount 2104, a tournament prize amount 2106, a maximum game session prize 2108, accumulated points 2110, remaining game plays 2112, time remaining to tournament start 2114, and virtual game play locations **2116*a* through 2116*g*. The virtual world game map 2100 also provides interface options: a menu 2118, ranking 2120, hunts 2122, and game info 2124**.

Both the large progressive prize 2102 and the small progressive prize 2104 are accumulated across multiple properties by the MWS 102 over the course of one or more tournament sessions. In some embodiments, the large progressive prize 2102 has a higher volatility as compared to the small progressive prize 2104, i.e., the large progressive prize 2102 has a lower probability of being won in any given tournament and a larger value than the small progressive prize 2104. The tournament prize pool 2106 shows the total amount of entry fees collected from players entering the current tournament, while the top prize 2108 is the maximum available prize for an individual player from the current tournament session.

The point counter 2110 indicates the point value achieved by a player during a tournament session as a result of one or more game sessions, bingo cards, pull-tab plays, game plays, etc. The play counter 2112 indicates the number of plays remaining for a player in the current tournament session. These plays remaining 2112 may be game sessions, bingo cards, pull-tab cards, or game plays. The tournament timer 2114 shows the time remaining until the next tournament session begins.

The virtual game play locations 2116*a* through 2116*g* represent different virtual game arenas for tournament play. Each play location 2116 may have unique features or attributes. In the illustrative embodiment, the tournament game is a flash bingo hunt game where each virtual game play location 2116 includes a unique set of animal game targets and allowed weapons. For example, the hunting camp location 2116*a* includes a buck, a doe, a fox, a turkey, a rabbit, and a caribou, and allows the use of rifles, cross bows, and shotguns. The illustrative cornfield location 2116*b* includes a buck, a doe, a coyote, a pheasant, and a rabbit, and allows the use of shotguns, cross bows, and compound bows. The illustrative cedar swamp location 2116*c* includes a buck, a doe, a black bear, a fox, and a raccoon, and allows the use of rifles, cross bows, and shotguns. The illustrative rolling hills location 2116*d* includes a buck, a doe, a coyote, a pheasant, a rabbit, and a caribou, and allows the use of shotguns, cross bows, and compound bows. The illustrative up north woods location 2116*f* includes a buck, a doe, an arctic wolf, a bobcat, a rabbit, and a ruffed grouse, and allows the use of rifles, cross bows, and shotguns. The illustrative tundra location 2116*g* includes a buck, a doe, an arctic wolf, a snow fox, a bobcat, a snow rabbit, a ruffed grouse, and a caribou, and allows the use of muzzle loaders.

Each play location 2116 may include an icon indicating the number of players enrolled to play ("hunt") in each area. Selecting the icon for a particular play location 2116 presents the player with a display indicating the features of that play location 2116, such as the animals available for hunting and the weapons allowed.

The various animal game targets for each virtual game location 2116 may influence a player's selection, as each animal may be associated with a frequency of occurrence, point value, and difficulty to shoot, i.e., due to a movement speed, movement pattern, or size of target areas (such as head size, body size, etc.). Additionally, the weapons allowed for use in a hunting bonus game may also influence a player's selection, as each weapon may include a fire rate, fire range, and accuracy that may differ from other available weapons.

The menu selection/button 2118 transfers players from the map view 2100 and presents them with another display including tournament start times. The ranking selection/button 2120 transfers players from the map view 2100 and presents them with one or more leader board views. The leader boards may display all-time high scores from previous tournaments, high scores from a current tournament, all-time skill point rankings, or skill point rankings from a current tournament. The hunt selection/button 2122 transfers players from the map view 2100 and presents them with statistics of past hunts/bonus game sessions/tournament sessions.

Figure 22:
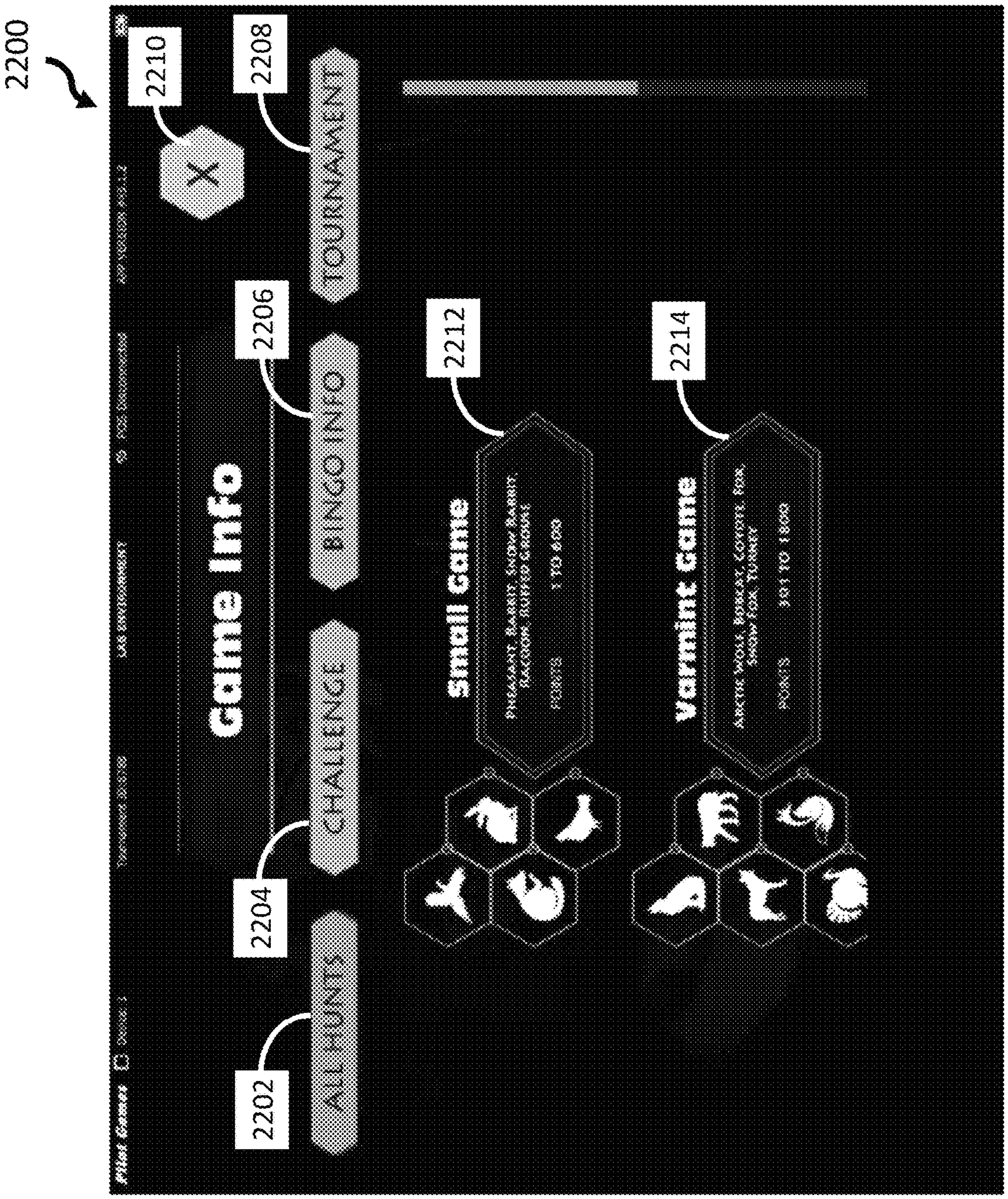
FIG. 22 shows a view of an illustrative game information menu.

By selecting game info icon/button 2124, the player's display transfers from the map view 2100 to a game info menu 2200 presented in FIG. 22. The game info menu 2200 includes an all hunts selection/button 2202, a challenge selection/button 2204, a bingo info selection/button 2206, a tournament selection/button 2208, and a return selection/button 2210.

By selecting or pressing the all hunts button 2202, the player is displayed general hunt information shown in FIG. 22. This general hunt information includes the animals that are considered small game 2212, the animals that are considered varmint game 2214, and the animals that are considered big game (not shown). In the illustrative embodiment, small game 2212 includes pheasant, rabbit, snow rabbit, raccoon, and ruffed grouse. Further, the small game display 2212 indicates that these target animals are worth between 1 and 600 skill points depending on the attributes of a particular successful hunt or shot, i.e., shot distance and shot location on the animal. Also in the illustrative embodiment, varmint game 2214 includes arctic wolf, bobcat, coyote, fox, snow fox, and turkey. Further, the varmint game display 2214 indicates that these target animals are worth between 301 and 1800 skill points. Although not shown, big game includes buck, doe, caribou, and black bear. The return button 2210 exits the player from the game info screen 2200 and returns their view to that of the virtual world game map 2100.

Figure 23:
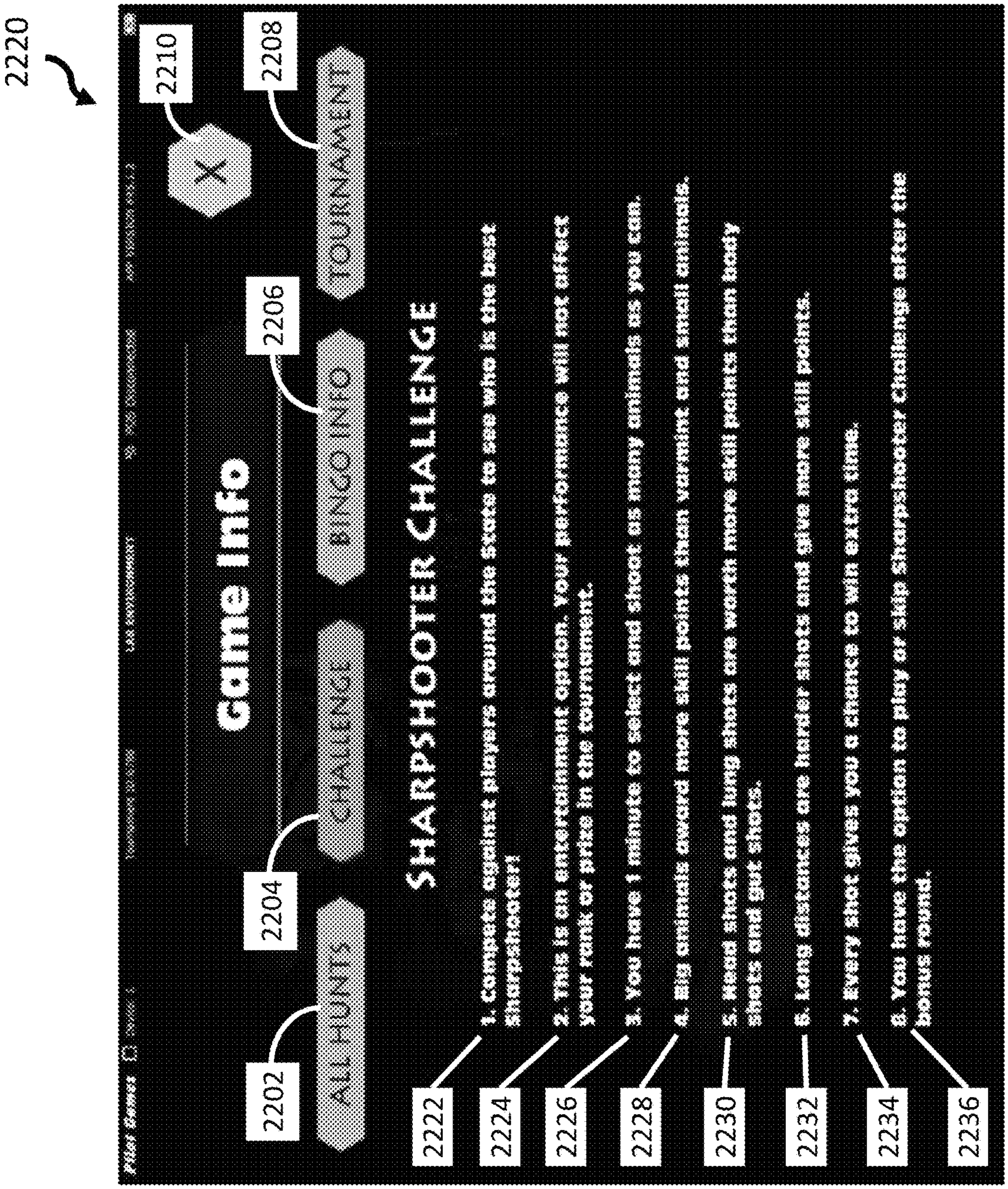
FIG. 23 shows a skill-based bonus game session information menu.

By selecting or pressing the challenge button 2204, the player is shown details of the bonus skill-based game session, termed the "sharpshooter challenge" in a challenge display window 2220 at FIG. 23. This display window 2220 still includes the all hunts selection/button 2202, the challenge selection/button 2204, the bingo info selection/button 2206, the tournament selection/button 2208, and the return selection/button 2210. In the illustrative embodiment, the challenge display window 2220 presents eight (8) details of the sharpshooter challenge skill-based bonus game session.

The first detail 2222 establishes the competitive nature of the skill-based bonus game by providing that players compete in this bonus skill game against other players in the same state to determines the best sharpshooter. However, in other embodiments, players may compete against other players in the same country region, country, continent, or against all players in the world. The second detail 2224 confirms the non-wagering nature of the skill-based bonus game by stating that the player's performance in the bonus skill-based game does not impact their tournament point rank or tournament prize awarded. The third detail 2226 establishes the length of the bonus skill-based game session. The illustrative embodiment is 1:00 minute, during which the player may attempt to hunt and shoot as many animals as they are capable of hitting. The fourth detail 2228 indicates the relative skill point of value of the various types of game (small, varmint, and big), by stating that big animals award more skill points than varmint, which award more than small. The fifth detail 2230 indicates the relative skill point value of the various types shots a player may make on the available game. In the illustrative embodiment, head shots and lung shots are worth more skill points than body shots and gut shots. The sixth detail 2232 indicates the relative skill point value of the various lengths of shots a player may make on the available game. In the illustrative embodiment, long distance shots are harder than short distance shots and award a correspondingly greater amount skill points than the short shots. The seventh detail 2234 establishes how a player may extend the length of their bonus skill-based game session by shooting more animals. In the illustrative embodiment, each shot that hits an animal provides a random chance for the player to add time to their bonus session. In another embodiment, players may add time to their bonus session by making particularly difficult shots, i.e. achieving a certain number head shots, achieving a certain number of lung shots, achieving a certain number of shots that register a hit anywhere on a target animal, achieving a threshold skill point amount for all shots made, etc. The eighth detail 2236 emphasizes the non-wagering nature of the skill-based bonus session by informing the player that the bonus round is optional and may be skipped without affecting their tournament ranking or tournament prize reward.

Figure 24:
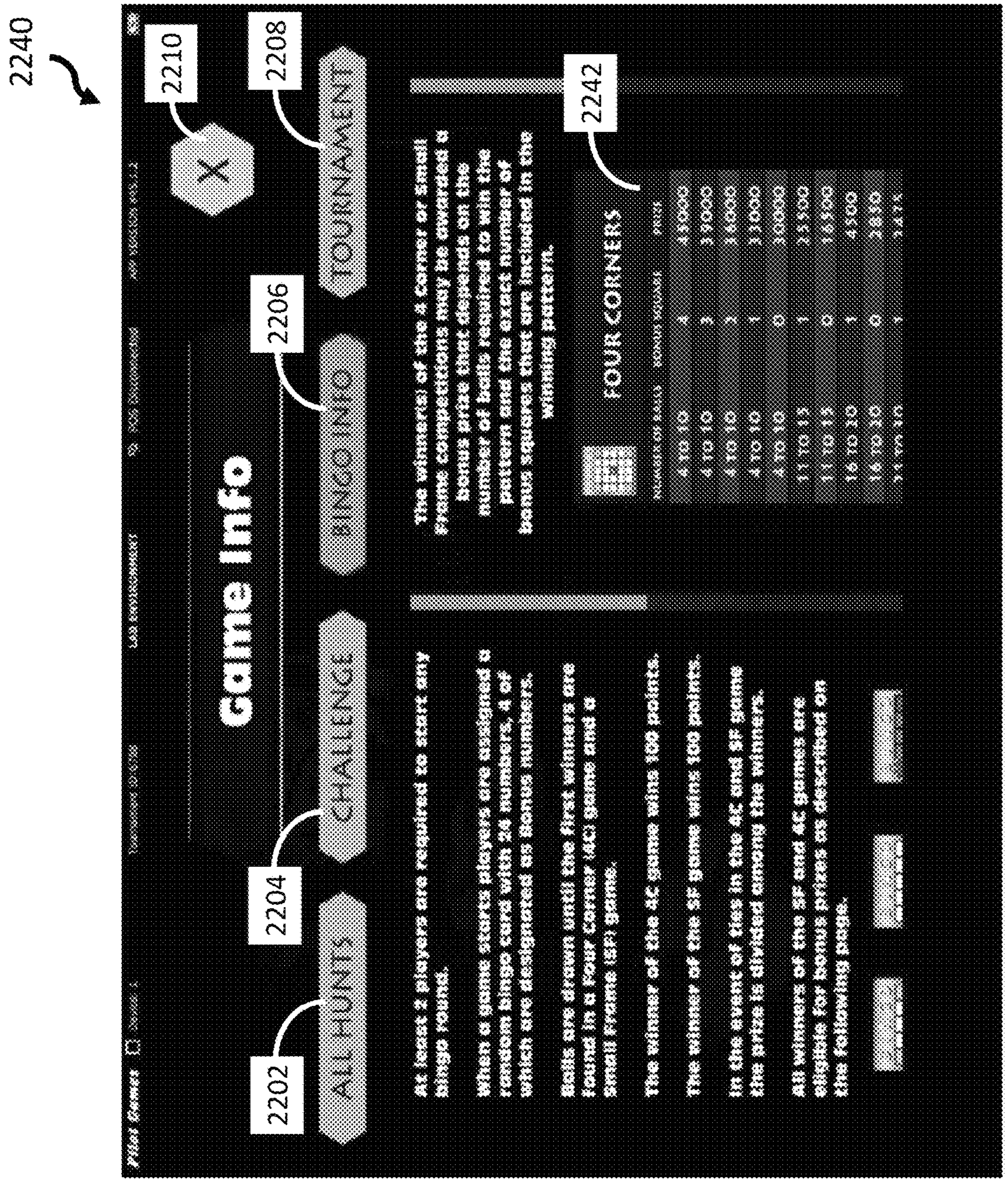
FIG. 24 shows a bingo information window.

By selecting or pressing the bingo info button 2206, the player is presented a bingo info window 2240 as shown in FIG. 24. This display window 2240 still includes the all hunts selection/button 2202, the challenge selection/button 2204, the bingo info selection/button 2206, the tournament selection/button 2208, and the return selection/button 2210. In the illustrative embodiment, the bingo info display window 2240 presents the player with both the requirements for a tournament and the tournament point returns for certain bingo card results. In the illustrative example, at least 2 players are needed to start any bingo round in the tournament game session. When a tournament session bingo round begins, each player is randomly assigned a bingo card with 24 numbers distributed thereon (four (4) of the numbers on each bingo card are designated as bonus numbers). The proceeds by drawing balls until one player's bingo card presents a four corner (4C) win and/or a small frame (SF) win. In the illustrative embodiment, the winner of the 4C game receives 100 tournament points and the winner of the SF game receives 100 tournament points. In the event of a tie, i.e. at least two players achieve a 4C win or a SF with the same number of balls drawn, the tournament prize points are evenly split amongst the winning players. Further, winners of the 4C and/or SF games are eligible for bonus prize awards. The bonus prizes are awarded based upon the number of balls drawn to achieve the winning bingo card pattern and the number of bonus squares in the winning pattern, according to the table 2242 in FIG. 24.

Figure 25:
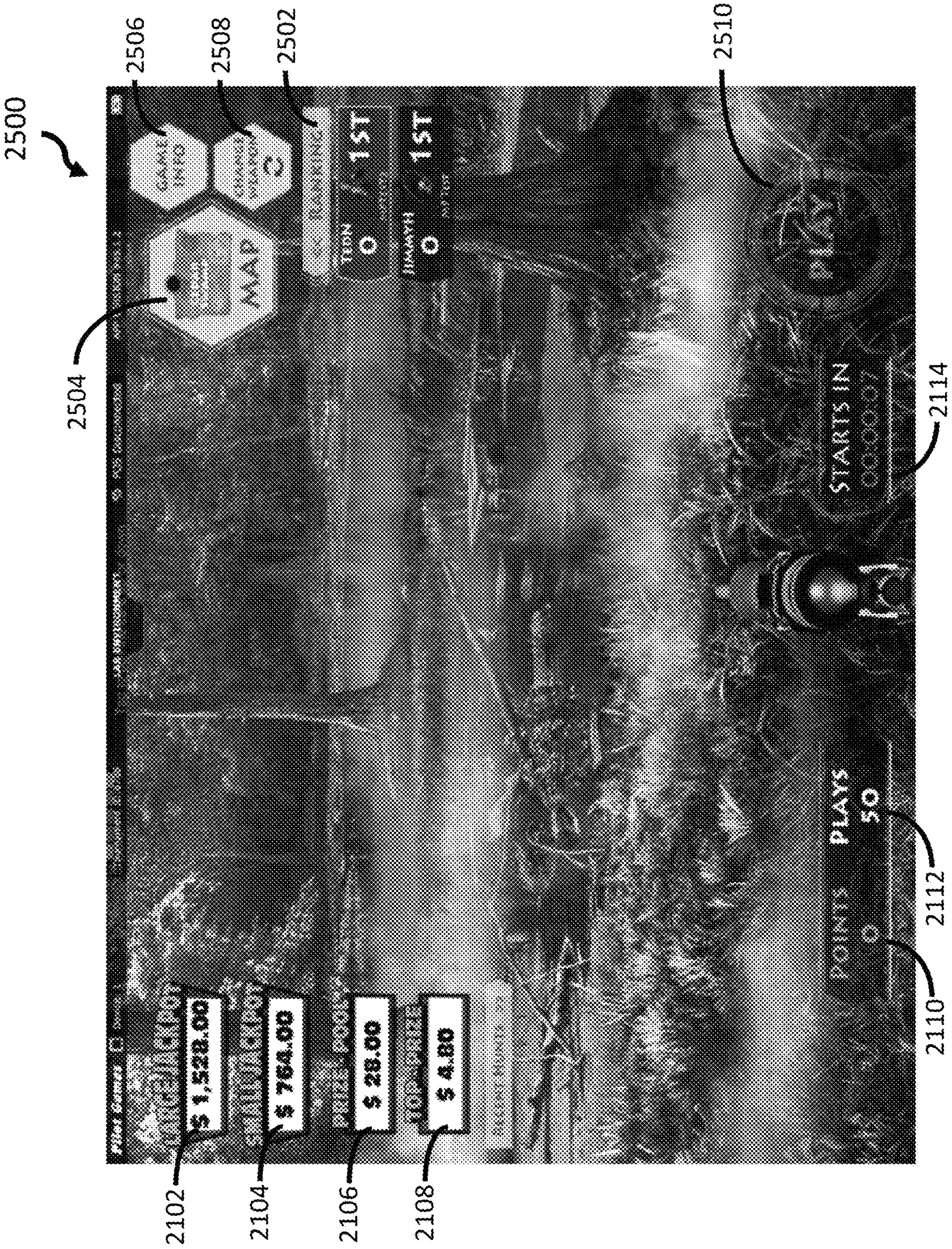
FIG. 25 shows an illustrative tournament gameplay view.

By selecting or pressing the tournament button 2208, the player is presented with a gameplay view 2500 shown in FIG. 25, that is specific to the virtual world game location 2116 selected in the virtual world map view 2100 of FIG. 21. In the illustrative gameplay view 2500, the cedar swamp location 2116*c* is shown. The gameplay display 2500 continues to show the player the large progressive prize 2102, small progressive prize 2104, tournament prize 2106, maximum game session prize 2108, accumulated points 2110, remaining game plays 2112, and time remaining to tournament start 2114 values. The gameplay display 2500 also shows the player a leader board 2502 that identifies the top ranked players according to current tournament points earned. In the illustrative gameplay view 2500, the tournament has not started and all players entered in the tournament are tied for the first rank position with a score of zero (0). Additionally, the gameplay display 2500 includes selectable buttons that navigate the player back to other view screens. A map button 2504 navigates the player back to the virtual world game map 2100. A game info button 2506 navigates the player back to the game info menu 2200. A weapon change button 2508 navigates the player to an inventory view of the available weapons, where the player may select from the available weapons and return to the gameplay view 2500 with the newly selected weapon equipped. Lastly, the gameplay display 2500 includes a play button 2510 that may be clicked, touched, or pressed by the player, or otherwise receive player input, in order to initiate a game action such as revealing a bingo card outcome.

Figure 26:
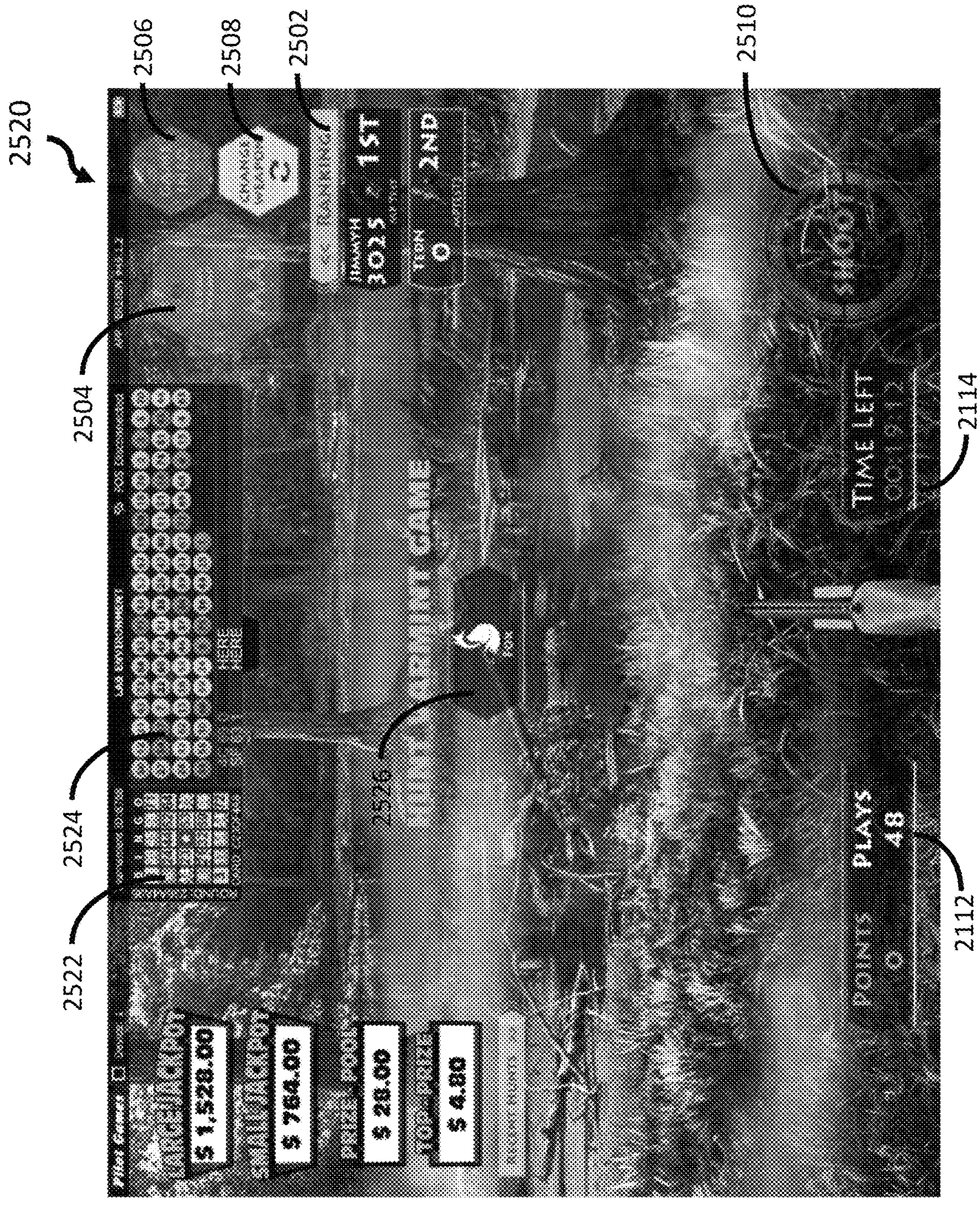
FIG. 26 shows another illustrative tournament gameplay view.

With reference now to FIG. 26, there is shown another view of gameplay 2520. In this view 2520, the tournament game session has begun and the timer 2114 now indicates the time remaining in the tournament game session, instead of the time remaining until the start of the tournament game session as it did prior to the tournament beginning. The remaining gameplays counter 2112 has also updated to reflect that two (2) gameplays have been spent or played, and 48 now remain. In this view 2520, the player's current bingo card 2522 and ball draw results 2524 are displayed. Each ball highlighted in the ball draw result 2524 represents a ball that matched with a space on the player's bingo card 2522. In the illustrative view, the player has achieved both the 4C game win and the SF game win and received 3025 tournament points, indicated on the leader board 2502 that shows the player "JimmyH" ranked first. While the change weapon button 2508 remains available for the player to select and utilize during tournament gameplay, the map button 2504 and game info button 2506 are now disabled as indicated by their translucent nature in the gameplay display 2520. The bingo pattern and ball draw results of the player's current gameplay have qualified the player to hunt varmint game, as indicated by the center symbol 2526 (also termed a symbolic representation).

Alternatively, when the combination of the player's bingo card and the balls drawn do not result in any bingos or other game winning patterns, the player may be presented with a "miss" symbol/award (not shown), instead of the hunt varmint award 2526 or another hunt symbol.

Figure 27:
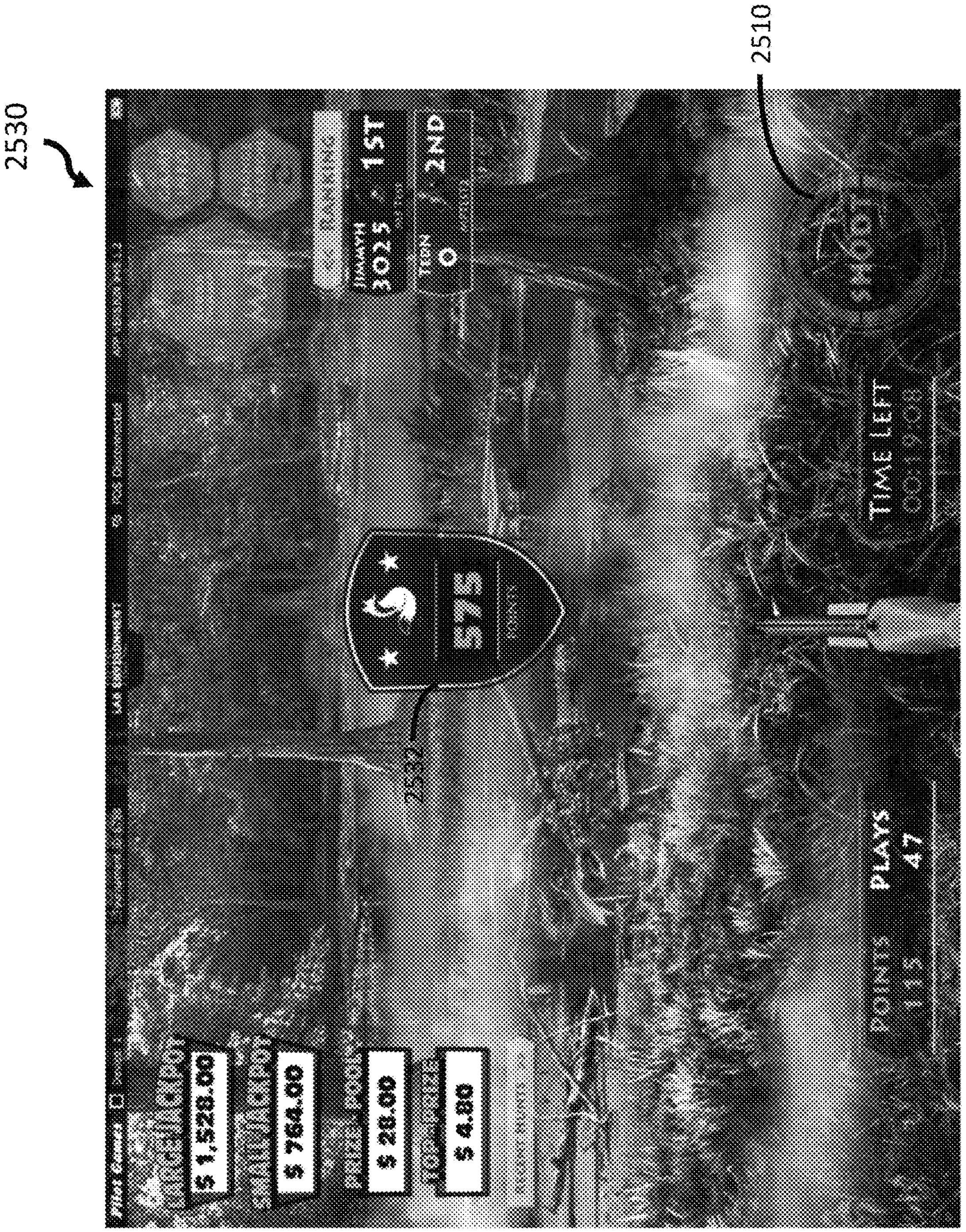
FIG. 27 shows a further illustrative tournament gameplay view.

Referring now to FIG. 27, there is shown a further view of gameplay 2530, where the player is presented with the successful outcome of hunting varmint in the form of a varmint point award 2532 (also termed a symbolic representation). This point award is predetermined by the player's bingo card outcome, and not as a result of a player's skill-based player input.

Figure 28:
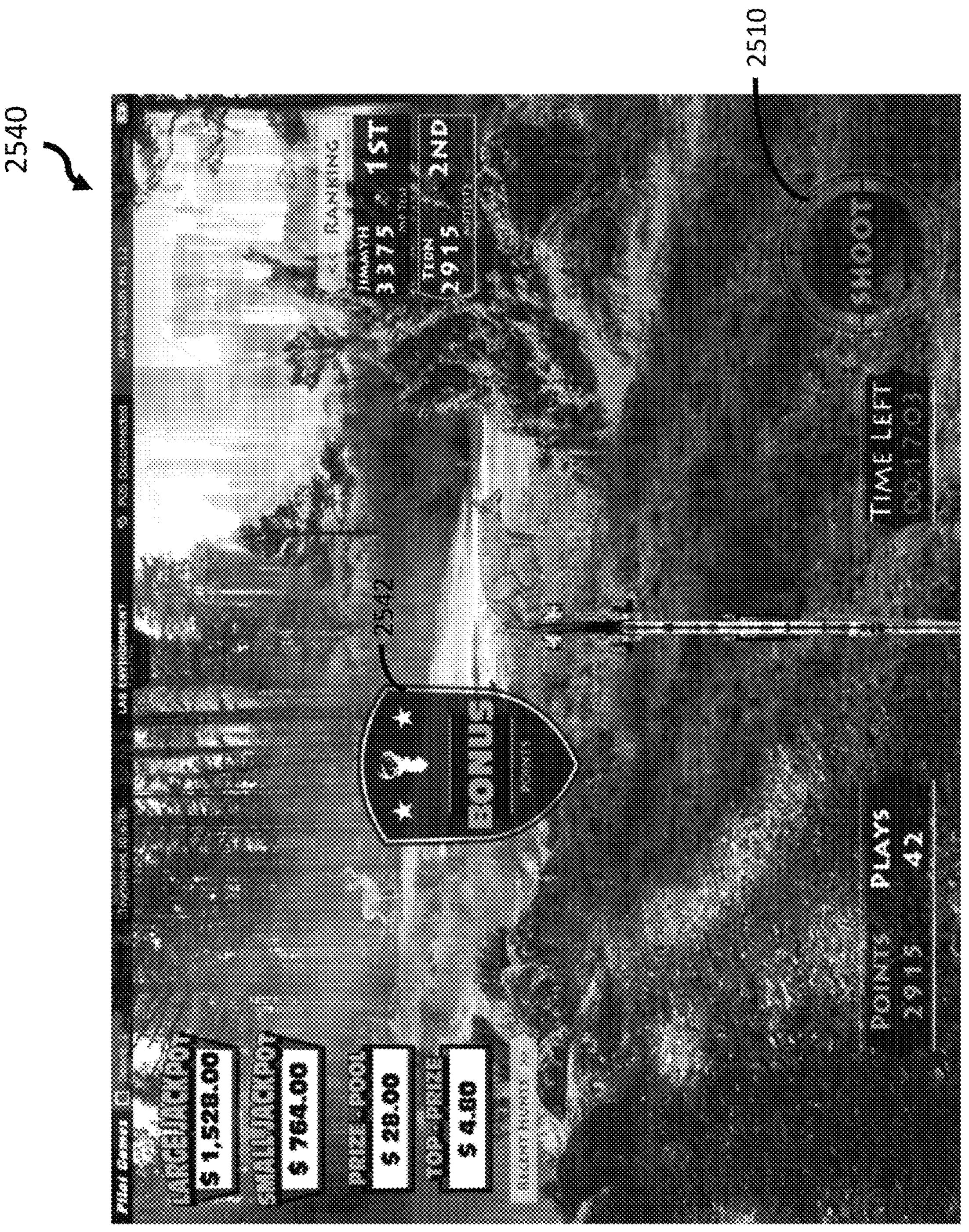
FIG. 28 shows an illustrative bonus award during gameplay.

With reference now to FIG. 28, there is shown another view of gameplay 2540, where the player is presented with the successful outcome of hunting a golden buck in the form of a bonus points award 2542 (generally termed a symbolic representation). This view of gameplay 2540 is in the city location 2116*e*, which offers a different backdrop from other gameplay locations, as well as a different set of animals available to hunt. The illustrative bonus points award 2542 may trigger a skill-based bonus game session, such as the sharpshooter challenge, and this bonus award 2542 occurs as a result of the player's bingo card outcome as with the varmint point award 2532 of FIG. 27. In other embodiments, the bonus points award 2542 may trigger a bonus game of chance game session that is not skill-based. In still other embodiments, the bonus points award 2542 triggers both a skill-based bonus game session and a bonus game of chance game session. In these other embodiments, the skill-based bonus game session may be optional, such that the player is not required to complete or compete in the skill-based bonus game session to continue tournament gameplay or receive the points associated with the bonus points award 2542.

Players may be presented a hunting animation associated with gameplay awards, such as the bonus award 2542 and the varmint point award 2532 shown in FIG. 27. Such animations may include a player prompt, such as transforming an onscreen play button or spin button 2510 into a "shoot" button 2510. When the player clicks, or interacts with the shoot button 2510, this player input triggers an animation of the player's weapon successfully shooting the game animal(s) associated with the gameplay award 2542, 2532. In further embodiments, the hunting animations may occur without player input after the expiration of a certain amount of time, such as 5, 10, 20, or 30 seconds.

Figure 29:
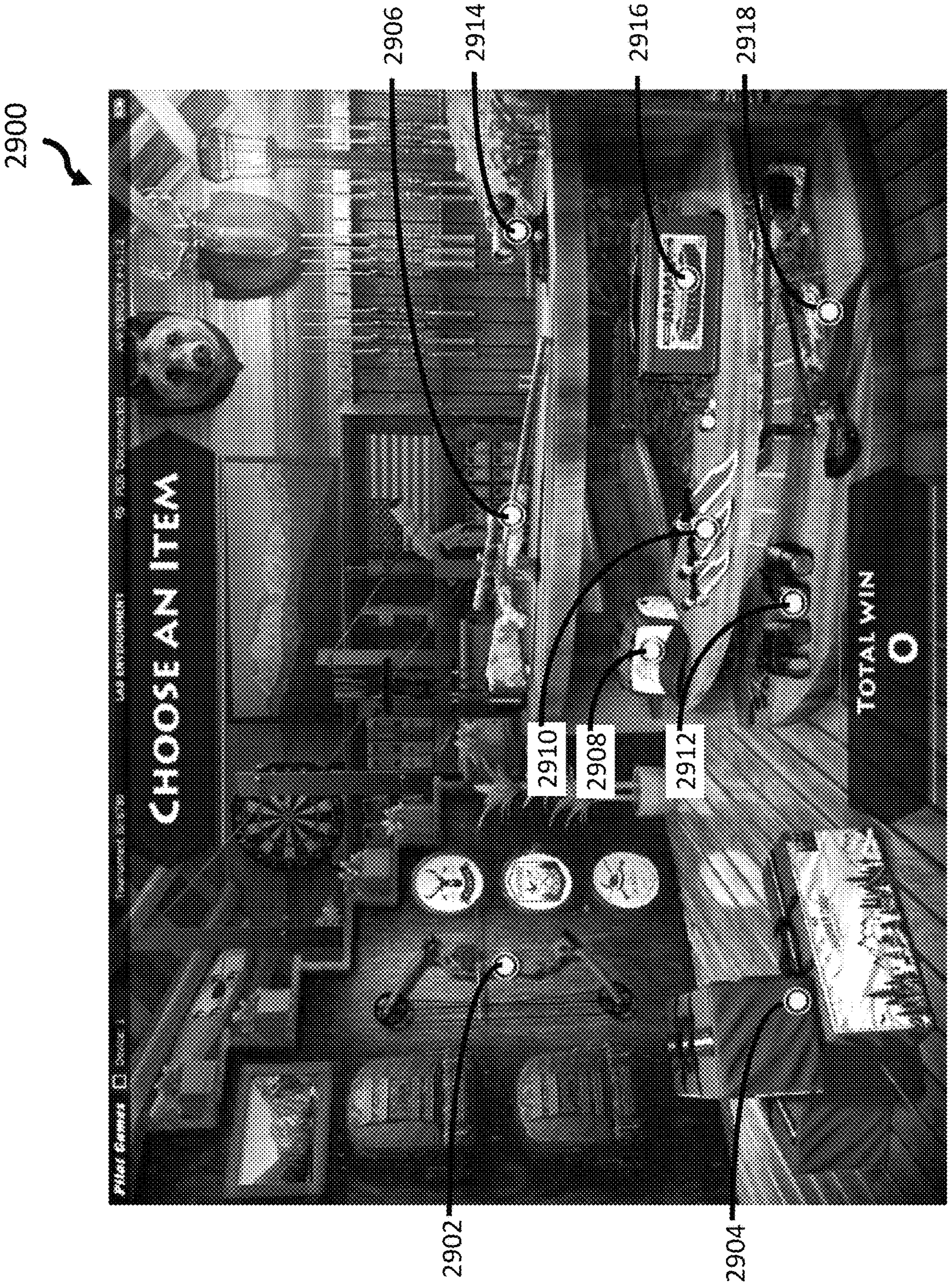
FIG. 29 shows an item selection screen for a bonus game of chance.

Referring now to FIG. 29, there is shown an item selection screen 2900 for a bonus game of chance game session. The item selection screen 2900 presents the player with selectable items that may be equipped for in-game use or to modify a player's avatar. Illustrative selectable items include compound bows 2902, summer camping supplies 2904, rifles 2906, hunting hats 2908, knifes 2910, binoculars 2912, spotting scopes 2914, ammunition 2916, and crossbows 2918. The selectable items have additional attributes, such as unique colors not available when gameplay is initiated or during tournament enrollment.

In one embodiment, players may select only one item, which is then available for use during skill-based bonus game sessions, tournament gameplay, or any combination thereof. In another embodiment, players may select an unlimited number of items during a predetermined time period. In still another embodiment, players may select only a certain number of items, such as 2, 5, or some number that is less than the total number of available items. In certain embodiments, the items may include a point value or a bonus spin. In all embodiments, the player receives the points associated with the selected items, which points are added to the player's point score or point total for the tournament game session. When items include a bonus spin, selection of that item triggers a compass animation that presents the player with a bonus spinner 3000 depicted in FIG. 30.

Figure 30:
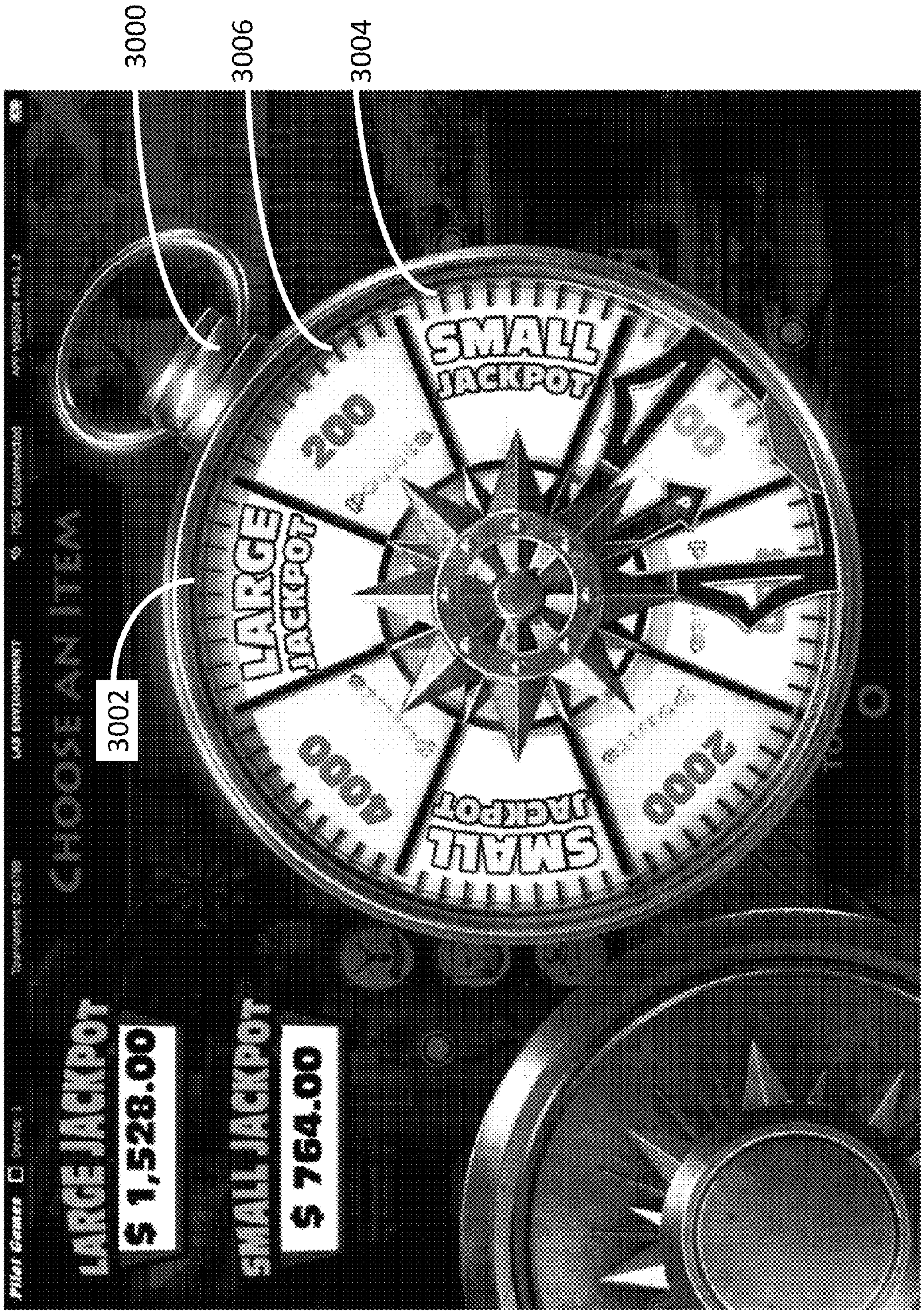
FIG. 30 shows bonus compass spinner animation.

In FIG. 30, the player is presented with the bonus compass spinner 3000, which provides the player a chance to win the large progressive prize 3002, the small progressive prize 3004, or points 3006 for their tournament game point score.

Figure 31:
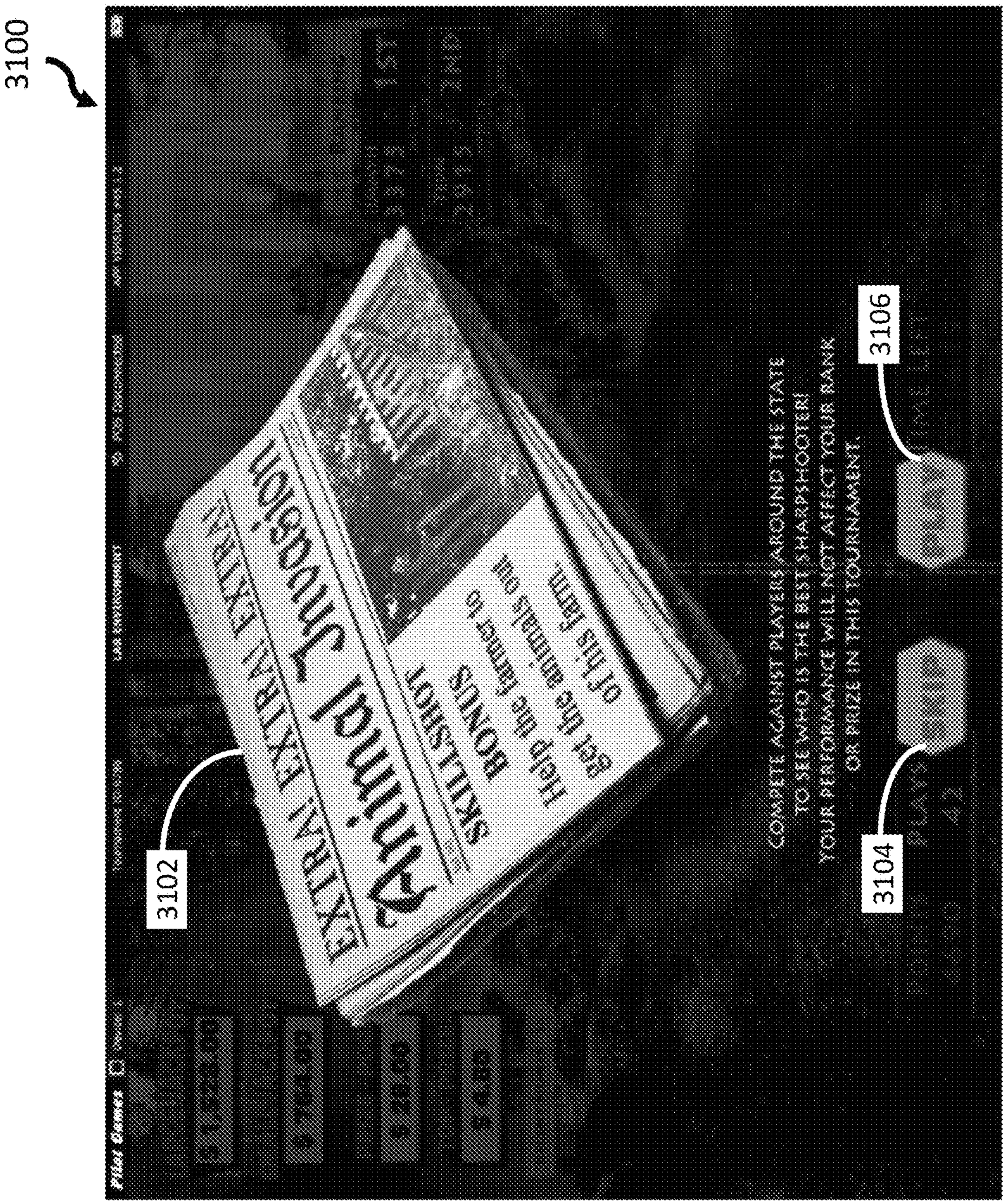
FIG. 31 shows an illustrative transition screen for a skill-based bonus game session.

Referring now to FIG. 31, there is shown an illustrative transition screen 3100 presenting the player with the option, but not the requirement, to play a skill-based bonus game session in the form a sharpshooter skillshot bonus hunt 3102. This optional The sharpshooter skillshot bonus hunt 3102 is a non-wagering competitive skill-based game that does not impact the players' rank in the tournament session. Since the sharpshooter skillshot bonus hunt 3102 is optional, players are presented both "skip" 3104 and "play" 3106 selection options that may receive the players' input in the form of a click, press, or touch.

Figure 32:
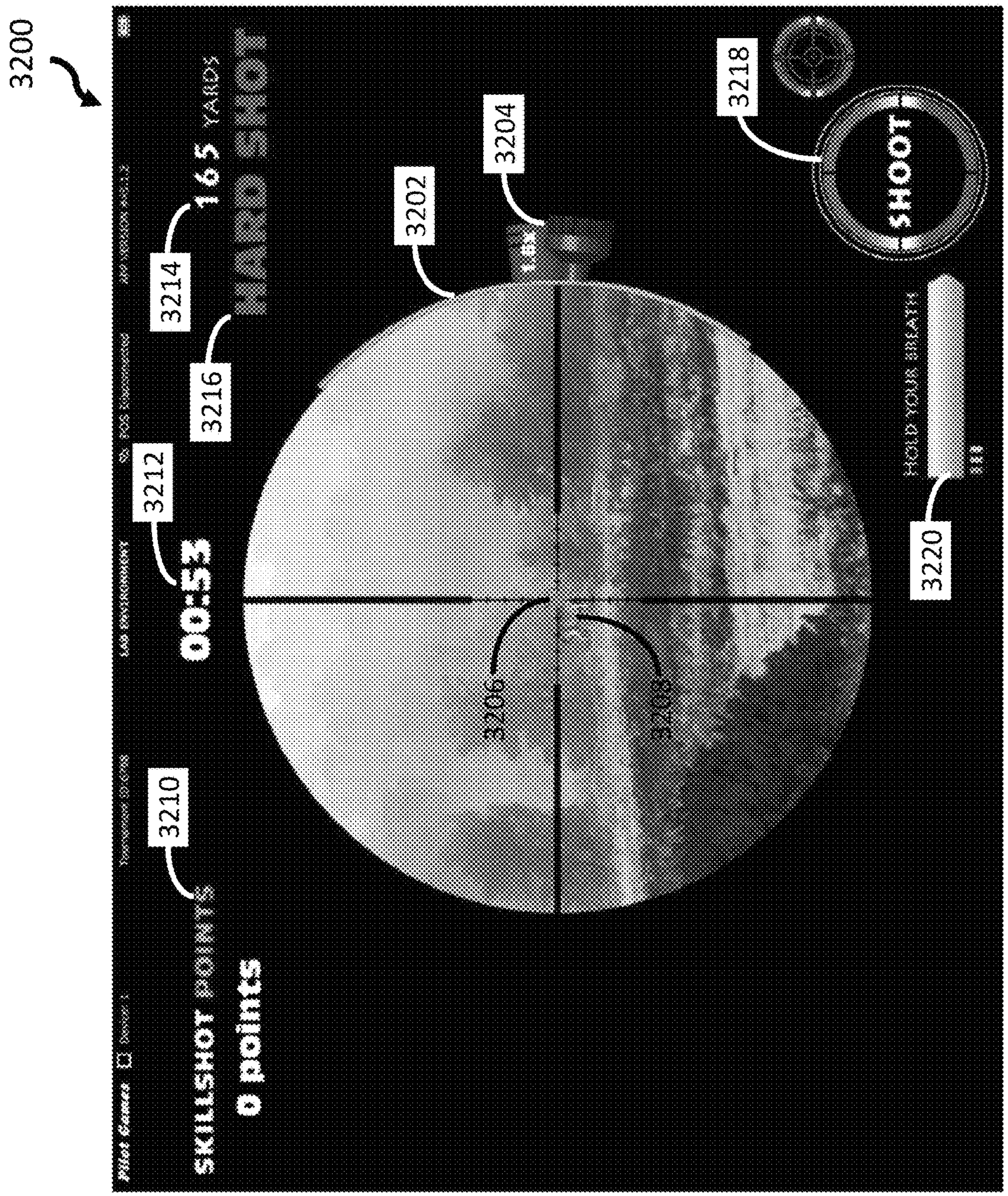
FIG. 32 shows an illustrative view of a sharpshooter skill-based bonus game session.

With reference now to FIG. 32, there is shown an illustrative view of skill-based bonus gameplay 3200 including a magnified scope view 3202 with an adjustment knob 3204 and cross-hairs 3206 centered on a target animal 3208, a skill point meter 3210, a bonus session timer 3212, a shot length 3214, a shot difficulty 3216, a skill input button (shoot button) 3218, and a breath meter 3220.

During the illustrative skill-based bonus game session the player is hunting with a rifle and has aimed using a scope, which presents the player with the magnified scope view 3202. The adjustment knob 3204 allows players to increase or decrease the magnification offered by the scope. As the magnification is increased by the player, the magnified scope view 3202 may become unsteady, imitating a shooter's natural body movement and the difficulty of long distance shots. When unsteady, the magnified scope view 3202 shifts unpredictably, i.e. moves randomly. This random, unsteady movement causes the target aim of the magnified scope view 3202 to shift.

In the illustrative magnified scope view 3202, a target animal 3208 is centered under a target cross-hair 3206 that includes a red dot to assist players' aim. The red dot at the center of the target cross-hair 3206 represents the location of a shoot if taken at the moment the red dot is over such a target location, such as by the player pressing the shoot button 3218. Players may reduce the intensity of scope movement with a hold breath feature indicated by the breath meter 3220. The hold breath feature is initiated by player input, such as clicking a dedicated hold breath button (not shown), which limits or eliminates the rate of movement or amount of displacement caused by the unsteady scope movement. The breath meter 3220 represents how long or how often a player may steady their aiming by holding their breath.

In one embodiment, the hold breath feature is limited such that the longer the hold breath feature is used the lower the breath meter 3220 becomes, upon reaching a minimum or zero level the hold breath feature may no longer be used or be available. In some embodiments, when the breath meter 3220 reaches zero it remains at zero for the remainder of the skill-based bonus session. In other embodiments, when the breath meter 3220 reaches zero it will slowly recover and increase again. In some embodiments, this recovery may occur after a rest period, such as 0, 1, 2, 5, 10, or more seconds elapse. When the player uses the hold breath feature, the breath meter begins reducing, and stops this reduction when the player ceases using the feature. In some embodiments, the breath meter recovers and increases after the player ceases using the hold breath feature.

In another embodiment, the hold breath feature is limited such that the longer the hold breath feature is used the high the breath meter 3220 becomes, and upon reaching a maximum level the hold breath feature is no longer available for use.

The skill point meter 3210 tracks the skill points accumulated by the player during the skill-based bonus game session from successful hunting shots. The bonus session timer 3212 indicates the time remaining in the skill-based bonus game session, when the timer 3212 reaches zero the bonus session terminates. In some embodiments, the bonus session may be extended as a result of successful hunting shots and the amount of time shown on the timer 3212 increased.

The view of skill-based bonus gameplay 3200 updates the player with details of any shot they are aiming at or that they have taken. These details include the shot distance 3214 to a target or animal at which the player is aiming, and the difficulty of the shot 3216. The shot difficulty 3216 is a composite determination based both upon the length of the shot and the type of shot (i.e., head, body, gut, etc.). In the illustrative view of skill-based bonus gameplay 3200, the shot difficulty 3216 is "hard" and the shot distance to target is "165 yards".

Figure 33:
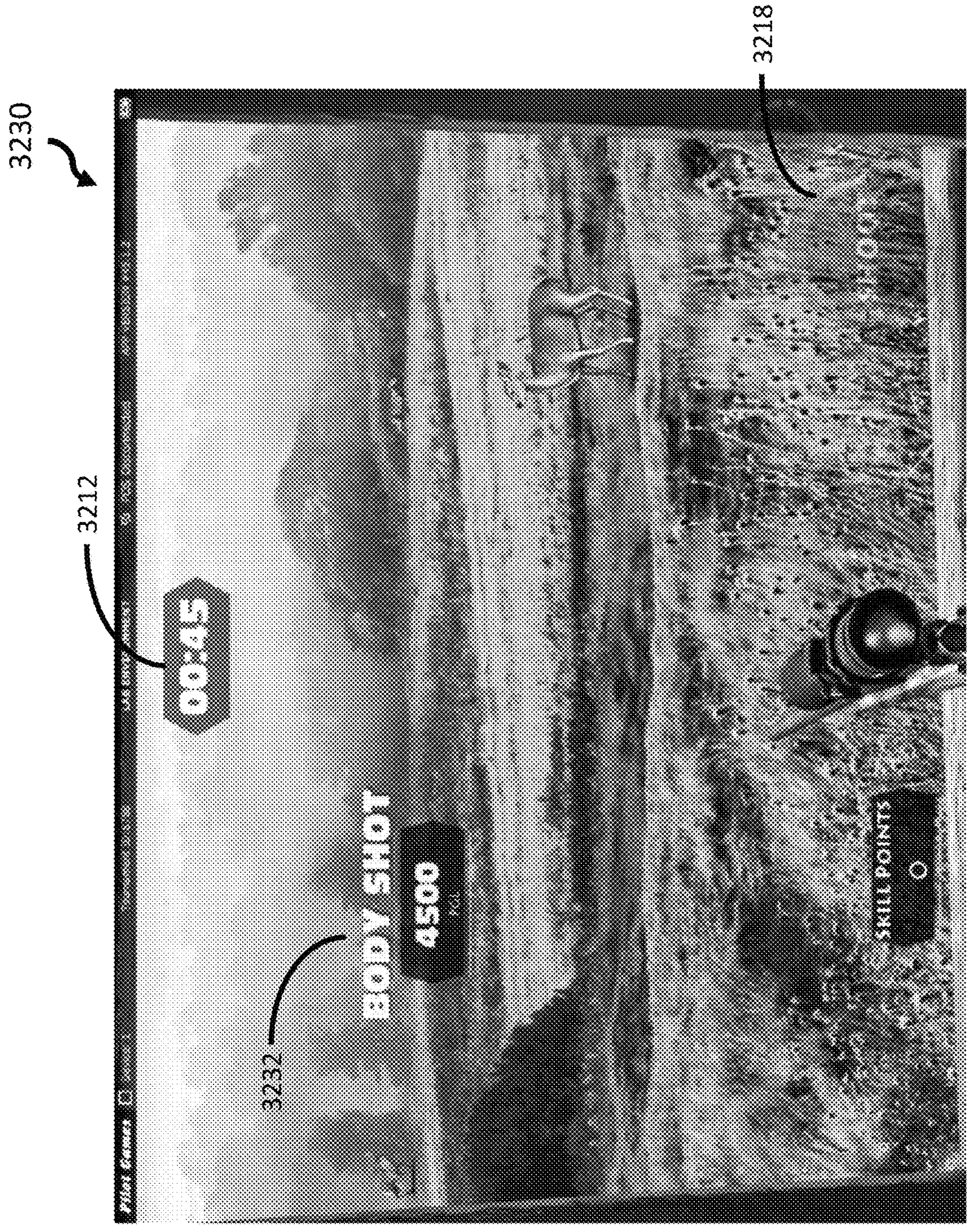
FIG. 33 shows a further view of the sharpshooter skill-based bonus game session.

Referring now to FIG. 33, there is shown another view of skill-based bonus gameplay 3230 where the player has made a successful body shot on a buck. In this view of skill-based bonus gameplay 3230 the player is presented with a point award 3232 (also termed a symbolic representation) for the successful body shot. Such a point award is provided for each successful hunting shot, and indicates the point value awarded as well as the type of shot made, i.e. head, body, gut, etc.

Figure 34:
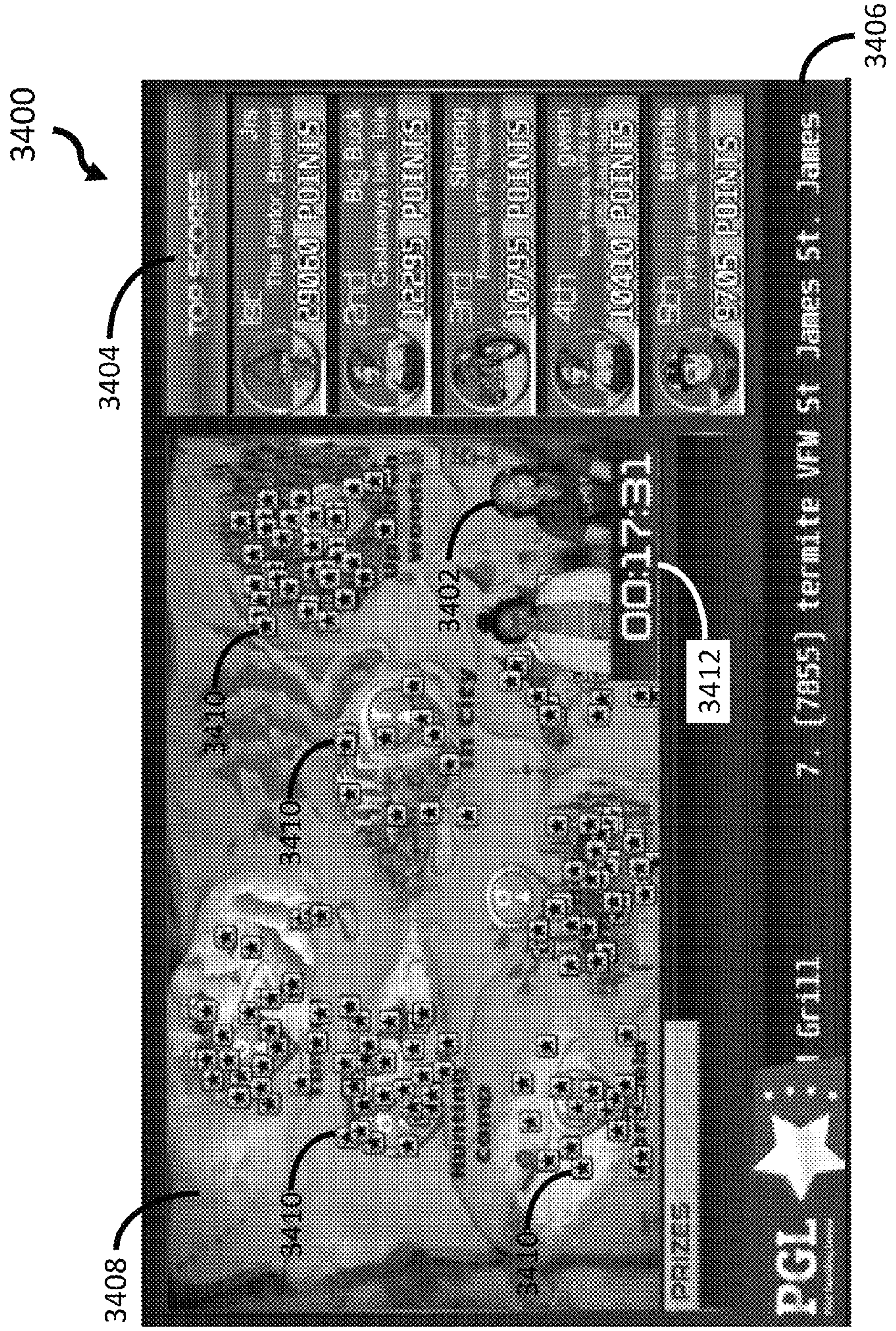
FIG. 34 shows an illustrative screenshot for a VPS broadcast of a Flash Bingo Tournament that is presented on the venue-based VPS video monitor.

With reference now to FIG. 34, there is shown an illustrative screenshot 3400 for live tournament game coverage as implemented on the (VPS) and is presented on the venue-based VPS video monitor. The video screenshot 3400 includes one or more hosts 3402 that are presenting and commentating on the tournament event, an updated leader board 3404, a banner with local site data 3406, and a background screen 3408 showing an illustrative virtual world map for an active or upcoming tournament game. The virtual world map in the background screen 3408 includes player icons 3410 that symbolize representations on the virtual location corresponding to that player's virtual hunting location.

The player icons 3410 highlight a further competitive aspect of the sharpshooter challenge bonus skill game, individual players may be hunting the same target animals at the same time. Thus, when two or more players are hunting the same animal(s), only one of those players can successfully hunt the animal, more specifically the player who shoots accurately first. Once on player successfully hunts an animal, that animal is no longer available as a target to be hunted by any other player that may be nearby in the virtual world.

While the leader board 3404 updates in real-time based on players' in-game tournament activity (i.e. tournament gameplay, bonus skill-based gameplay, or any combination thereof) and the banner streams varying local site date, the background screen 3408 may similarly show a variety of information or displays to players. In some embodiments, the virtual world map shown in the background screen 3408 is interactive, allowing the host commentators or the VPS system 104 itself to scroll along a 2-D representation or travel through a 3-D representation by changing the angle and orientation of the view presented as well as zooming into or out of certain views/virtual locations. Further, the background screen 3408 may display different virtual worlds (i.e., a first virtual world map and a second virtual world map) concurrently by splitting the background screen space or sequentially by displaying a first virtual world map and then a second virtual world map.

The illustrative screenshot 3400 may be presented on a VPS monitor 110. During the illustrative tournament game, the venue-based VPS video monitor 110 may be configured to present a leader board 3404 to players on a real time basis. The VPS output may also be configured to show the point totals for leading players and identifies the city and venues where the players are playing 3404. Additionally, the VPS video monitor 110 may display the time remaining 3412 in the tournament. In the illustrative embodiment, leading players are identified by a chosen screen name and player selected avatars. The centralized gaming system 100 incorporates a commercially available software filter to avoid use of improper names or initials on the leader board. As described above, the leader board may also be available on player's client devices.

In another illustrative embodiment, the video presentation sub-system 104 provides streaming content to support mobile wagering sub-system 102 games, including Tournament Bingo. The video presentation sub-system 104 may be broadcasting 60 minutes, for example, prior to the illustrative linked bingo tournament (LBT) and 30 minutes following the conclusion of tournament sessions. It should be understood that the time period for a broadcast may be determined by the producers and can be any suitable length of time.

Additionally, the visual presentation sub-system can present updated entertaining game-based data to the player devices and stationary display. The updated entertaining game-based data may include the points awarded to other players that participated in the tournament session that were selected by the player. Additionally, the updated entertaining game-based data may be related to the type of weapon used by one or more tournament players, or the animal(s) hunted by one or more tournament player. Furthermore, updated entertaining game-based data may include the hunting location on the virtual world map where players are hunting.

Further, an interactive control module of the VPS 104 integrates live game play data with virtual environments. The interactive control module renders a display containing all or a subset of the information about the state of the game and may show the player's state of the game in a two-dimensional environment or a three-dimensional environment.

For example, an immersive virtual environment can be created by combining the 2D representation of the virtual world map hunting locations shown in FIG. 21 with live tournament data. The illustrative immersive virtual environment generates a 3D model of the virtual world map that a player navigates in a virtual ride through the hunting locations 2116. The immersive virtual environment shows virtual icons corresponding to live players at their chosen point of play with their actual screen names and points.

Figure 35:
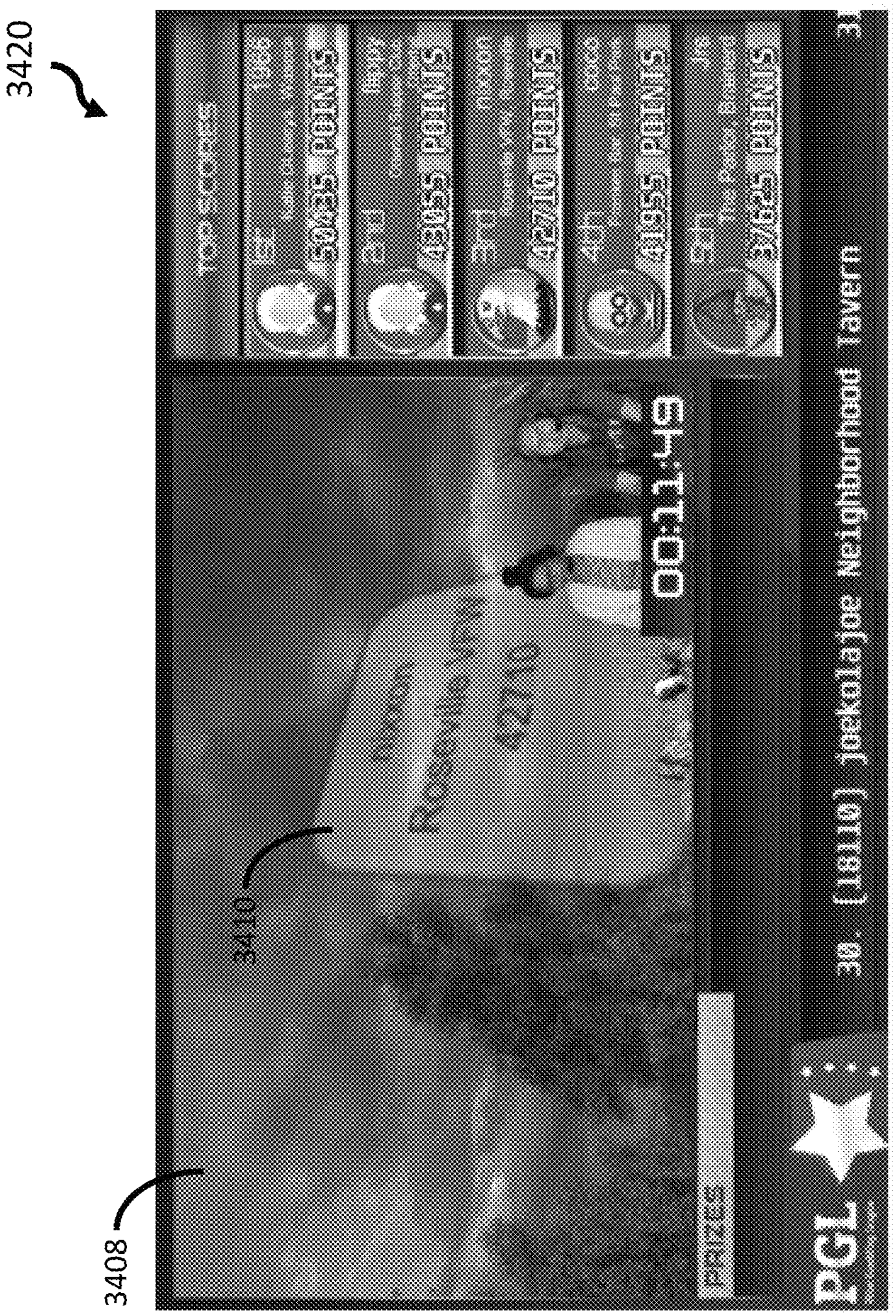
FIG. 35 shows another illustrative screenshot for a VPS broadcast of a Flash Bingo Tournament.

With reference now to FIG. 35, there is shown another illustrative screenshot 3420 of live tournament game coverage. The background screen 3408 of this illustrative screenshot 3420 includes a 3-D rendering of a player icon 3410 with player details, such as a player name, an associated establishment, and a current point total. The player name may be a user name or avatar name, instead of a legal name. The associated establishment is the name and/or location of the facility in which the player is located during the tournament. The point total may be the player's current tournament point total, the player's skill point total, or any combination thereof. The 3-D rendering of the player icon 3410 allows the VPS 104 to present a virtual search of the virtual world game map for one or more player icons 3410. This virtual search may include virtually traversing the game map to find one or more player icon 3410 in an entertaining display. This allows individuals watching the VPS broadcast and the live hosts commentating on the live broadcast to identify where players are hunting from a long virtual distance.

Figure 36:
FIG. 36 shows a further illustrative screenshot for a VPS broadcast of a Flash Bingo Tournament.

Referring now to FIG. 36, there is shown a further illustrative screenshot 3430 of live tournament game coverage. The background screen 3408 of this illustrative screenshot 3430 includes a leaderboard 3432 for player skill point rankings. The leaderboard 3430 includes entries for the top skill point scoring players, where each entry includes information corresponding to the player's 3-D icon (i.e., a player name, an associated establishment, and a current point total).

The illustrative gaming systems and methods presented above may include a plurality of server applications that are configured to provide high-availability and redundancy, processes all inputs, generates outputs, and maintains a central database for accounting, game play, system configuration data, and other such data types. By way of example and not of limitation, critical system data regarding clients may be maintained a repository associated with the illustrative gaming system. Historical games results, and leader board information may be maintained. Printable versions of this information may be available on the portal.

The illustrative client devices described in the illustrative embodiments are communicatively coupled to a gaming system database, which stores client device data. Additionally, the illustrative gaming system database is configured to be secure. Furthermore, the illustrative gaming system database manages the data that is received from client devices in geographically dispersed gaming venues.

The illustrative centralized gaming system may be disposed in a central site as described herein. The illustrative centralized gaming system may process information received over the internet backbone from client devices such as mobile devices, management terminals and other such client devices.

The illustrative MWS sub-system manages the funding of game play and operation of wagering games and overall system management. All gaming messaging between servers and client devices is sent and received over a secure internet network that directs network traffic to the appropriate server elements. A Portal service receives messages from management terminals and provides functionality to authorized users to control the system and access real-time and historical data. All server applications are structured to be deployable in a virtual server environment, configured for high-availability with fail-over capabilities on hardware components and database structures that keep a multiplicity of all data records.

By way of example and not of limitation, the games supported by the wagering system include electronic pull-tabs, linked bingo, high-speed linked bingo with entertainment, bingo tournaments, slot games, video poker, multi-player poker, blackjack, roulette, and other casino or non-casino based entertainment games.

Many game types, including electronic pull-tabs and the entertainment aspect of linked bingo have bonus modes that award prizes based on a theme-specific animation. Often these features take more play time than a conventional game. While these features are entertaining, many players who have played the games for some period of time find the time spent in animation wasteful. Therefore, this system features a unique option at the beginning of any potentially long bonus animation. The player is presented with a screen announcing the bonus and then is presented with an option to proceed with the bonus animation or bypass the animation and go directly to the prize award at the end of the animation.

It is clear that the infrastructure of the MWS with the added capabilities of the VPS can support a wide variety of game types, in addition to the ones described herein. Those games include slot machine games, video lottery games, poker, blackjack, skill-based wagering games, among others previously mentioned.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A gaming system operating a virtual world gaming tournament, the gaming system comprising:

a gaming client communicatively coupled to a wagering sub-system that receives a wager from the gaming client;

a virtual world having at least one location, in which the gaming client is associated with the at least one location in the virtual world;

a game session associated with the gaming client and the wager, wherein the game session includes a random game outcome, wherein the gaming client associates the random game outcome with a symbolic representation that is displayed at the location in the virtual world associated with the gaming client, wherein the random game outcome associated with the game session is further associated with a point value that is displayed in the at least one virtual world location associated with the gaming client;

a game prize associated with the game session and the wager, in which the game prize is displayed on the gaming client, wherein the game prize is awarded to the gaming client when the point value exceeds a threshold value;

a non-wagering bonus skill game session initiated when the point value associated with the random game outcome matches one or more bonus point value requirements, wherein the bonus skill game session includes a plurality of non-monetary bonus skill prizes; and at least one skill-based player input including a player ability attribute, wherein a non-monetary bonus skill prize awarded based upon the player ability attribute.

2. The system of claim 1 wherein the game session includes a bingo game session.

3. The system of claim 2 wherein a random bingo game outcome associated with the bingo session is further associated with a bingo pattern that is displayed in the virtual world associated with the gaming client; and wherein the non-wagering bonus skill game session is initiated when the bingo pattern associated with the random game outcome matches one or more bonus patterns.

4. The system of claim 1 wherein the game session includes a pulltab game session.

5. The system of claim 1 wherein the symbolic representation associated with the random outcome includes a point value and a symbolic object that is associated with the point value.

6. The system of claim 1 wherein the non-wagering bonus skill game session includes a random component.

7. A gaming system operating a virtual world gaming tournament, the gaming system comprising:

a plurality of gaming clients that are communicatively coupled to a wagering sub-system that receives a wager from each of the gaming clients;

a virtual world having a plurality of locations, in which each gaming client is associated with at least one location in the virtual world;

a tournament session that includes a plurality of predetermined game sessions for each gaming client and one or more non-wagering bonus skill game sessions, in which the tournament session begins at a particular time and ends when the predetermined number of game sessions have been played;

each game session for each gaming client associates a random game outcome with a symbolic representation that is displayed at the location in the virtual world associated with the gaming client;

the random game outcome associated with each game session for each gaming client is further associated with a point value that are displayed in the virtual world associated with the gaming client;

each non-wagering bonus skill game session initiated when the point value associated with a gaming client matches a bonus trigger value;

a live host that identifies one or more locations in the virtual world, in which the live host provides updates on the points awarded to one or more gaming clients at the virtual world location;

wherein the live host selectively broadcasts at least one of a first virtual world and a second virtual world during the tournament session, and the live host broadcast is displayed on at least one of a networked display and the gaming clients;

a tournament prize associated with the tournament session, in which the tournament prize is displayed on each gaming client; and the tournament prize is awarded to one or more gaming clients displaying a highest point total upon completion of the tournament session.

8. The system of claim 7 wherein the live host is displayed on the bingo gaming client.

9. The system of claim 7 further comprising at least one progressive prize that receives a portion of each wager received by the wagering sub-system;

the progressive prize associated with the tournament session, in which the progressive prize is displayed on each gaming client; and wherein the progressive prize is awarded to each gaming client at the completion of the game session when the random game outcome corresponds to being awarded the progressive prize.

10. The system of claim 7 wherein the live host selects locations in the virtual world and provides updates about game play in the virtual world gaming tournament.

11. The system of claim 7 wherein each gaming client in the tournament session receives a same wager from each gaming client.

12. The system of claim 7 wherein the symbolic representation associated with the random outcome includes at least one bingo card, a point value and a symbolic object that is associated with the point value.

13. The system of claim 7 further comprising a leaderboard of players in the tournament session ranked based upon non-wagering bonus skill game session outcomes.

14. The system of claim 7 wherein each non-wagering bonus skill game session includes a random component.

15. A gaming method for conducting a linked tournament game, the method comprising:

communicatively coupling a plurality of gaming clients to a wagering sub-system that receives a wager from each gaming client;

generating a virtual world having a plurality of locations, in which each gaming client is associated with at least one location in the virtual world;

initiating a tournament session that includes a plurality of predetermined game sessions for each gaming client, in which the tournament session begins at a particular time and the tournament session ends when the predetermined number of game sessions have been played;

associating each game session and the corresponding random game outcome with a symbolic representation that is displayed at the location in the virtual world associated with the gaming client;

displaying each symbolic representation at a location in the virtual world associated with the gaming client corresponding to the game session associated with the symbolic representation;

further associating each game session with a point value;

displaying each point value at the location in the virtual world associated with the gaming client corresponding to the game session associated with the point value;

initiating a non-wagering bonus skill game session for each gaming client having a point value that matches a bonus trigger value;

receiving at least one skill-based player input including a player ability attribute for each non-wagering bonus skill game session;

awarding a non-monetary bonus skill prize based upon the player ability attribute;

enabling a live host to identify to one or more locations in the virtual world, in which the live host provides updates on the points awarded to one or more gaming clients at the virtual world location;

enabling the live host to selectively broadcast at least one of a first virtual world and a second virtual world during the tournament session, and the live host broadcast is displayed on at least one of a networked display and the gaming clients;

associating a tournament prize with the tournament session, in which the tournament prize is displayed on each gaming client; and awarding the tournament prize to one or more gaming clients displaying a highest point total upon completion of the tournament session.

16. The method of claim 15 wherein each non-wagering bonus skill game session includes at least one random component.

17. The method of claim 15 further comprising displaying non-wagering bonus skill game leaderboard ranking players based upon non-monetary bonus skill prizes awarded.

18. The method of claim 15 wherein each game session is a bingo game session and each random game outcome includes a bingo pattern, and wherein the non-wagering bonus skill game session is initiated when the bingo pattern associated with the random game outcome matches one or more bonus patterns.

19. The method of claim 15 wherein the game session is a pulltab game session.

20. The method of claim 14 further comprising at least one progressive prize that receives a portion of each wager received by the wagering sub-system.

* * * * *